(12) United States Patent
Lee et al.

(10) Patent No.: US 9,256,386 B2
(45) Date of Patent: Feb. 9, 2016

(54) IMAGE FORMING APPARATUS SUPPORTING FUNCTION OF NEAR FIELD COMMUNICATION AND METHOD OF SETTING NFC OPERATION MODE THEREOF

(71) Applicant: SAMSUNG ELECTRONICS CO., LTD., Suwon-si, Gyeonggi-do (KR)

(72) Inventors: Jae-in Lee, Suwon-si (KR); Kang-yub Kim, Yongin-si (KR); Hyun-wook Park, Suwon-si (KR); Sung-joon Park, Hwaseong-si (KR); Jin-hyung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/676,182

(22) Filed: Apr. 1, 2015

(65) Prior Publication Data
US 2015/0205550 A1    Jul. 23, 2015

Related U.S. Application Data

(63) Continuation-in-part of application No. 13/712,138, filed on Dec. 12, 2012, now Pat. No. 9,036,169.

(60) Provisional application No. 61/569,391, filed on Dec. 12, 2011.

(30) Foreign Application Priority Data

Apr. 2, 2014 (KR) .................... 10-2014-0039359

(51) Int. Cl.
*G06F 15/00* (2006.01)
*G06F 3/12* (2006.01)
(Continued)

(52) U.S. Cl.
CPC ............ *G06F 3/1236* (2013.01); *G06F 3/1204* (2013.01); *G06F 3/1211* (2013.01);
(Continued)

(58) Field of Classification Search
USPC .................................................. 358/1.1–1.18
See application file for complete search history.

(56) References Cited

U.S. PATENT DOCUMENTS 8,621,071 B1    12/2013    Scofield et al.
8,625,488 B1    1/2014    Gogate et al.
(Continued)

FOREIGN PATENT DOCUMENTS

EP    2390782    11/2011
EP    2 645 691 A2    10/2013
(Continued)

OTHER PUBLICATIONS

International Search Report dated Mar. 25, 2013 issued in International Application No. PCT/KR2012/010807.
(Continued)

*Primary Examiner* — Douglas Tran
(74) *Attorney, Agent, or Firm* — Jefferson IP Law, LLP

(57) ABSTRACT

A near field communication (NFC) operating mode of an image forming apparatus may be set by determining a type of a job to be performed in the image forming apparatus via NFC tagging of a mobile device, determining a first NFC operating mode corresponding to the determined type of the job from among a plurality of NFC operating modes supported by an NFC module, setting the determined first NFC operating mode as an operating state of the NFC module, and performing the job by tagging the mobile device via NFC by using the set first NFC operating mode.

20 Claims, 40 Drawing Sheets

(51) Int. Cl.
*G06K 1/00* (2006.01)
*H04B 5/00* (2006.01)
*H04N 1/00* (2006.01)
G06K 15/00 (2006.01)
*H04W 76/02* (2009.01)

(52) U.S. Cl.
CPC .......... *G06F3/1292* (2013.01); *G06K 15/4045* (2013.01); *H04B 5/0031* (2013.01); *H04N 1/00214* (2013.01); *H04N 1/00307* (2013.01); *H04N 1/00954* (2013.01); *H04W 76/025* (2013.01); *G06K 15/4005* (2013.01); *H04W 76/023* (2013.01); *Y02B 60/1271* (2013.01)

(56) References Cited

U.S. PATENT DOCUMENTS

| | | | |
|---|---|---|---|
| 8,873,468 | B1 | 10/2014 | Gogate et al. |
| 8,929,822 | B2 | 1/2015 | Jung et al. |
| 2003/0149778 | A1 | 8/2003 | Robinson et al. |
| 2003/0156567 | A1 | 8/2003 | Oak |
| 2004/0176134 | A1 | 9/2004 | Goldthwaite et al. |
| 2005/0147049 | A1 | 7/2005 | Ganesan |
| 2008/0063002 | A1 | 3/2008 | Zheng et al. |
| 2008/0288936 | A1 | 11/2008 | Ikeda |
| 2009/0017843 | A1 | 1/2009 | Laroia et al. |
| 2010/0082490 | A1 | 4/2010 | Rosenblatt et al. |
| 2011/0063663 | A1 | 3/2011 | Kim et al. |
| 2011/0082939 | A1 | 4/2011 | Montemurro et al. |
| 2011/0085529 | A1 | 4/2011 | Choi et al. |
| 2011/0185183 | A1 | 7/2011 | Yamamoto |
| 2011/0225305 | A1 | 9/2011 | Vedantham et al. |
| 2011/0292425 | A1 | 12/2011 | Lee |
| 2012/0224569 | A1 | 9/2012 | Kubota |
| 2013/0057897 | A1 | 3/2013 | Park et al. |
| 2013/0057898 | A1 | 3/2013 | Park et al. |
| 2013/0148149 | A1 | 6/2013 | Park et al. |
| 2014/0347170 | A1* | 11/2014 | Gui et al. ................... 340/10.51 |
| 2015/0172924 | A1* | 6/2015 | Hirano ......................... 358/1.15 |

FOREIGN PATENT DOCUMENTS

| | | |
|---|---|---|
| EP | 2 811 720 A2 | 12/2014 |
| KR | 10-2011-0040025 | 4/2011 |
| KR | 10-2011-0096831 | 8/2011 |
| KR | 10-2013-0025745 | 3/2013 |
| KR | 10-2013-0025747 | 3/2013 |
| KR | 10-2013-0025749 A | 3/2013 |
| WO | 2009009394 | 1/2009 |

OTHER PUBLICATIONS

Extended European Search Report dated May 17, 2013 issued in EP Application No. 12196634.5.
Extended European Search Report dated May 24, 2013 issued in EP Application No. 12196808.5.
Extended European Search Report dated May 24, 2013 issued in EP Application No. 12196617.0.
European Office Action dated Oct. 7, 2014 in European Patent Application No. 12196617.0.
"UPnP Device Architecture 1.0", Jul. 20, 2006, <http: \www.upnp-ic.org/resources/UPnP_device_architecture_docs/UPnP-DeviceArchitecture-v1_0-20060720.pdf, 80 pages.
Wi-Fi Peer-to-Peer (P2P0 Technical Specification v1.2, Wi-Fi Alliance Technical Committee P2P Task Group, 2010 WiFi Alliance, 159 pages.
Notice of Allowance mailed Feb. 20, 2015 in U.S. Appl. No. 13/712,138.
Office Action mailed Apr. 24, 2014 in U.S. Appl. No. 13/712,138.
U.S. Appl. No. 13/712,138, filed Dec. 12, 2012, Park et al., Samsung Electronics Co., Ltd.
U.S. Appl. No. 14/592,483, filed Jan. 8, 2015, Chang-jung Yun et al., Samsung Electronics Co., Ltd.

* cited by examiner

<NFC enabled phone>

<NFC enabled phone>

NFC tag

| Item | Value |
|---|---|
| Device Name | CLX-4170FW |
| Serial Number | 1234567890 |
| Print Capacity | Color, Mono |
| Scan Capacity | 300, 600 dpi |
| Fax Capacity | 33.6K bps |
| Network Address 1 | 0x0000f0a01234 |
| Network Address 2 | 169.254.12.13 |
| Location | N37.578868, E126.980564 |
| Administrator | Kim Jin Hyung (010-123-1234, j.h.Kim@samsung.com) |

FIG. 35

| TYPE OF JOB | | MOBILE DEVICE | IMAGE FORMING APPARATUS |
|---|---|---|---|
| REGISTRATION JOB | FIRST REGISTRATION METHOD | WRITE MODE | CARD EMULATION MODE |
| | SECOND REGISTRATION METHOD | CARD EMULATION MODE | READ MODE |
| REGISTRATION JOB | FIRST NFC AUTHENTICATION METHOD | WRITE MODE | CARD EMULATION MODE |
| | SECOND NFC AUTHENTICATION METHOD | CARD EMULATION MODE | READ MODE |
| WI-FI SET UP | | WRITE MODE | CARD EMULATION MODE |
| DATA CLONING | | WRITE MODE | CARD EMULATION MODE |
| TROUBLE SHOOTING | | READ MODE | CARD EMULATION MODE |
| PRINTING | | READ MODE | CARD EMULATION MODE |
| FAXING | | READ MODE | CARD EMULATION MODE |
| ... | | ... | ... |

3501

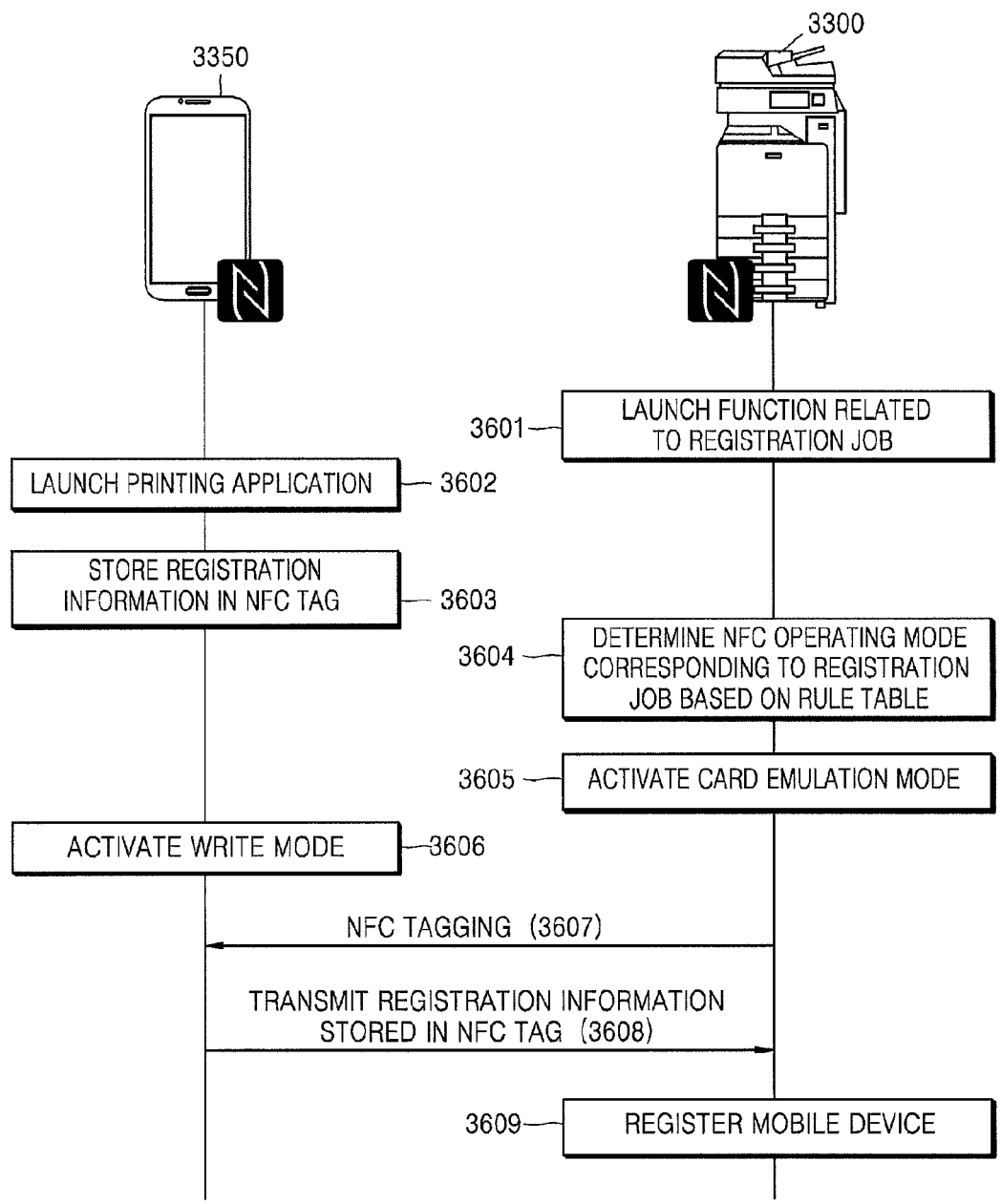

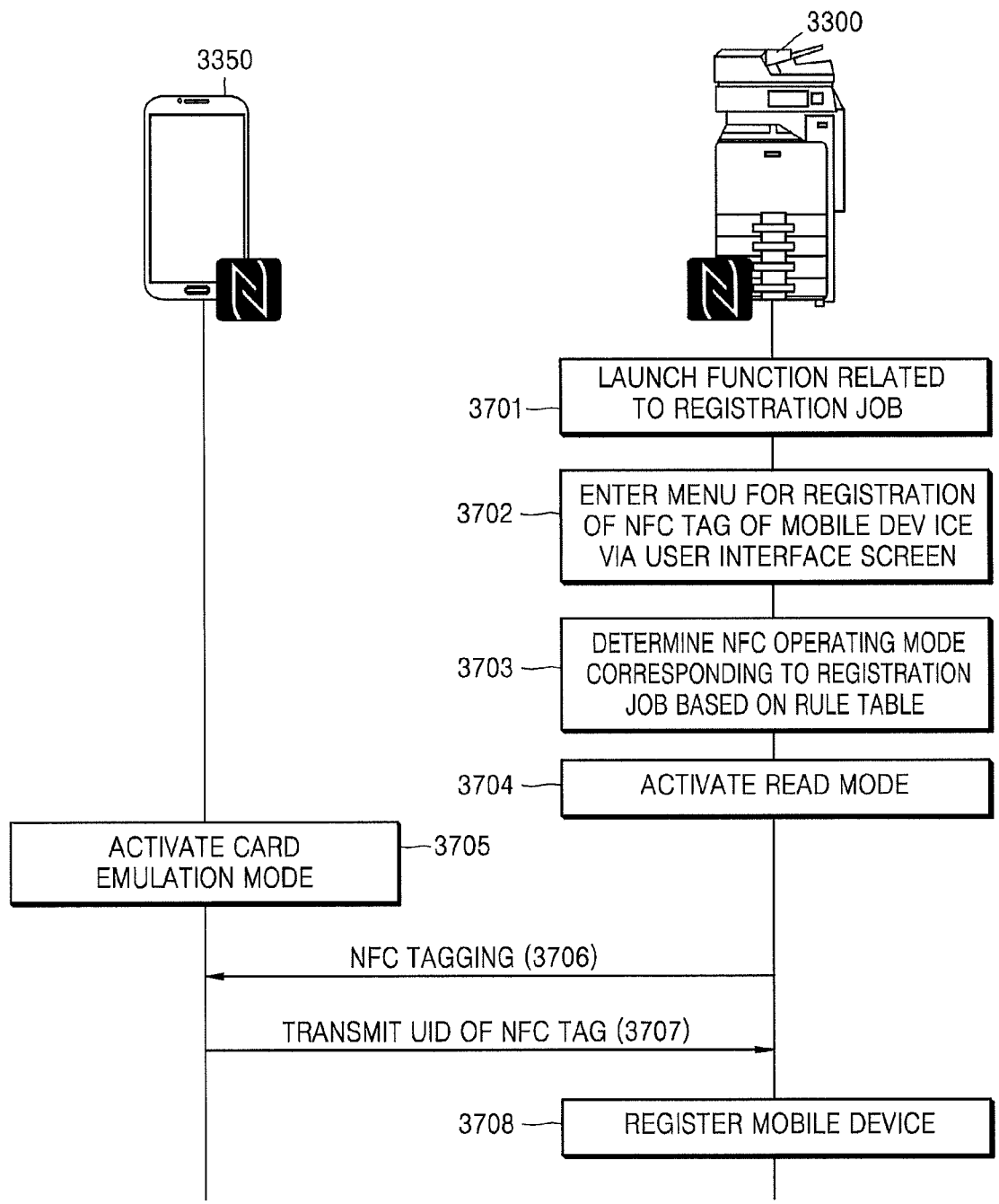

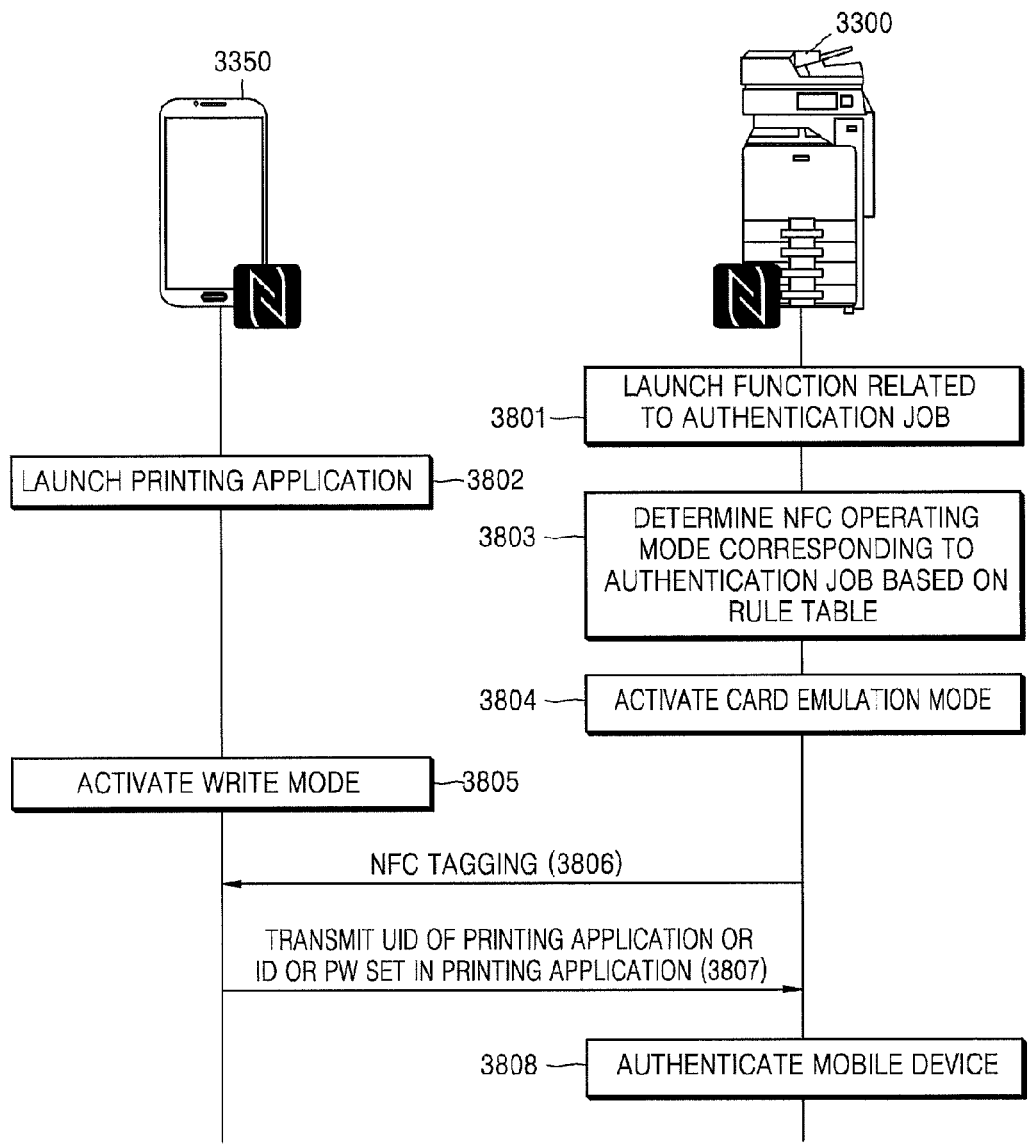

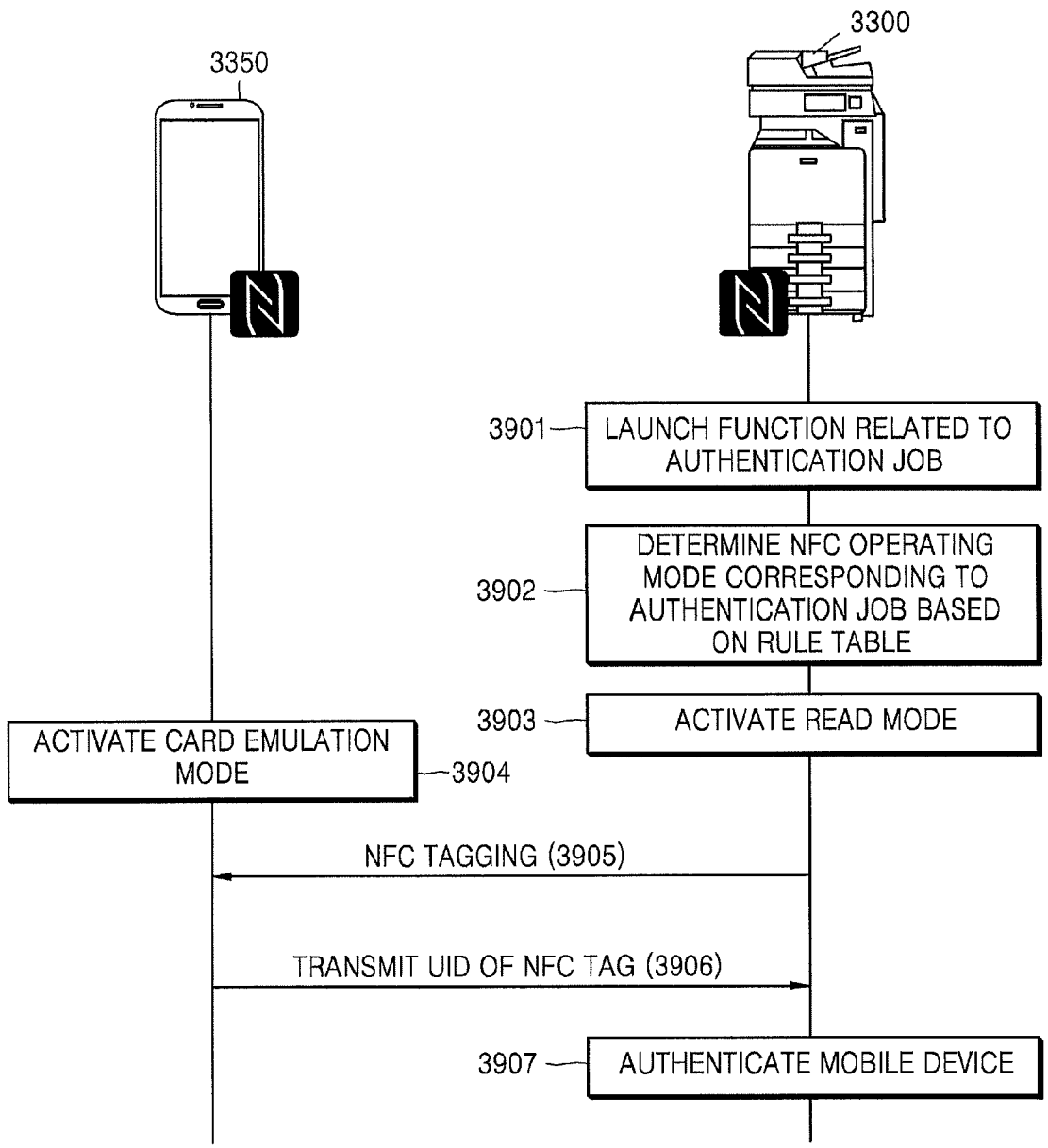

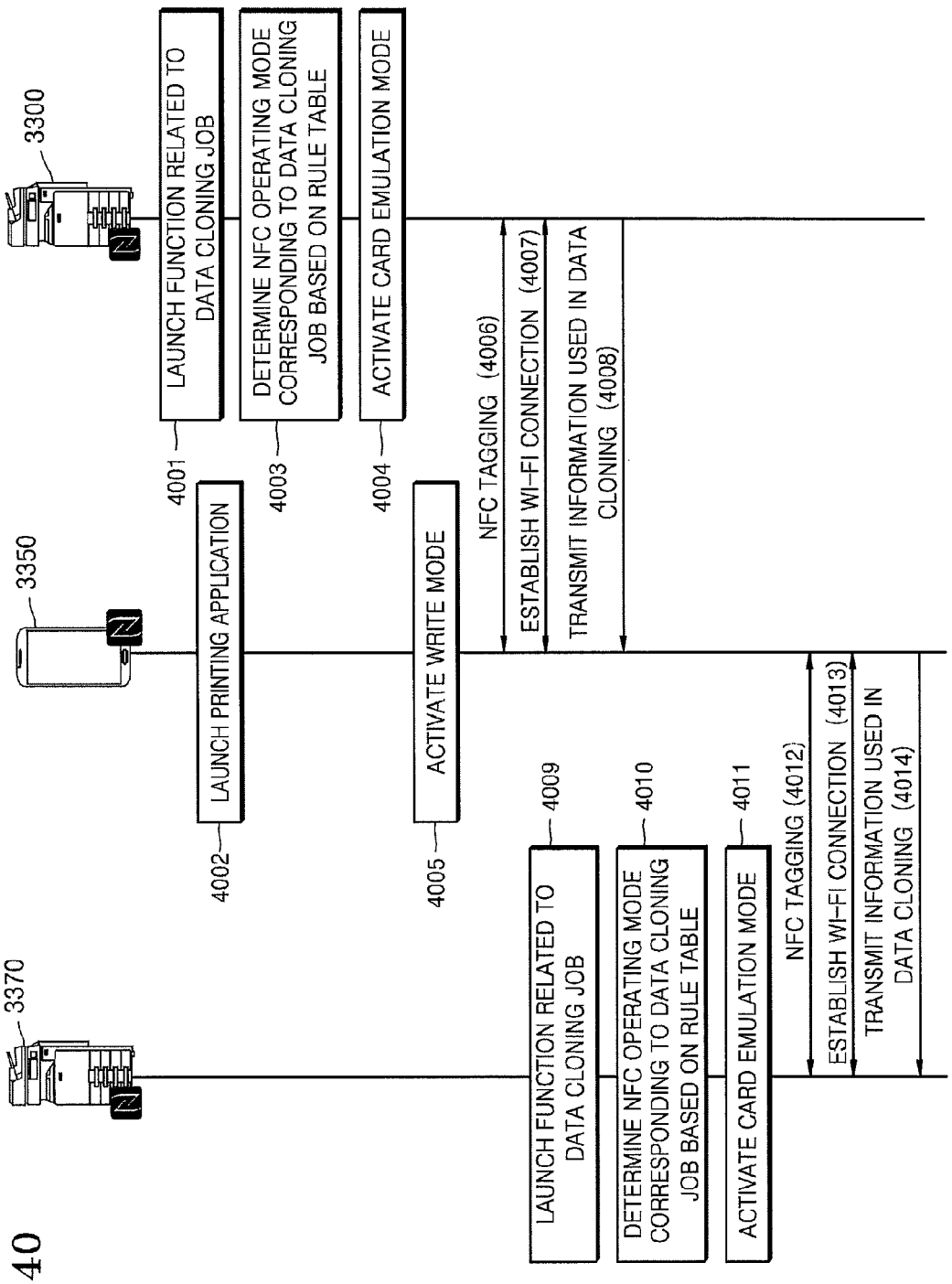

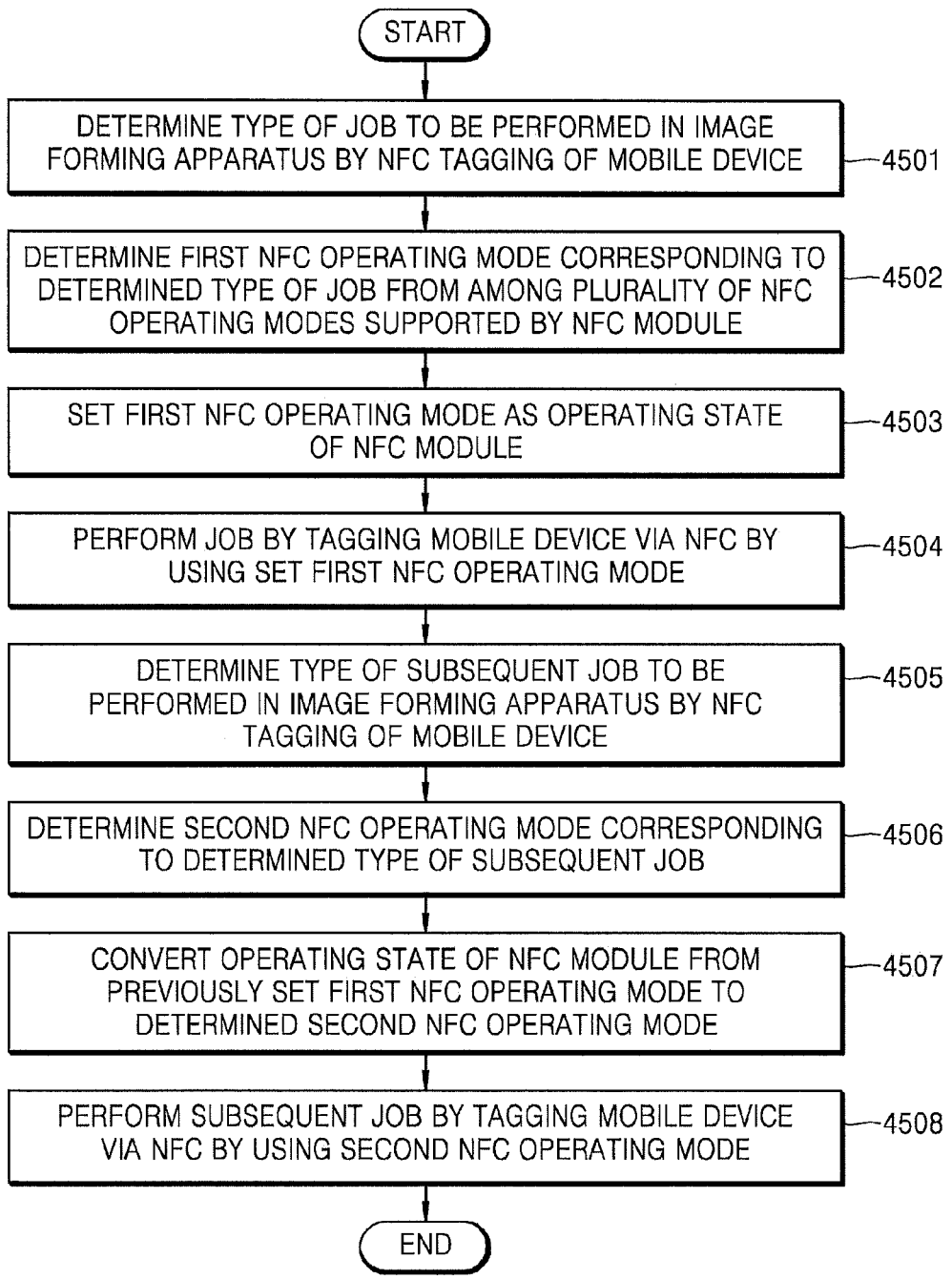

IMAGE FORMING APPARATUS SUPPORTING FUNCTION OF NEAR FIELD COMMUNICATION AND METHOD OF SETTING NFC OPERATION MODE THEREOF

CROSS-REFERENCE TO RELATED APPLICATIONS

This application is a continuation in part of U.S. patent application Ser. No. 13/712,138, filed on Dec. 12, 2012, which claims the priority benefit under 35 USC §120 from U.S. Provisional Patent Application No. 61/569,391, filed on Dec. 12, 2011, in the U.S. Patent and Trademark Office and claims the priority benefit under 35 USC §119 from Korean Patent Application No. 10-2014-0039359, filed on Apr. 2, 2014, in the Korean Intellectual Property Office, the disclosures of each of which are incorporated herein in their entirety by reference.

BACKGROUND

1. Field

One or more embodiments of the disclosure relate to an image forming apparatus supporting a near field communication (NFC) function and a method of setting a NFC operating mode of an image forming apparatus.

2. Description of the Related Art

Near field communication (NFC) generally refers to a contactless short-range wireless communication standard between electronic devices within a short distance from each other of about 10 cm with low power consumption by using a frequency of about 13.56 MHz, and was developed by the joint work of NXP Semiconductors of the Netherlands and Sony of Japan in 2002. A data transfer rate of NFC is about 424 Kbps, and NFC has excellent security features due to high proximity and encryption technology. NFC forgoes a complicated pairing process for recognition of devices but allows devices to recognize one another within about ¹⁄₁₀ of a second or less. In particular, NFC is a smart card type contactless wireless communication technology where radio frequency identification (RFID) technology is utilized. In addition, NFC builds upon RFID technology by allowing two-way communication compared to smart cards. NFC has a relatively large memory storage space and offers more variety of services. Accordingly, commercialized electronic devices, such as smartphones and personal computers (PCs), in which the NFC technology may be used, have recently been released.

SUMMARY

One or more embodiments of the disclosure include an image forming apparatus supporting a near field communication (NFC) function and a method of setting an NFC operating mode of the image forming apparatus.

One or more embodiments of the disclosure include a computer-readable recording medium (e.g., non-transitory computer readable recording medium) having one or more programs for executing the method on a computer.

Additional aspects will be set forth in part in the description which follows and, in part, will be apparent from the description, or may be learned by practice of the disclosed embodiments.

According to one or more embodiments of the disclosure, a method of setting a near field communication (NFC) operating mode of an image forming apparatus, may include: determining a type of a job to be performed in the image forming apparatus via NFC tagging of a mobile device, determining a first NFC operating mode corresponding to the determined type of job from among a plurality of NFC operating modes supported by an NFC module, setting the determined first NFC operating mode as an operating mode of the NFC module, and performing the job by tagging the mobile device via NFC by using the set first NFC operating mode.

The determining of the first NFC operating mode may include determining the first NFC operating mode based on a rule table that defines a mapping relationship between the type of the job and the plurality of NFC operating modes.

The type of the job may include at least one selected from a registration job, an authentication job, a data cloning job, a Wi-Fi setup job, a trouble shooting job, a printing job, a scanning job, and a faxing job.

The authentication job may be performed by using a first NFC authentication method using a printing application installed in the mobile device or a second NFC authentication method using an NFC tag mounted in the mobile device.

The rule table may define a mapping relationship between the first NFC authentication method and a card emulation mode, wherein the determining of the first NFC operating mode may include determining, when the type of the job is the authentication job of the first NFC authentication method, the card emulation mode as the first NFC operating mode.

The rule table may define a mapping relationship between the second NFC authentication method and a read mode, wherein the determining of the first NFC operating mode may include determining, when the type of the job is the authentication job of the second NFC authentication method, the read mode as the first NFC operating mode.

The rule table may define a mapping relationship between a first registration method, in which the mobile device is registered by using the printing application installed in the mobile device, and a card emulation mode, wherein the determining of a first NFC operating mode may include determining, when the type of the job is the registration job of the first registration method, the card emulation mode as the first NFC operating mode.

The rule table may define a mapping relationship between a second registration method, in which an NFC tag of the mobile device is registered via a user interface screen of the image forming apparatus, and a read mode, wherein the determining of the first NFC operating mode may include determining, when the type of the job is the registration job of the second registration method, the read mode as the first NFC operating mode.

The rule table may define a mapping relationship between at least one selected from the data cloning job, the Wi-Fi setup job, the trouble shooting job, the printing job, the scanning job, and the faxing job, and a card emulation mode, wherein the determining of the first NFC operating mode may include determining, when the type of the job is at least one selected from the data cloning job, the Wi-Fi setup job, the trouble shooting job, the printing job, the scanning job, and the faxing job, the card emulation mode as the first NFC operating mode.

The method may further include: determining, when the job is completed, a type of a subsequent job to be performed by NFC tagging of the mobile device, determining a second NFC operating mode corresponding to the determined subsequent job based on the rule table, and converting the operating mode of the NFC module from the set first NFC operating mode to the determined second NFC operating mode.

According to one or more embodiments of the disclosure, a computer readable recording medium (e.g., a non-transitory computer readable recording medium) may have embodied thereon one or more programs for executing any of the methods described herein.

According to one or more embodiments of the disclosure, an image forming apparatus supporting a near field communication (NFC) function, may include: a control unit (controller) that determines a type of a job to be performed in the image forming apparatus via NFC tagging of a mobile device and determines a first NFC operating mode corresponding to the determined type of the job from among a plurality of NFC operating modes, and an NFC module that activates the determined first NFC operating mode, wherein the control unit controls launching of the job by using the mobile device that is tagged via NFC according to the activated first NFC operating mode.

The control unit may determine the first NFC operating mode based on a rule table that defines a mapping relationship between the type of the job and the plurality of NFC operating modes.

The type of the job may include at least one selected from a registration job, an authentication job, a data cloning job, a Wi-Fi setup job, a trouble shooting job, a printing job, a scanning job, and a faxing job.

The rule table may define a mapping relationship between a first NFC authentication method using a printing application installed in the mobile device, and a card emulation mode, wherein the control unit determines, when the type of the job is the authentication job of the first NFC authentication method, the card emulation mode as the first NFC operating mode.

The rule table may define a mapping relationship between a second NFC authentication method using an NFC tag mounted in the mobile device, and a read mode, wherein the control unit determines, when the type of the job is the authentication job of the second NFC authentication method, the read mode as the first NFC operating mode.

The rule table may define a mapping relationship between a first registration method, in which the mobile device is registered by using a printing application installed in the mobile device, and a card emulation mode, wherein the control unit determines, when the type of the job is the registration job of the first registration method, the card emulation mode as the first NFC operating mode.

The rule table may define a mapping relationship between a second registration method, in which an NFC tag of the mobile device is registered via a user interface screen of the image forming apparatus, and a read mode, wherein the control unit determines, when the type of the job is the registration job of the second registration method, the read mode as the first NFC operating mode.

The rule table may define a mapping relationship between at least one selected from the data cloning job, the Wi-Fi setup job, the trouble shooting job, the printing job, the scanning job, and the faxing job, and a card emulation mode, wherein the control unit determines, when the type of the job is at least one selected from the data cloning job, the Wi-Fi setup job, the trouble shooting job, the printing job, the scanning job, and the faxing job, the card emulation mode as the first NFC operating mode.

The control unit may determine, when the job is completed, a type of a subsequent job to be performed by NFC tagging of the mobile device, and determines a second NFC operating mode corresponding to the determined subsequent job based on the rule table, wherein the set first NFC operating mode of the NFC module is converted to the determined second NFC operating mode.

BRIEF DESCRIPTION OF THE DRAWINGS

These and/or other aspects will become apparent and more readily appreciated from the following description of the embodiments, taken in conjunction with the accompanying drawings in which:

FIG. 35 illustrates a rule table that defines a mapping relationship between types of jobs and a plurality of NFC operating modes, according to an embodiment of the disclosure;

FIG. 36 illustrates an operation of setting an NFC operating mode in an image forming apparatus when performing a registration job of a first registration method, according to an embodiment of the disclosure;

FIG. 37 illustrates an operation of setting an NFC operating mode in an image forming apparatus when performing a registration job of a second registration method, according to an embodiment of the disclosure;

FIG. 38 illustrates an operation of setting an NFC operating mode in an image forming apparatus when performing an authentication job of a first NFC authentication method, according to an embodiment of the disclosure;

FIG. 39 illustrates an operation of setting an NFC operating mode in an image forming apparatus when performing an authentication job of a second NFC authentication method, according to an embodiment of the disclosure;

FIG. 40 illustrates an operation of setting an NFC operating mode in an image forming apparatus and another image forming apparatus when performing a data cloning job, according to an embodiment of the disclosure;

FIG. 45 is a flowchart of a method of converting an NFC operating mode of an image forming apparatus when a subsequent job is performed after a previous job is performed, according to an embodiment of the disclosure.

DETAILED DESCRIPTION

Figure 1:
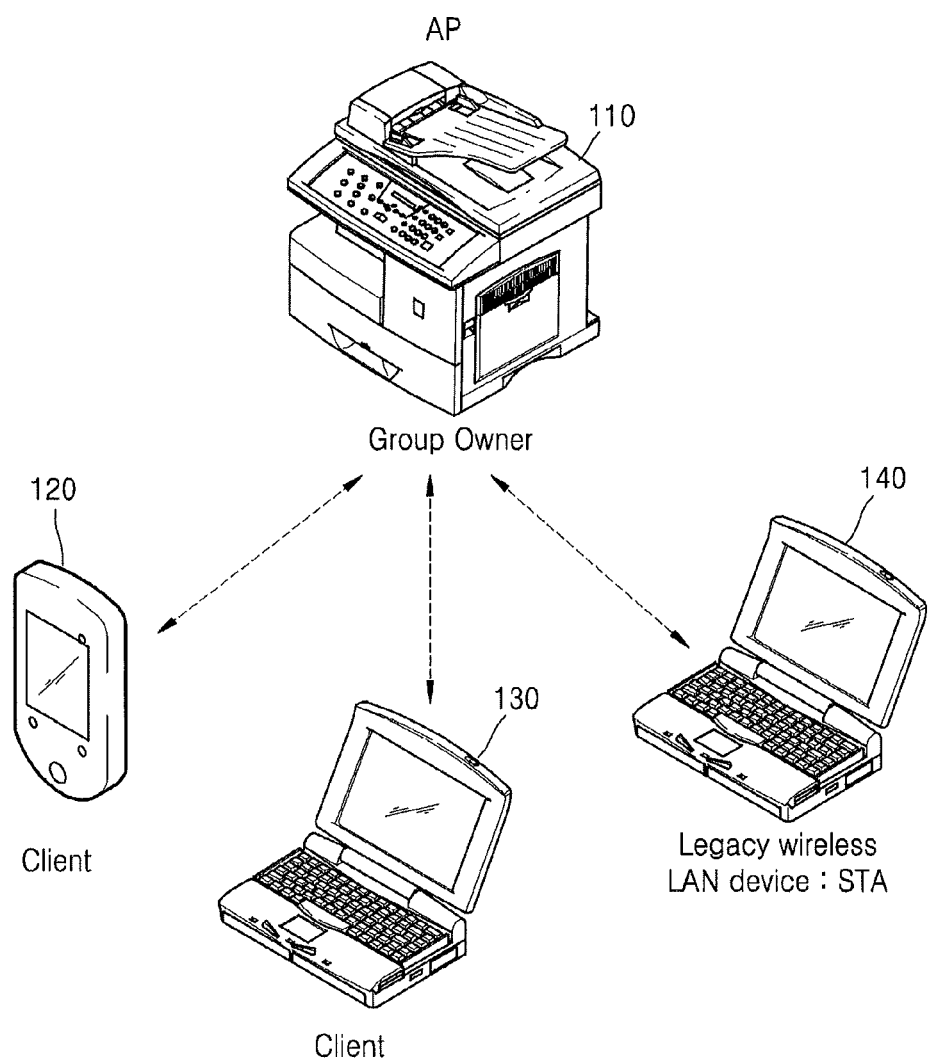
FIG. 1 is a diagram illustrating devices supporting Wi-Fi Direct and legacy wireless local area network (WLAN) devices that are wirelessly connected to each other to form a wireless network according to an embodiment of the present general inventive concept.

Reference will now be made in detail to embodiments of the disclosure, examples of which are illustrated in the accompanying drawings, wherein like reference numerals refer to like elements throughout. The embodiments are described below in order to explain the disclosure while referring to the figures. Expressions such as "at least one of," when preceding a list of elements, modify the entire list of elements and do not modify the individual elements of the list.

Hereinafter, the disclosure will be described in detail with reference to the attached drawings below based on examples that are provided for illustration purposes, without limiting the disclosure. It is apparent to one of ordinary skill in the art that the following embodiments of the disclosure are to explain aspects of the disclosure but do not limit or define the scope of the disclosure. Details that are derivable by one of ordinary skill in the art to which the disclosure pertains based on the detailed description and example embodiments of the disclosure are construed as being in the scope of the disclosure.

In the disclosure, the terms such as "comprise" or "include" should not be construed as necessarily including various elements or processes described in the specification, and it should be construed that some of the elements or the processes may not be included, or additional elements or processes may be further included.

In the disclosure, terms including ordinal numbers such as 'first', 'second', etc. are used to describe various elements but the elements should not be defined by these terms. The terms are used only for distinguishing one element from another element.

Hereinafter, a multi-function printer (MFP) that supports Wi-Fi Direct will be described as an example of an image forming apparatus supporting a peer-to-peer (P2P) connection. However, the scope of the present general inventive concept to be protected is not limited thereto, but is defined by descriptions of claims.

Before describing embodiments of the present general inventive concept, a basic connections and operations of an MFP that supports the Wi-Fi Direct will be described with reference to accompanying drawings.

FIG. 1 is a diagram illustrating wireless local area network (WLAN) devices supporting Wi-Fi Direct and a legacy WLAN device connecting to each other to form a wireless network according to an embodiment of the present general inventive concept. Referring to FIG. 1, an MFP 110 supporting the Wi-Fi Direct is wirelessly connected to a smartphone 120 supporting the Wi-Fi Direct, a laptop computer 130 supporting the Wi-Fi Direct, and a legacy WLAN laptop computer 140. Here, the legacy WLAN laptop computer 140 denotes a conventional laptop computer which adopts a WLAN technology and does not support the Wi-Fi Direct.

The WLAN device supporting the Wi-Fi Direct (hereinafter, referred to as "Wi-Fi Direct device") may perform a P2P connection without using an infrastructure network, unlike conventional devices supporting Wi-Fi. According to the conventional Wi-Fi technology, a Wi-Fi device is wirelessly connected to a router, that is, an access point (AP) connected to an infrastructured network that is configured in advance in order to form a wireless network. Here, the Wi-Fi devices, which are wirelessly connected to the AP of the infrastructure network, function as stations. However, according to Wi-Fi Direct technology, one of the Wi-Fi Direct devices that are to form a wireless network may operate as an AP of a Wi-Fi Direct network, and the other Wi-Fi Direct devices are wirelessly connected to the Wi-Fi Direct device that operates as the AP such that the other Wi-Fi Direct devices operate as stations. Therefore, the wireless network may be formed between the Wi-Fi direct devices without the AP connected to the infrastructured network. In addition, when the wireless network is formed between the Wi-Fi direct devices, the legacy WLAN devices, such as the Wi-Fi devices, may recognize that the Wi-Fi direct device operates as an AP and may be wirelessly connected to the Wi-Fi direct device.

Referring to FIG. 1, the Wi-Fi Direct MFP 110, the Wi-Fi Direct smartphone 120, and the Wi-Fi Direct laptop computer 130 that are the Wi-Fi direct devices form a wireless network without an AP connected to the infrastructured network. As described above, the Wi-Fi direct devices may be wirelessly connected to each other to form a P2P group without an AP connected to the infrastructured network. Here, the Wi-Fi Direct MFP 110 operates as the AP, and the device operating as the AP among the Wi-Fi direct devices is referred to as a group owner (GO) of a P2P group. In addition, the Wi-Fi smartphone 120 and the Wi-Fi Direct laptop computer 130 are wirelessly connected to the GO, that is, the Wi-Fi Direct MFP 110, to operate as the stations, which are referred to as clients. On the other hand, the legacy WLAN laptop computer 140 that does not support the Wi-Fi Direct recognizes that the GO, that is, the Wi-Fi Direct MFP 110, as the AP, and is wirelessly connected to the GO to be connected to the wireless network formed by the Wi-Fi direct devices.

Although FIG. 1 illustrates the Wi-Fi Direct MFP 110 to operate as the GO, any one of the other Wi-Fi direct devices, that is, the smartphone 120 and the laptop computer 130, may operate as the GO and the MFP 110 may operate as the client. A determination of which of the Wi-Fi direct devices becomes the GO can be made through a negotiation process in Wi-Fi direct connection processes, and this will be described in detail later. Meanwhile, the Wi-Fi direct device may be the GO by itself before the connection without any negotiation with other Wi-Fi Direct device, and the Wi-Fi direct device in this case is referred to as an autonomous group owner (AGO). In addition, a wireless network formed based on the AGO is referred to as an autonomous P2P group. When the autonomous P2P group is formed, the legacy WLAN device may recognize the AGO as an AP connected to the infrastructure network and may be connected to the AGO.

Although FIG. 1 illustrates an example in which the Wi-Fi direct devices form the P2P group without the AP connected to the infrastructured network, the Wi-Fi direct devices may operate as the stations by connecting to the AP, if the AP is connected to the infrastructured network.

Hereinafter, wireless connecting processes between the Wi-Fi direct devices and characteristics of the Wi-Fi Direct technology will be described with reference to the accompanying drawings. For convenience of description, an MFP supporting the Wi-Fi Direct (hereinafter, referred to as "Wi-Fi Direct MFP") will be described as an example; however, the present general inventive concept is not limited thereto, that is, embodiments of the present general inventive concept may be applied to printers, scanners, or facsimiles supporting the Wi-Fi Direct. In addition, the Wi-Fi Direct is used as an example of the P2P communication method; however, other P2P communication methods, such as Bluetooth and Zigbee, may be used within the applicable range of the present general inventive concept.

Figure 2:
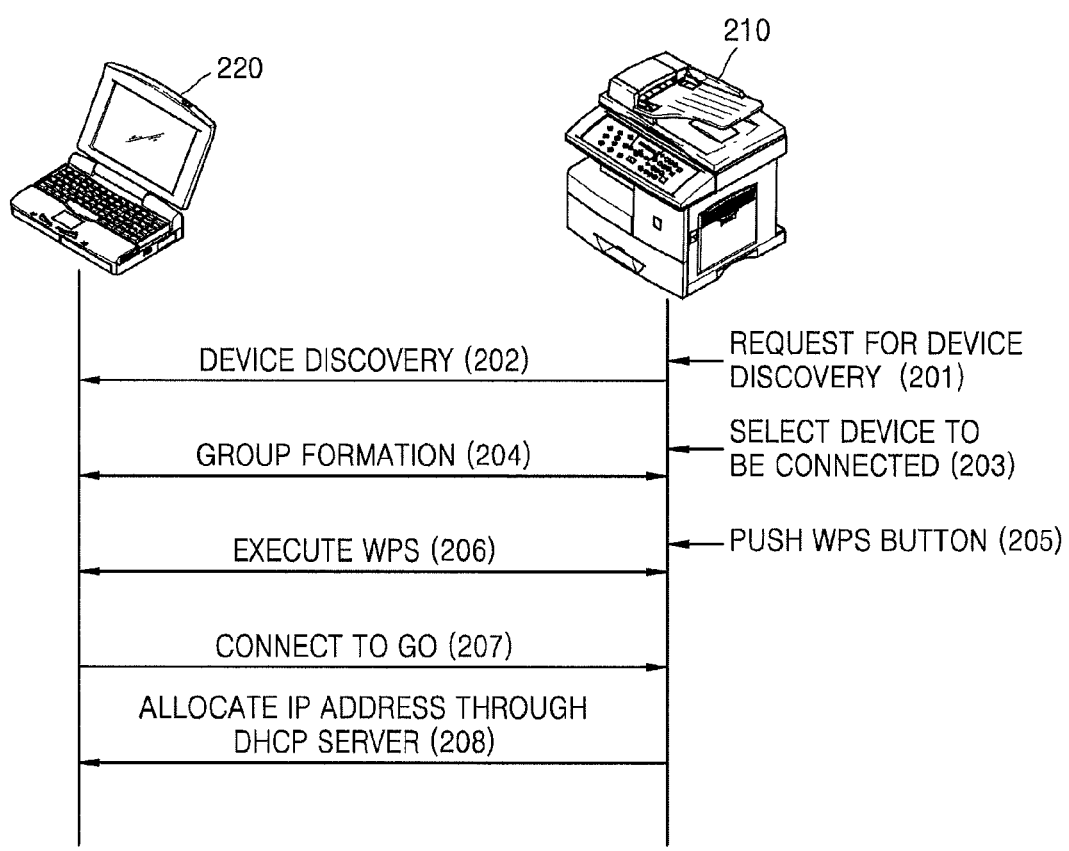
FIG. 2 is a diagram illustrating processes of wirelessly connecting the devices supporting the Wi-Fi Direct to each other according to an embodiment of the present general inventive concept.

FIG. 2 is a diagram illustrating processes of wirelessly connecting Wi-Fi Direct devices to each other. The processes of Wi-Fi Direct connection between a Wi-Fi Direct MFP 210 and a Wi-Fi Direct laptop computer 220 are illustrated hereinafter. The Wi-Fi Direct connecting processes may be divided as a device discovery process, a group formation process, and a secure connection process. Referring to FIG. 2, the Wi-Fi Direct MFP 210 receives a request for a device discovery from a user, and searches for a Wi-Fi Direct device around the Wi-Fi Direct MFP 210 at operation 202. The device discovery request may be input through a user interface of the MFP 210, for example, a user interface realized on a display unit, such as a liquid crystal display (LCD), formed in the MFP 210. If it is determined as a result of searching that there is a Wi-Fi Direct device around the MFP 210, the MFP 210 shows the user the searched device through the display unit and receives a connection request 203 from the user. The connection request 203 may be also input through the display unit of the MFP 210 from the user, for example, the user may push buttons or a touch panel of the display unit. If there are a plurality of Wi-Fi Direct devices, the MFP 210 displays a list of the searched Wi-Fi direct devices on the display unit so that the user may select one of the Wi-Fi direct devices and request the connection to the selected Wi-Fi direct device.

After receiving the connection request at operation 203, a group formation is performed between the Wi-Fi Direct devices to be connected at operation 204. The group formation process determines the Wi-Fi Direct devices to be connected to each other and determines the Wi-Fi direct devices to be the GO or the clients in the group. The Wi-Fi Direct device to be the GO is determined through the negotiation between the Wi-Fi Direct devices, and the negotiation will be described in detail with reference to FIG. 4.

When the group is formed, the devices included in the group are to be securely connected to each other by using a Wi-Fi protected setup (WPS) technology. The WPS denotes a function of performing simple secure connection between the Wi-Fi supporting devices. The WPS may be classified as a personal identification number (PIN) type WPS and a push button configuration (PBC) type WPS. The PIN type WPS sets the secure connection by inputting a PIN code that is set in advance, and the PBC type WPS sets the secure connection by pushing a WPS button that is provided on the Wi-Fi Direct device.

Hereinafter, the PBC type WPS will be described as an example. The user pushes a WPS button provided on the MFP 210 to request the secure connection at operation 205. In addition, within a predetermined period of time (for example, 120 seconds), the secure connection may be achieved by pushing a WPS button formed on the laptop computer 220, or a WPS button realized on an application program for Wi-Fi Direct connection in the laptop computer 220. The WPS button realized on the application program for the Wi-Fi Direct connection in the laptop computer 220 may be an object represented on a display unit of the laptop computer 220 by the application program for the Wi-Fi Direct connection. A detailed example of the WPS button is represented as reference numeral 510 in FIG. 5. The user clicks the WPS button represented on the display unit of the laptop computer 220 by using a mouse, for example, to request the secure connection. When the secure connection is requested by pushing the WPS button, the device that is determined to be the GO in the group formation process transmits secure information to devices determined as the clients at operation 206. According to the Wi-Fi Direct, the secure connection is executed after encrypting in a Wi-Fi protected access 2 (WPA2)-pre-shared key (PSK) method, and thus, the Wi-Fi Direct may have a higher security function than that of a conventional wired equivalent privacy (WEP) or Wi-Fi protected access (WAP) method.

When the WPS is executed, the Wi-Fi direct device that is the client is connected to the Wi-Fi direct device that is the GO at operation 207. At this time, the Wi-Fi Direct device that is the GO automatically allocates an Internet protocol (IP) address to the Wi-Fi direct device that is the client by using a dynamic host configuration protocol (DHCP) server at operation 208, and then, the P2P connection between the Wi-Fi Direct devices is completed.

Basic processes for connecting the Wi-Fi direct devices have been described so far, and detailed processes and characteristics of the Wi-Fi Direct technology will be described with reference to the accompanying drawings as follows.

Figure 3:
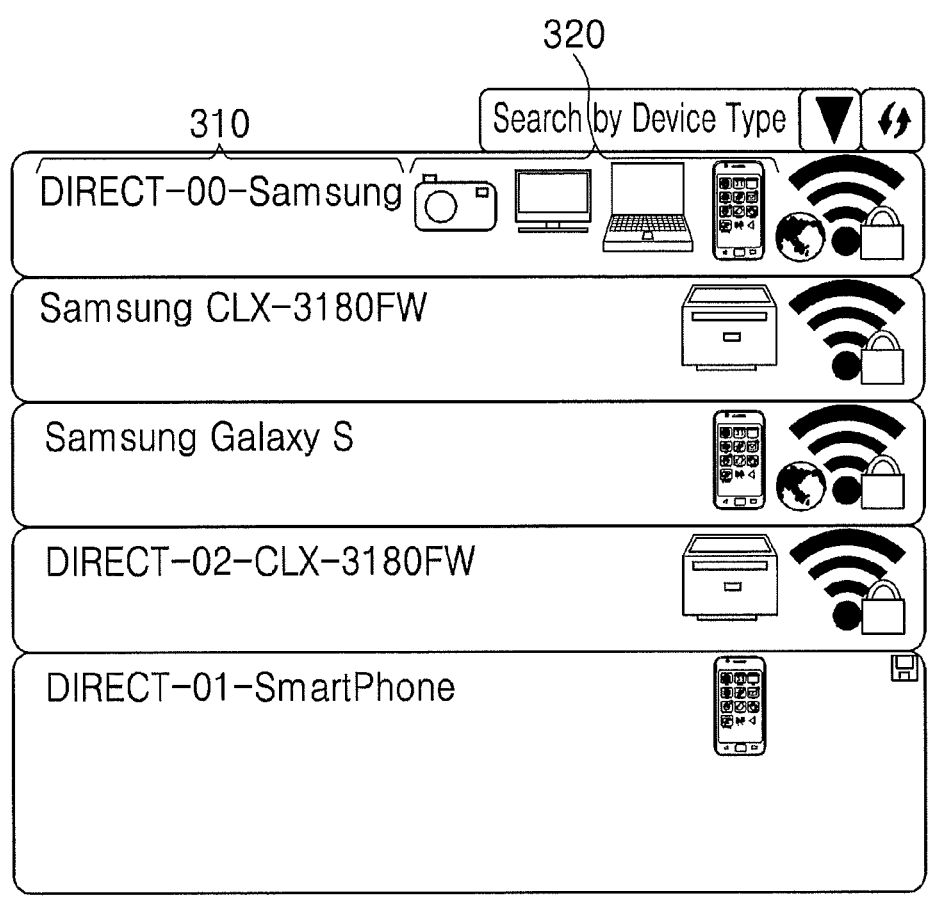
FIG. 3 is a diagram illustrating an example of displaying a list of Wi-Fi Direct devices that are found after a device discovery process performed by a device supporting the Wi-Fi Direct.

FIG. 3 is a diagram illustrating an example of displaying a list of the Wi-Fi Direct devices that are searched in the device discovery process in the Wi-Fi Direct device. When the device discovery process is performed by the Wi-Fi direct device, device information, such as a type of the device and a service set identifier (SSID) of the device, is exchanged between the devices through a probe request and a probe response that are WLAN packets, and the Wi-Fi direct device that performs the device discovery process displays the collected information. As shown in FIG. 3, the SSIDs and the types of the searched Wi-Fi Direct devices are represented as text or icons. Here, all of the searched devices may be represented in the list; however, the devices may be filtered so that the devices of a desired type may be only displayed in the list. According to the Wi-Fi Direct technology, the Wi-Fi direct devices are defined in category units. The Wi-Fi Direct devices may be classified as categories, for example, computers, input devices, printers, scanners, facsimiles, copying machines, and cameras, and each of the categories is divided into sub-categories. For example, the computer may be classified as personal computers (PCs), servers, laptop computers, and the like.

Figure 4:
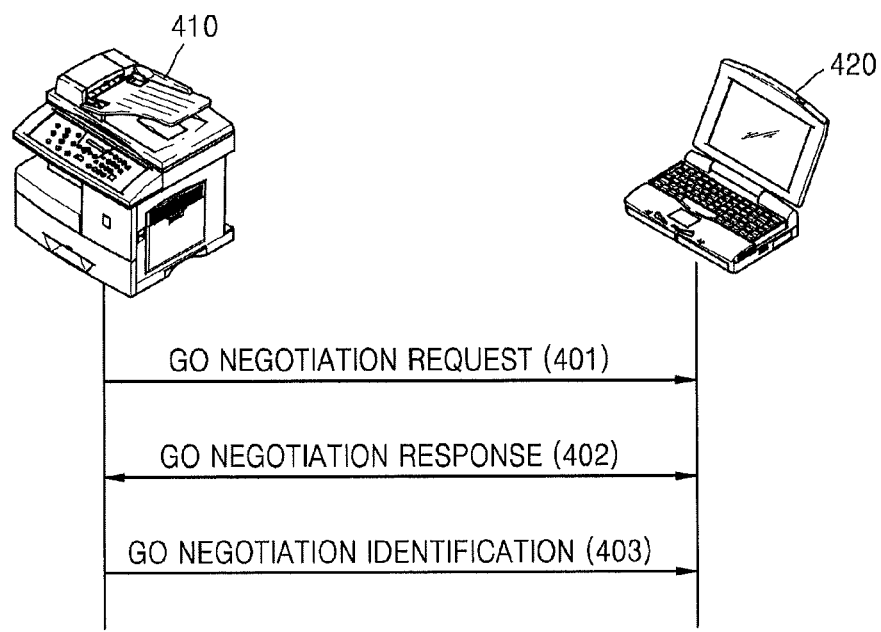
FIG. 4 is a diagram illustrating a group formation process in the processes of connecting the Wi-Fi Direct supporting devices to each other according to an embodiment of the present general inventive concept.

FIG. 4 is a diagram illustrating the group formation process in detail among the connecting processes between the Wi-Fi Direct devices. The group formation process is a process of determining the Wi-Fi Direct devices that are to form a network, and the Wi-Fi Direct devices to be the GO and the clients. For example, when the Wi-Fi direct MFP 410 performs the device discovery and selects a laptop computer 420 among the discovered Wi-Fi Direct devices to be connected, the MFP 410 transmits a GO negotiation request to the laptop computer 420 at operation 401. The laptop computer 420 receiving the GO negotiation request compares an intent value thereof with that of the MFP 410, and then, determines the MFP 410 as the GO when the intent value of the MFP 410 is greater than that of the laptop computer 420 and determines the laptop computer 420 as the GO when the intent value of the laptop computer 420 is greater than that of the Wi-Fi direct MFP 410. Here, the intent value is a value representing a degree of task intent in each device, and is determined according to a design or user preference and setting. The intent value of the device, which is always supplied power, may be set to be relatively high. As described above, after determining the Wi-Fi Direct device to be the GO by comparing the intent values, the laptop computer 420 transmits the determination result to the MFP 410 as a response to the GO negotiation at operation 402. The MFP 410 that receives the determination result transmits an acknowledgement to the laptop computer 420 at operation 403 in order to verify the receipt of the negotiation, and then, the group formation process is finished. When the group formation is completed, the Wi-Fi Direct device that is the GO manages secure information and SSIDs of the other Wi-Fi Direct devices included in the group.

Figure 5:
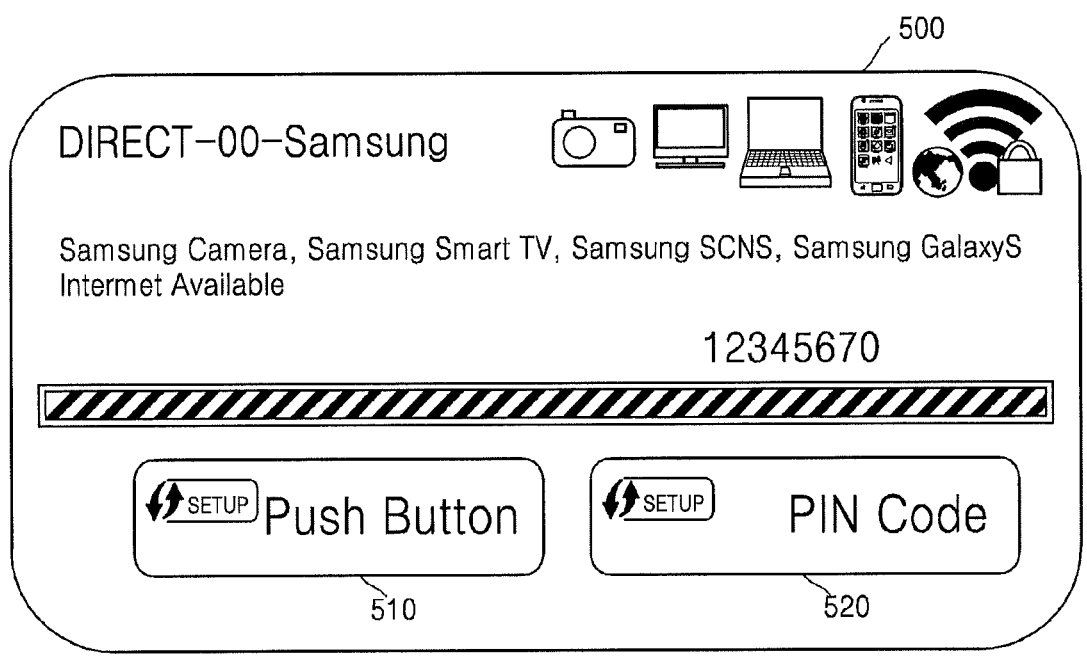
FIG. 5 is a diagram illustrating a display screen to execute WPS according to an embodiment of the present general inventive concept.

When the group is formed, the Wi-Fi Direct devices included in the group are securely connected to each other through the WPS. FIG. 5 is a diagram illustrating a display screen 500 to provide an interface to a user to execute the WPS. The display screen 500 of FIG. 5 may be displayed on a display unit of the Wi-Fi Direct MFP. Referring to FIG. 5, the user may select one of a WPS button 510 and a PIN code 520 to execute the WPS. When the WPS is executed through the WPS button 510, the WPS button 510 of the Wi-Fi Direct MFP is pushed and WPS buttons of other devices are pushed within a predetermined period of time, and then, secure information is exchanged between the devices automatically and the secure connection is made. Here, the Wi-Fi Direct device that is the GO provides secure information to the Wi-Fi direct devices that are the clients. In addition, the secure connection is performed after encrypting in the WPA2-PSK verification method, and thus, high security may be achieved.

Figure 6:
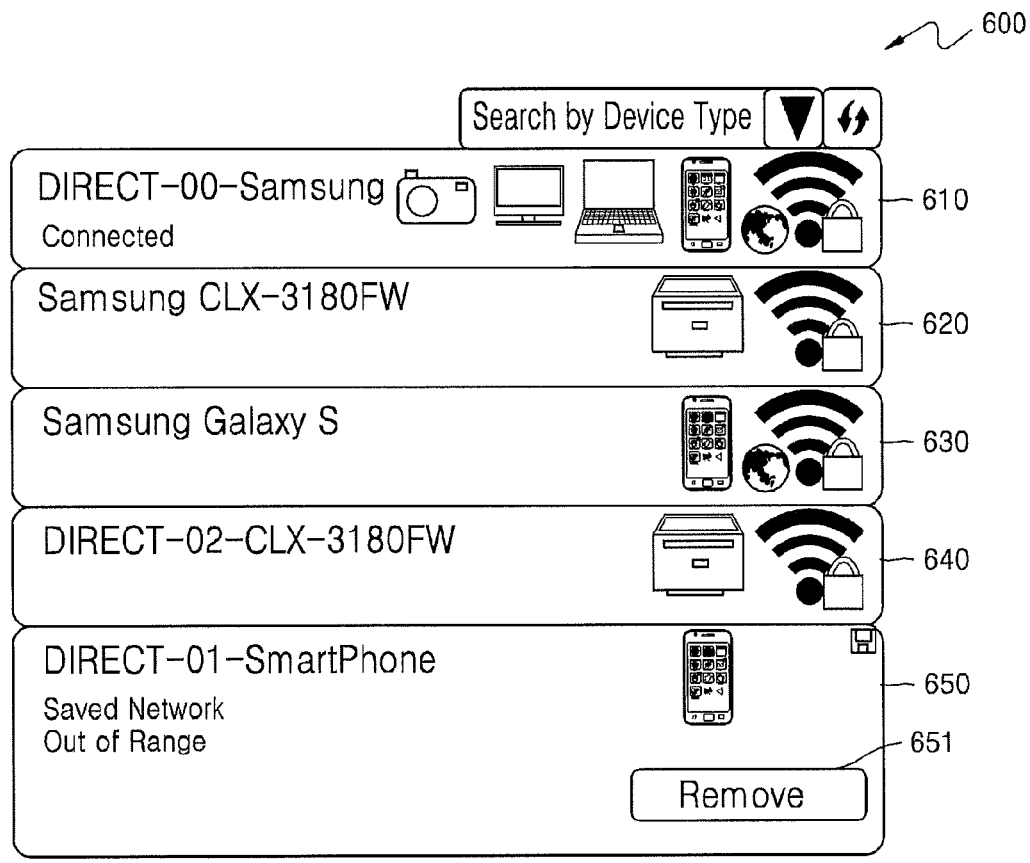
FIG. 6 is a diagram illustrating a list of devices supporting Wi-Fi Direct and information of which is stored according to a profile storing function.

The Wi-Fi Direct devices have a profile storage function that is for storing information of the Wi-Fi Direct devices connected once thereto. FIG. 6 is a diagram illustrating a list of the Wi-Fi Direct devices with information of which is stored according to the profile storage function. The list of FIG. 6 is a screen displayed on the display unit of the Wi-Fi Direct MFP. Information of a first list 610 denotes a Wi-Fi Direct device currently connected to the Wi-Fi Direct MFP, information of second through fourth lists 620-640 denotes Wi-Fi Direct devices that are not currently connected to the Wi-Fi Direct MFP, but are included in a device discovery range of the Wi-Fi Direct MFP, and information of a fifth list 650 denotes a Wi-Fi Direct device that has been connected at least once to the Wi-Fi Direct device although that is not discovered currently. If the information of the fifth list 650 is not necessary, the user may delete the fifth list 650 by pushing a remove button 651. Since the Wi-Fi direct device has the profile storage function as described above, the Wi-Fi Direct device stores information of the other Wi-Fi Direct devices connected at least once thereto, and then, may be connected in a high speed and/or in a short period of time without executing the WPS by using the stored information in a case where the same device attempts to connect thereto again.

Figure 7:
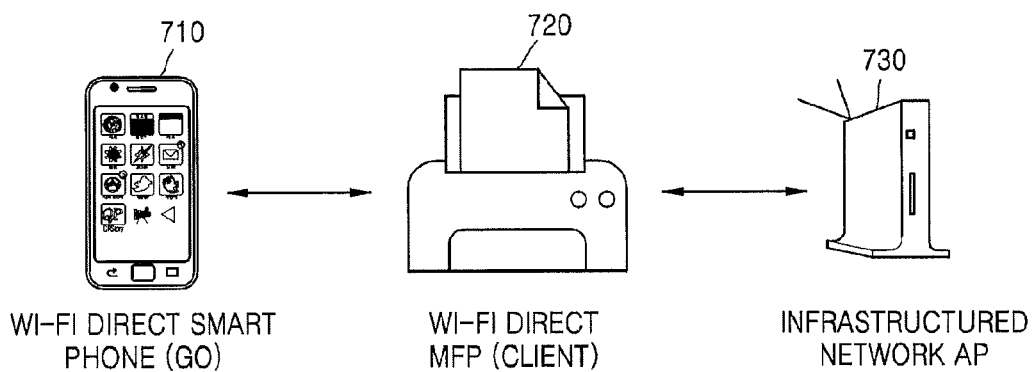
FIG. 7 is a diagram illustrating Wi-Fi Direct supporting devices that are simultaneously connected to each other according to an embodiment of the present general inventive concept.

The Wi-Fi Direct device may be P2P connected to another Wi-Fi direct device, and at the same time, may be connected to the infrastructured network, which is referred to as a concurrent connection. FIG. 7 is a diagram illustrating the Wi-Fi Direct devices that are in the concurrent connection states. Referring to FIG. 7, the Wi-Fi direct MFP 720 is P2P connected to a smartphone 710 that is another Wi-Fi direct device, and at the same time, the Wi-Fi Direct MFP 720 is also connected to an AP 730 of the infrastructured network. The Wi-Fi Direct MFP 720 may directly transmit/receive print data to/from the smartphone 710, and at the same time, may directly transmit/receive print data to/from the infrastructured network through the AP 730 of the infrastructured network.

When the Wi-Fi direct device is concurrently connected to the Wi-Fi Direct device and the infrastructured network as shown in FIG. 7, or when the Wi-Fi Direct device is wired connected to the infrastructured network and P2P connected to another Wi-Fi direct device, different IP addresses and MAC addresses with respect to the connections, that is, the connection to the infrastructured network and the connection to the another Wi-Fi Direct device, may be used. Through a multi-homing technology, the Wi-Fi Direct device may provide the devices with different services from each other. For example, the Wi-Fi Direct MFP may provide services of all functions of the MFP through an interface connected to the infrastructured network; however, the Wi-Fi Direct MFP may provide services of partial functions of the MFP through an interface connected to another Wi-Fi Direct device.

Figure 8:
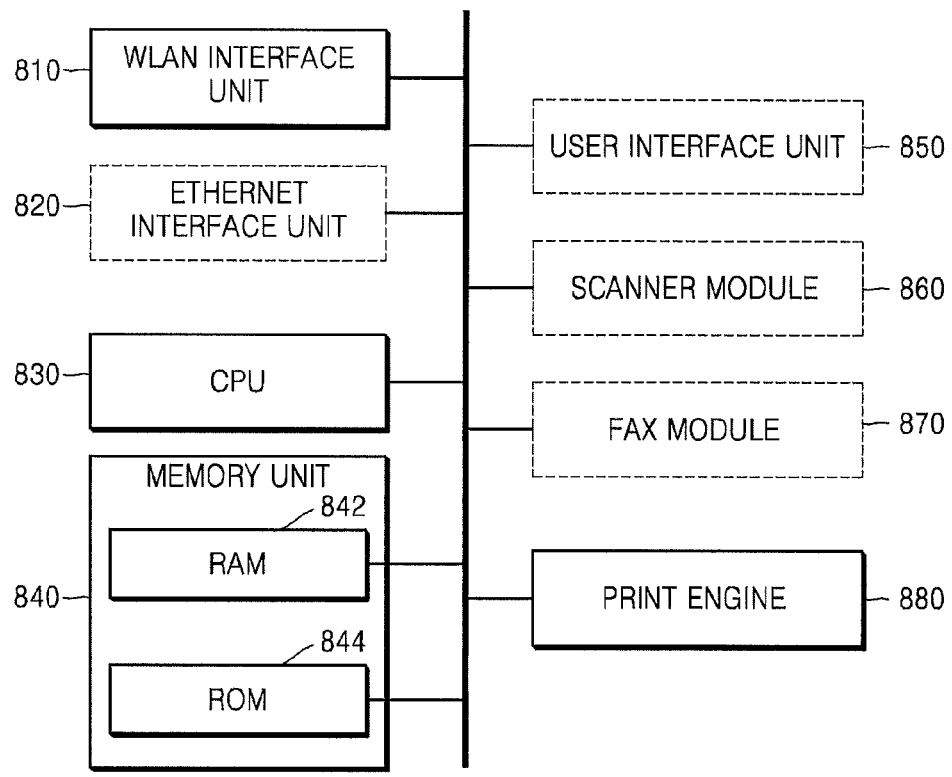
FIG. 8 is a block diagram illustrating a hardware configuration of a multi-function printer supporting the Wi-Fi Direct according to an embodiment of the present general inventive concept.

FIG. 8 is a block diagram illustrating a hardware configuration of the Wi-Fi Direct MFP. Referring to FIG. 8, the Wi-Fi Direct MFP may include a WLAN interface module 810, an Ethernet interface module 820, a central processing unit or a processing unit (CPU) 830, a memory unit 840, a user interface module 850, a scanner module 860, a fax module 870, and a print engine 880. The memory unit 840 may include a random access memory (RAM) 842 and a read only memory (ROM) 844. The memory unit 840 may include one or more semiconductor chips or one or more semiconductor chip packages in which a plurality of semiconductor chips are mounted on a substrate thereof. If the MFP only supports the WLAN, the MFP may not include the Ethernet interface module 820. In addition, if the device is a printer, rather than the MFP, the scanner module 860 and the fax module 870 are not necessary.

The WLAN interface module 810 is hardware to perform an IEEE 802.11 b/g/n function, and may communicate with a main board, on which the CPU 830 is mounted, of the MFP via a universal serial bus (USB). The Ethernet interface module 820 is hardware to perform wired Ethernet communication according to IEEE 802.3. The CPU 830 controls overall operations of the MFP. The memory unit 840 stores information to control the MFP and the print data to be read if necessary. The user interface module 850 functions as a medium for the user to identify information of the MFP and to input commands into the MFP. The user interface module 850 may be variously modified according to products, for example, may be configured as two or four lines displayed on a display unit, such as an LCD or a light emitting diode (LED), or may be realized as a graphic user interface (UI) so as to represent various graphics. The scanner module 860, the fax module 870, and the print engine 880 are hardware to perform functions of a scanner, a facsimile, and a printer. The print engine 880 may include electrical and mechanical components to print an image on a print medium according to the data stored in the memory unit 840 or received from an external wireless device through the WLAN and/or Wi-Fi-Direct.

Figure 9:
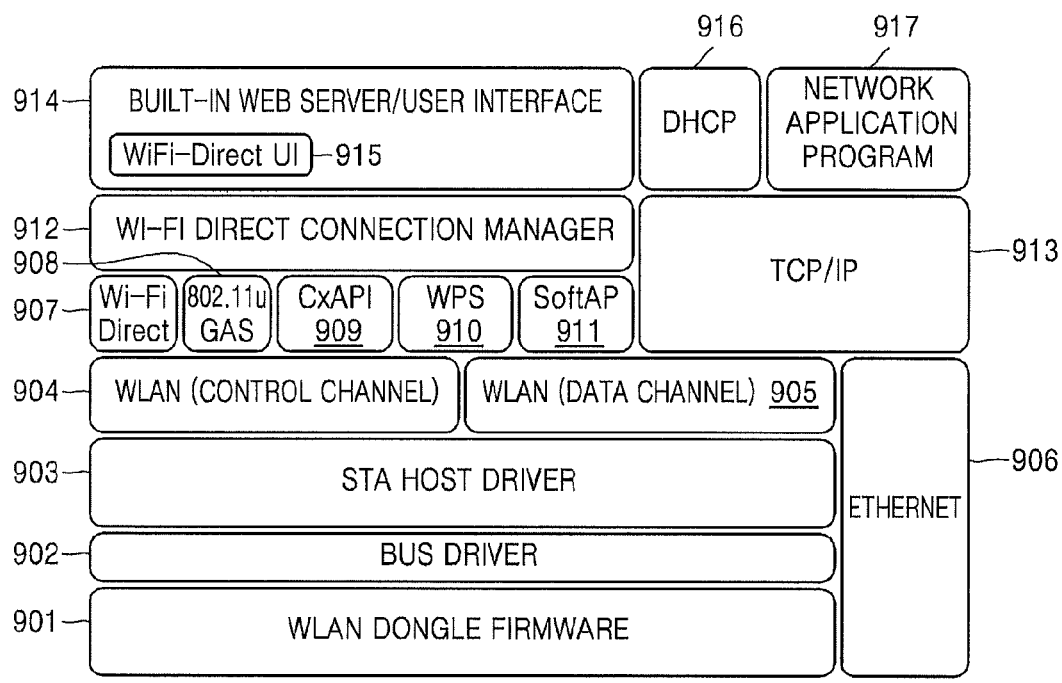
FIG. 9 is a block diagram illustrating a software program configuration of the multi-function printer supporting the Wi-Fi Direct of FIG. 8 according to an embodiment of the present general inventive concept.

FIG. 9 is a block diagram illustrating a software program configuration of the Wi-Fi Direct MFP. The configuration of the software program in the Wi-Fi Direct MFP will be described with reference to FIG. 9 as follows.

A WLAN dongle firmware 901 is firmware to connect the WLAN, and may be stored in WLAN dongle hardware or may be transmitted to the WLAN dongle hardware from a main board of the MFP when booting the MFP. A bus driver 902 and a STA (station) host driver 903 are low level bus drivers to communicate with the WLAN hardware. A WLAN controlling channel 904 and a WLAN data channel 905 are channels to communicate with the WLAN firmware. A Wi-Fi Direct module 907 performs the Wi-Fi Direct connection and transmits an operating command to the WLAN firmware. An IEEE 802.11u generic advertisement service (GAS) module 908 performs functions according to IEEE 802.11u GAS, a module 909 performs functions relating to CxAPI, and a WPS module 910 performs a WPS function. A soft AP module 911 is a software program module to allow the MFP to perform as the AP. A transmission control protocol (TCP)/IP 913 is a standard protocol for network transmission. A Wi-Fi Direct connection manager 912 is a module to control the Wi-Fi Direct connection. A Wi-Fi Direct user interface 915 allows the user to perform settings related to the Wi-Fi Direct, and may be included in a user interface 914 that is installed in an embedded web server (EWS). A DHCP server 916 automatically allocates an IP address to the Wi-Fi Direct device that is connected as a client. A network application program 917 performs various application operations relating to the network.

The above-described Wi-Fi Direct technology provides the Wi-Fi Direct device and/or the devices of the wireless network with the following advantages:

A Wi-Fi Direct device may be connected to other devices whenever and wherever, and thus, the Wi-Fi Direct device has maximum mobility and portability. If a new Wi-Fi Direct device is added, the Wi-Fi Direct device may be directly connected to the new Wi-Fi direct device. In addition, it may be identified whether there is an available device or service before setting the connection to other devices, and thus, the Wi-Fi direct devices may be conveniently used. In addition, the connection may be performed simply and stably by a simple operation, for example, pushing a WPS button, and the connection may be performed with highly secure functions by using WPA2 technology.

In addition, the Wi-Fi Direct technology may provide various functions in addition to functions provided by the conventional WLAN technology.

For example, the device discovery function to search for peripheral Wi-Fi Direct devices by a device type unit, the service discovery function that may search for services provided by the peripheral Wi-Fi Direct devices, a power management function that may effectively use electric power, the concurrent connection function that may form the P2P connection between the Wi-Fi Direct devices while connecting to a conventional infrastructured network, a function of separating a security domain between the infrastructured network connection and the Wi-Fi Direct connection, and a cross connection function to share an Internet connection may be provided by the Wi-Fi Direct technology.

In addition, since the Wi-Fi Direct technology is based on the conventional WLAN technology, that is, IEEE 802.11, the Wi-Fi Direct devices may be compatible with conventional legacy WLAN devices.

Hereinafter, a method of activating Wi-Fi Direct, a method of performing image forming operations, a method of managing channels, and a method of changing a WLAN mode in an MFP supporting Wi-Fi Direct will be described in detail with reference to the accompanying drawings.

As illustrated in the description with reference to FIG. 7, the MFP supporting Wi-Fi Direct supports the concurrent connection function, that is, may be connected to the infrastructured network and P2P connected to a wireless terminal supporting Wi-Fi Direct. The concurrent connection function is very useful in a situation where the MFP is connected to an AP of the infrastructured network and at the same time, a print operation has to be performed by using wireless devices that are not connected to the AP. The wireless devices that are not connected to the AP may be connected to the MFP by using an ad-hoc function in order to use a wireless printing service; however, if one MFP is connected to the infrastructured network, the MFP may not simultaneously use the ad-hoc function.

Detailed operation methods of performing image forming operations, such as a printing or scanning operation, by using the wireless devices that are P2P connected to the MFP via Wi-Fi Direct when the MFP uses the concurrent connection function, managing channels used to connect to the infrastructured network and to connect the Wi-Fi Direct, and changing an operation mode between the Wi-Fi Direct mode and the ad-hoc operation mode are to be provided.

First, a method of activating Wi-Fi Direct so that the MFP supporting Wi-Fi Direct functions as an AGO will be described below.

Figure 10:
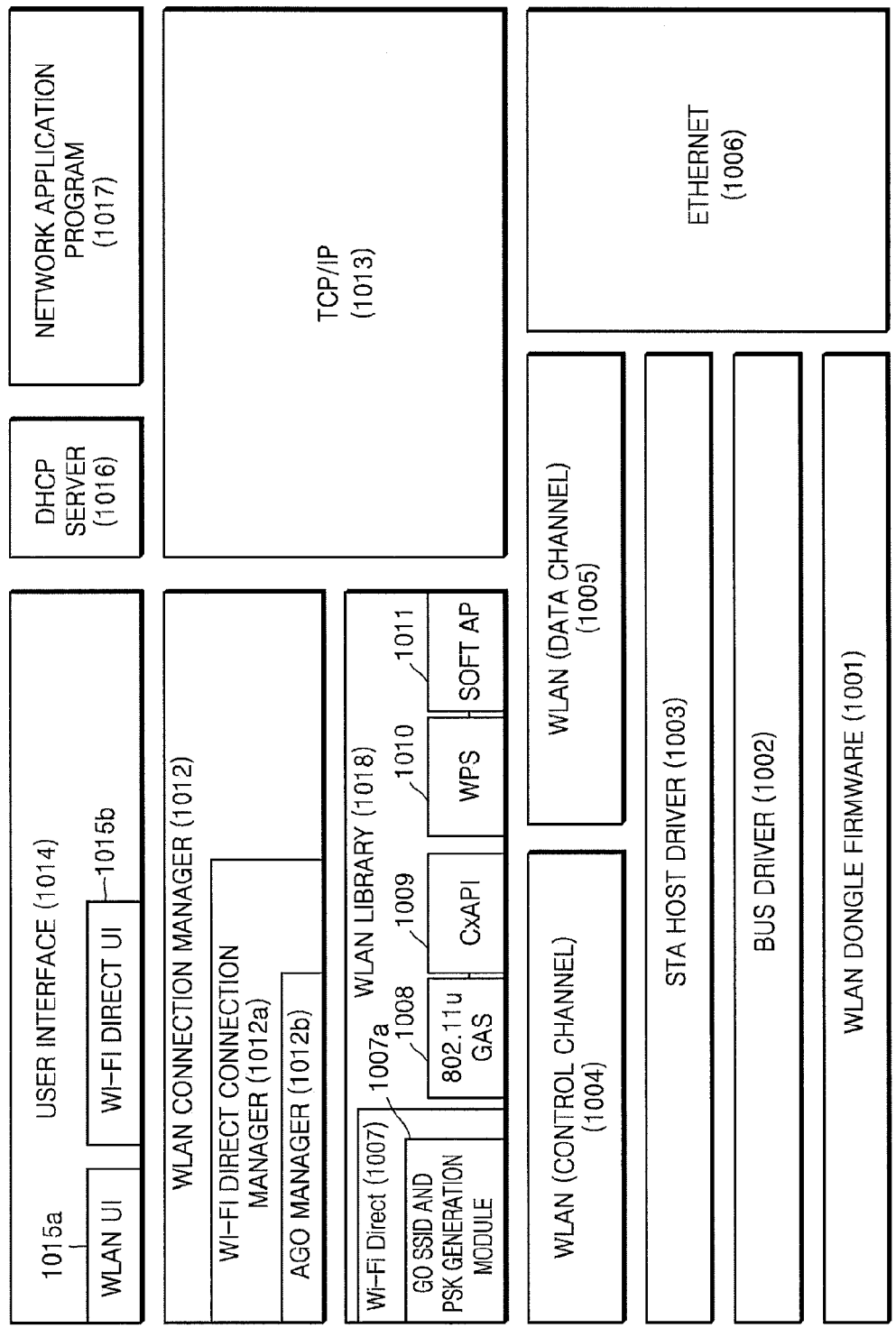
FIG. 10 is a detailed block diagram illustrating a software program configuration of a multi-function printer supporting the Wi-Fi Direct according to an embodiment of the present general inventive concept.

FIG. 10 is a block diagram illustrating a software program configuration of an MFP supporting Wi-Fi Direct according to an embodiment of the present invention. FIG. 10 illustrates an AGO 1012b included in a Wi-Fi Direct connection manager 1012a to make the MFP supporting Wi-Fi Direct perform as an AGO. Also, a GO SSID and PSK generation module 1007a included in a Wi-Fi Direct library 1007 generates an SSID and a PSK that are necessary when the MFP functions as the AGO.

FIG. 10 also illustrates similar features to those of FIG. 9. For example, a WLAN dongle firmware 1001 is firmware for connecting the WLAN, and may be stored in WLAN dongle hardware or may be transmitted to the WLAN dongle hardware from a main board of the MFP when booting the MFP. A bus driver 9102 and a STA (station) host driver 1003 are low level bus drivers for communicating with the WLAN hardware. A WLAN controlling channel 1004 and a WLAN data channel 1005 are channels for communicating with the WLAN firmware. A Wi-Fi Direct module 1007 performs the Wi-Fi Direct connection and transmits an operating command to the WLAN firmware. An IEEE 802.11u generic advertisement service (GAS) module 1008 performs functions according to IEEE 802.11u GAS, a module 1009 performs functions relating to CxAPI, and a WPS module 1010 performs a WPS function. A soft AP module 1011 is a software module allowing the MFP to perform as the AP. A transmission control protocol (TCP)/IP 1013 is a standard protocol for network transmission. A Wi-Fi Direct connection manager 1012 is a module for controlling the Wi-Fi Direct connection. A Wi-Fi Direct user interface 1015 allows the user to perform settings related to the Wi-Fi Direct, and may be included in a user interface 1014 that is installed in an embedded web server (EWS). A DHCP server 1016 automatically allocates an IP to the Wi-Fi Direct device that is connected as a client. A network application program 1017 performs various application operations relating to the network.

Figure 11:
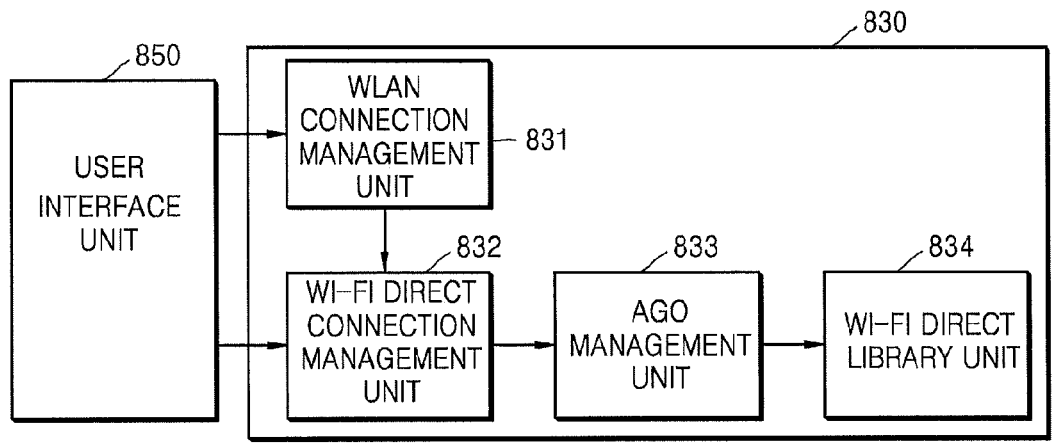
FIG. 11 is a detailed block diagram illustrating the multi-function printer supporting the Wi-Fi direct according to the embodiment of the present general inventive concept.

FIG. 11 is a detailed block diagram illustrating an MFP supporting Wi-Fi Direct according to the embodiment of the present general inventive concept. FIG. 11 illustrates a basic structure of the MFP supporting Wi-Fi Direct. The CPU 830 of FIG. 8 includes a WLAN connection manager 831, a Wi-Fi Direct connection manager 832, an AGO manager 833, and a Wi-Fi Direct library unit 834. The Wi-Fi Direct connection manager 832 receives a Wi-Fi Direct initialization command from the WLAN connection manager 831 from a user via the user interface module 850, and then, the Wi-Fi Direct connection manager 832 turns a GO flag on. The AGO manager 833 identifies the GO flag, and when the GO flag is in a turned on state, the AGO manager 833 activates Wi-Fi Direct so that the MFP performs as a GO. The Wi-Fi Direct library unit 834 generates an SSID and a PSK of the GO according to a command of the AGO manager 833.

Figure 12:
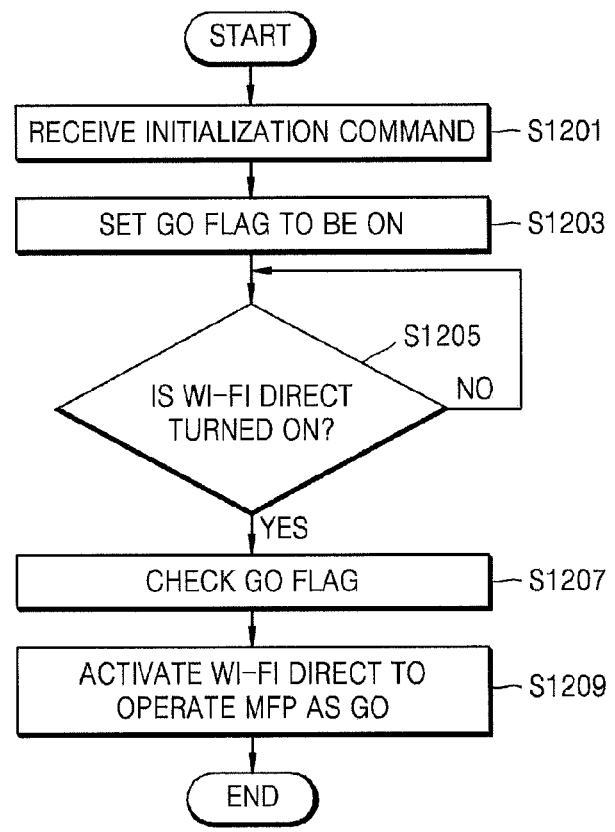
FIGS. 12, 13A, and 13B are flowcharts illustrating a method of activating Wi-Fi Direct in the multi-function printer supporting Wi-Fi Direct of FIG. 11 according to an embodiment of the present general inventive concept.
Figure 13A:
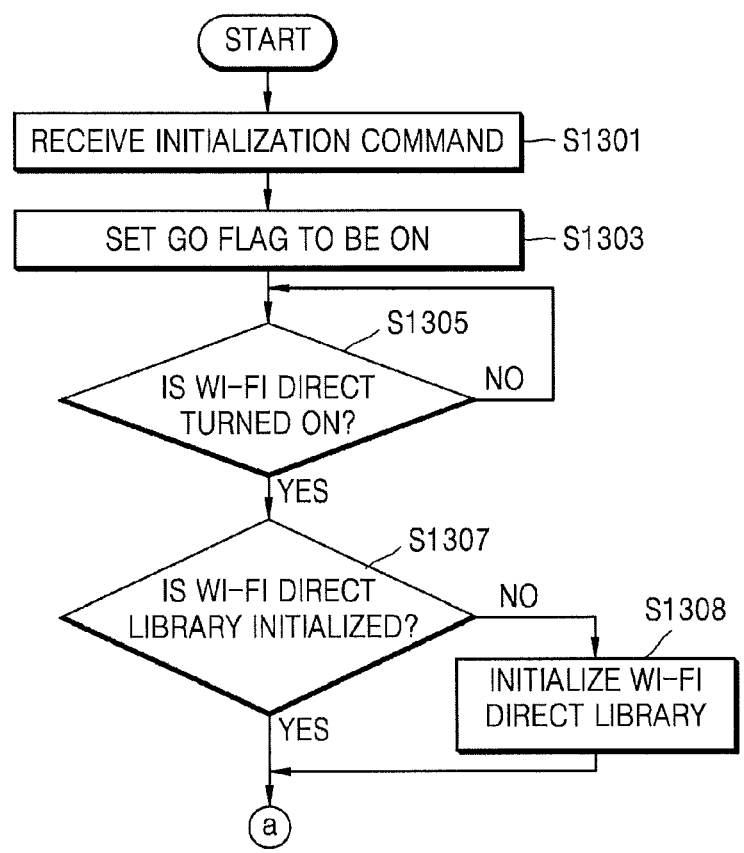
Figure 13B:
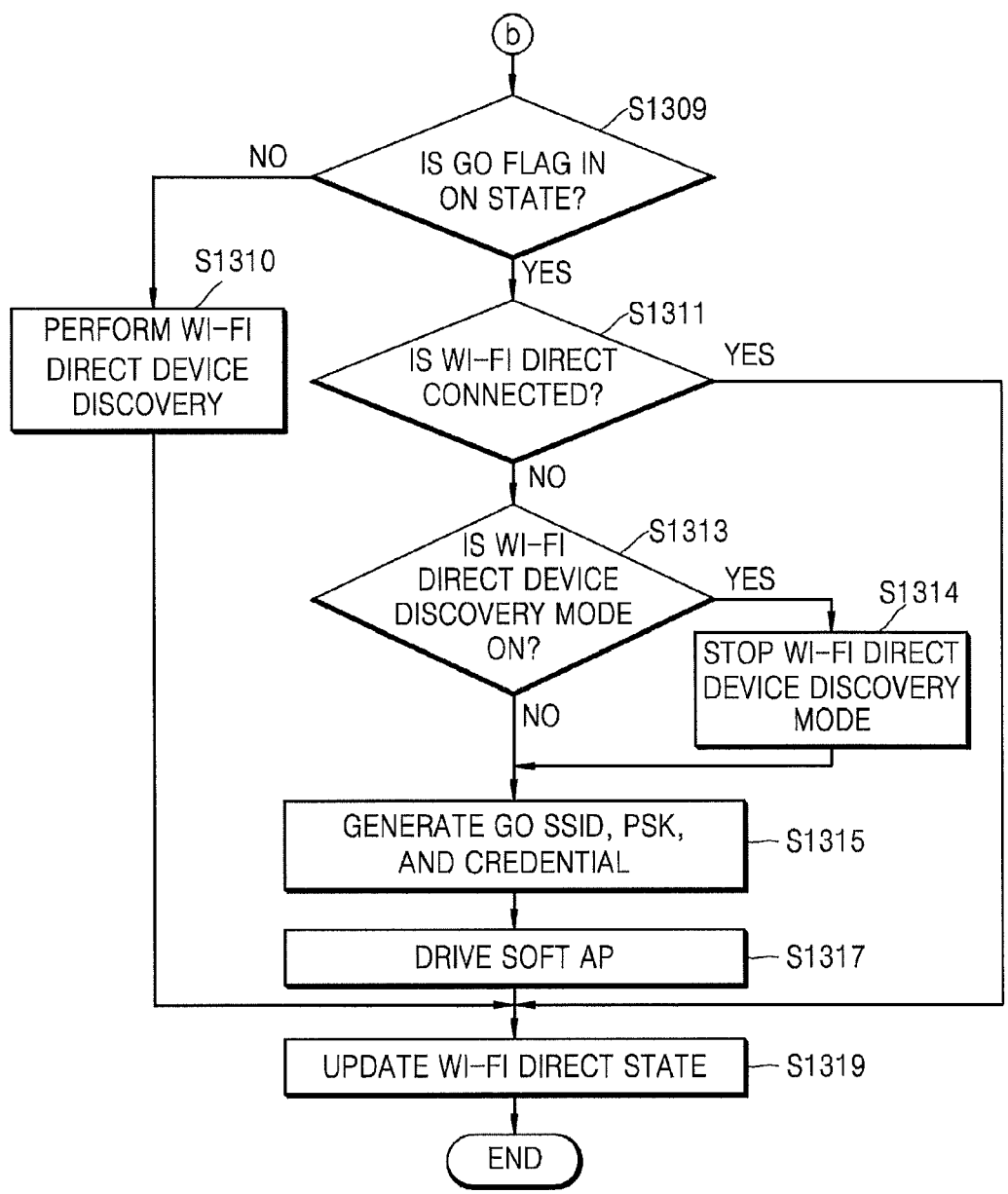

FIGS. 12, 13A, and 13B are flowcharts illustrating a method of activating Wi-Fi Direct in an MFP supporting Wi-Fi Direct, according to an embodiment of the present general inventive concept. Hereinafter, the method of activating Wi-Fi Direct will be described in detail with reference to FIGS. 11 through 13.

Referring to FIG. 12, an initialization command is received at operation S1201. The initialization command is a Wi-Fi Direct initialization command, and may be an MFP initialization command that is accompanied with the initialization of Wi-Fi Direct. The initialization command may be directly input by the user via the user interface module 850, or may be transmitted from the WLAN connection manager 831. When the initialization command is received, the Wi-Fi Direct connection manager 832 turns the GO flag on at operation S1203. The GO flag is an index representing whether Wi-Fi Direct is activated so that the MFP becomes the GO. When the GO flag is in a turned on state, the MFP functions as the GO, and when the GO flag is in a turned off state, the MFP does not function as the GO. In the present embodiment, the GO flag is automatically turned on when the initialization command is received, and thus, the MFP may perform as the AGO without connecting to the other Wi-Fi Direct devices. In addition, it is determined whether Wi-Fi Direct is turned on at operation S1205. If Wi-Fi Direct is turned on, the process goes to operation S1207 in which the AGO manager 833 identifies the GO flag. If the GO flag is in a turned on state, the process goes to operation S1209 in which Wi-Fi Direct is activated so that the MFP becomes the GO. However, when determining whether Wi-Fi Direct is in a turned on state in operation S1205, the turned on state of Wi-Fi Direct denotes that the MFP is set to use the Wi-Fi Direct function.

Referring to FIG. 13A, when an initialization command at operation S1301 is received, the GO flag is turned on at operation S1303, and it is determined whether Wi-Fi Direct is in a turned on state at operation S1305. The above processes are the same as the operations described with reference to FIG. 12. When it is determined that Wi-Fi Direct is in a turned on state in operation S1305, the Wi-Fi Direct connection manager 832 determines whether the Wi-Fi Direct library is initialized. If it is determined that the Wi-Fi Direct library is initialized, the process goes to operation S1309 of FIG. 13B in which the AGO manager 833 determines whether the GO flag is in a turned on state. Otherwise, if it is determined that the Wi-Fi Direct library is not initialized, the Wi-Fi Direct library is initialized in operation S1308, and then, the process goes to operation S1309. If the GO flag is determined to be in the turned on state in operation S1309, it is determined whether Wi-Fi Direct is connected at operation S1311. Otherwise, if the GO flag is in the turned off state, a Wi-Fi Direct device discovery process is performed at operation S1310, and then, the process goes to operation S1319 to update the state of Wi-Fi Direct. If it is determined that Wi-Fi Direct is connected in operation S1311, the Wi-Fi Direct state is also updated in operation S1319. Otherwise, if it is determined that Wi-Fi Direct is not connected in operation S1311, it is determined whether the Wi-Fi Direct device discovery mode is operating at operation S1313. If the device discovery mode is not operating, the process goes directly to operation S1315; however, if the device discovery mode is operating, the Wi-Fi Direct device discovery mode is terminated at operation S1414, and the process goes to operation S1315. An SSID, a PSK, and a GO credential that are necessary when the MFP operates as the GO are generated at operation S1315, and then, a soft AP is driven to activate Wi-Fi Direct so that the MFP operates as the GO at operation S1317, and the Wi-Fi Direct state is updated at operation S1319.

As described above, when activating Wi-Fi Direct according to the Wi-Fi Direct initialization command, the MFP may operates as the AGO even when the MFP is not connected to other Wi-Fi Direct devices, and thus, the Wi-Fi Direct network is formed in advance to be connected to legacy wireless devices that do not support Wi-Fi Direct. In addition, the MFP may perform as a GO having relatively higher power consumption due to an advantage that the MFP may consume a lot of electric power as a fixed device, that is a stationary device to receive a power to operate with the received power and also to be able to supply the power to an external device through a wired or wireless transmission method. Also, an IP address of the MFP may be fixed.

Figure 14:
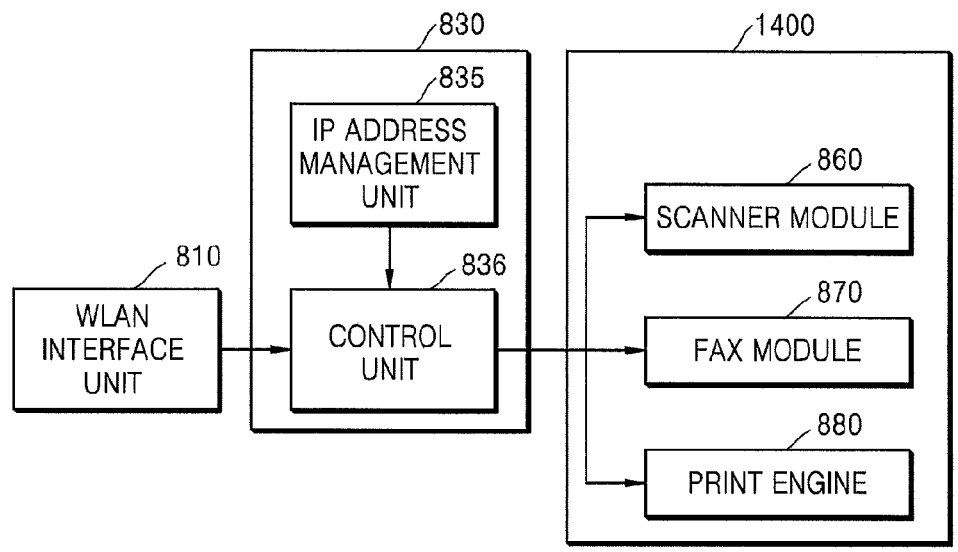
FIG. 14 is a detailed block diagram illustrating a multi-function printer supporting Wi-Fi Direct according to an embodiment of the present general inventive concept.

Hereinafter, a method of performing image forming processes in an MFP supporting Wi-Fi Direct will be described with reference to the accompanying drawings. FIG. 14 is a detailed block diagram illustrating an MFP supporting Wi-Fi Direct according to an embodiment of the present general inventive concept. FIG. 8 illustrates a basic structure of the MFP supporting Wi-Fi direct. The CPU 830 of FIG. 8 may include an IP address manager 835 and a controller 836. In addition, the scanner module 860, the fax module 870, and the print engine 880 are included in an image forming unit 1400.

The WLAN interface unit 810 allows the MFP to be Wi-Fi Direct connected at the same time of being connected to the infrastructured network. The IP address manager 835 manages an IP address of the infrastructured network and an IP address of the Wi-Fi Direct interface. The MFP supports the concurrent connection function as described above, and may have two different IP addresses according to the interfaces in the case where the MFP is connected to both of the infrastructured network and the Wi-Fi Direct. The IP address manager 835 identifies the IP address of each interface and provides the controller 836 with the IP address. The controller 836 receives the IP addresses from the IP address manager 835 and controls execution of the image forming operation requested by an external wireless device. In more detail, when the controller 836 receives a discovery packet from the wireless terminal Wi-Fi Direct connected to the MFP through the Wi-Fi Direct interface, the controller 836 receives the IP address of the Wi-Fi Direct interface from the IP address manager 835 to generate a response packet including the IP address and transmit the response packet to the wireless terminal. The wireless terminal analyzes the response packet transmitted from the MFP to get the IP address of the Wi-Fi Direct interface of the MFP. Also, the controller 836 may generate the response packet further including information on services available by the MFP, and in this case, the wireless terminal may determine the services that may be provided by the MFP by analyzing the response packet.

If the controller 836 receives a request to perform an image forming operation the request being transmitted to the destination of which is the IP address of the Wi-Fi Direct interface, from the wireless terminal Wi-Fi Direct connected to the MFP, the controller 836 may allow the image forming unit 1400 to perform the requested image forming operation. For example, if the controller 836 receives print data using the destination of which is the IP address of the Wi-Fi Direct interface, from the wireless terminal, the controller 836 allows the print engine 880 to perform a print operation according to the received print data. When the controller 836 receives a scan request through the destination of which is the IP address of the Wi-Fi Direct interface, from the wireless terminal, and allows the scanner module 860 to perform the scanning operation.

Figure 15:
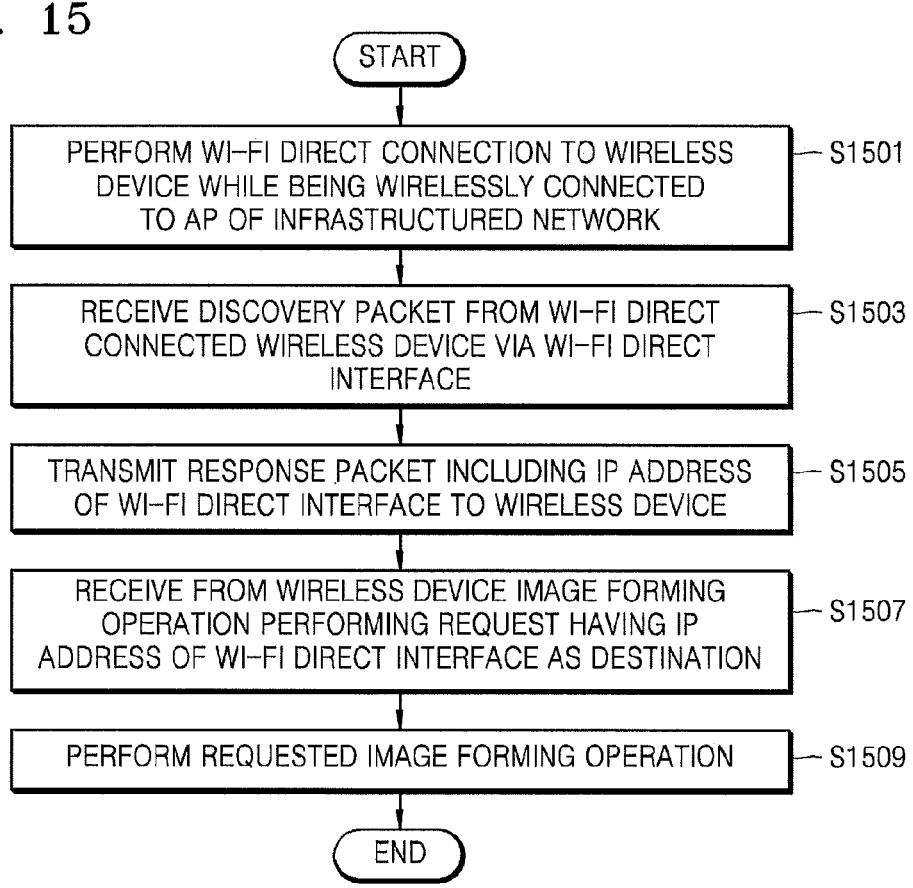
FIG. 15 is a flowchart illustrating a method of performing image forming processes in the multi-function printer supporting Wi-Fi Direct of FIG. 14, according to an embodiment of the present general inventive concept.

FIG. 15 is a flowchart illustrating a method of performing an image forming operation of the MFP supporting Wi-Fi Direct, according to an embodiment of the present general inventive concept. Referring to FIG. 15, the MFP is Wi-Fi Direct connected to the wireless terminal in a state of being connected to the AP of the infrastructured network by using the concurrent connection function at operation S1501. The MFP receives a discovery packet from the wireless terminal that is Wi-Fi Direct connected to the MFP via the Wi-Fi Direct interface at operation S1503. When the discovery packet from the wireless terminal is received via the Wi-Fi Direct interface, the MFP generates a response packet including an IP address of the Wi-Fi Direct interface and transmits the response packet to the wireless terminal at operation S1505. The wireless terminal receiving the response packet may identify the IP address of the Wi-Fi Direct interface of the MFP by analyzing the response packet. Further, the MFP may generate a response packet including information about available services of the MFP, and in this case, the wireless terminal may identify the kinds of image forming operation services provided by the MFP by analyzing the response packet. When the wireless terminal receiving the response packet transmits a request for executing the image forming operation to a destination of the IP address of the Wi-Fi Direct interface, the MFP receives the response packet at operation S1507, and performs the requested image forming operation at operation S1509. For example, when print data, the destination of which is the IP address of the Wi-Fi Direct interface, is received in operation S1507, the printing is performed according to the print data at operation S1509, and if a scanning request, the destination of which is the IP address of the Wi-Fi Direct interface, is received in operation S1507, the scanning operation is performed at operation S1509.

As described above, the response packet, including the IP address of the Wi-Fi Direct interface, is transmitted to the wireless terminal that is Wi-Fi Direct connected to the MFP, and when the MFP receives the request to perform the image forming operation, the destination of which is the IP address of the Wi-Fi Direct interface, from the wireless terminal, the MFP performs the request. Thus, the MFP may stably perform the image forming operation requested by the wireless terminal that is Wi-Fi Direct connected to the MFP in a state of being connected to the infrastructured network and the Wi-Fi Direct simultaneously.

Figure 16:
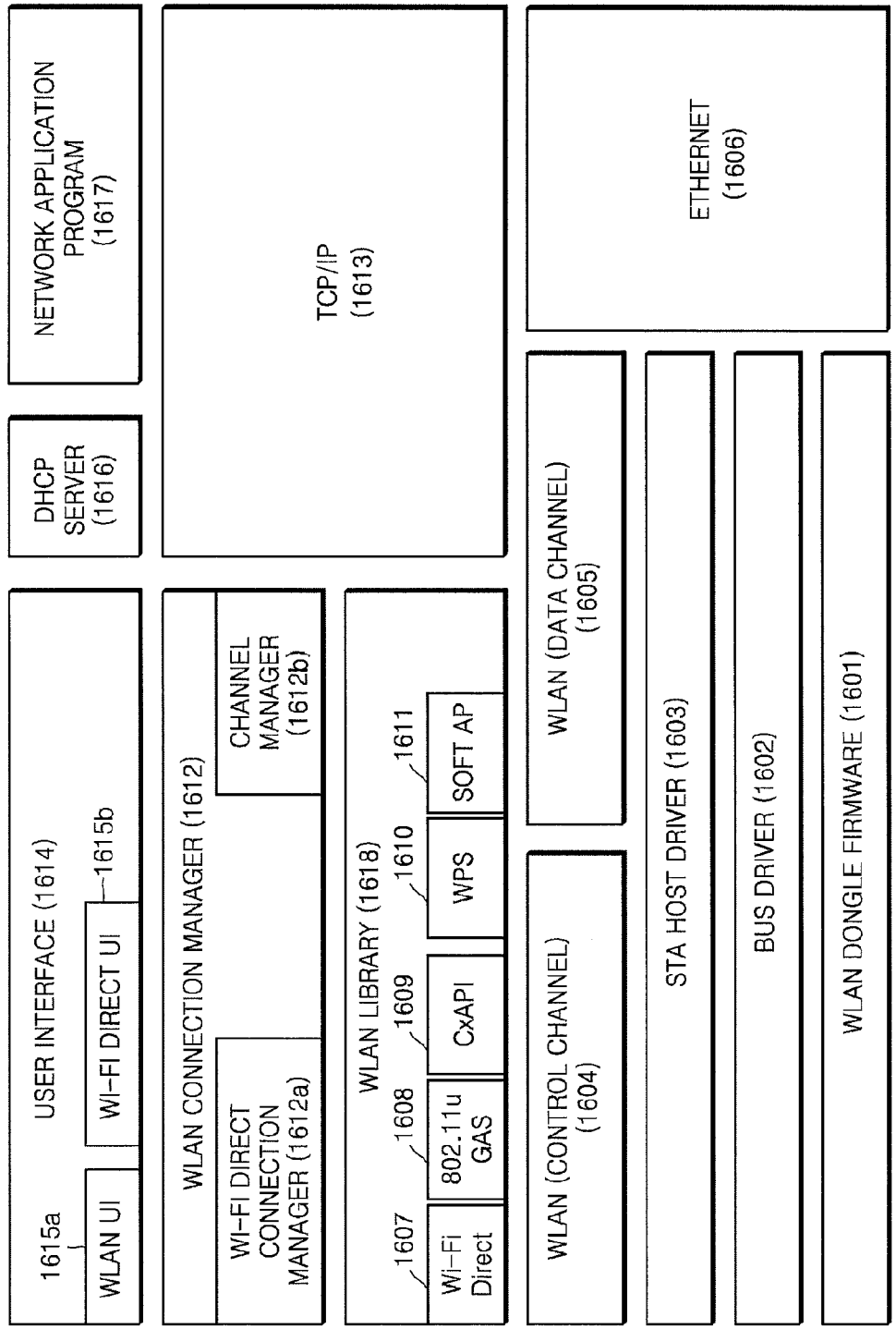
FIG. 16 is a block diagram illustrating a software program configuration of a multi-function printer supporting the Wi-Fi Direct according to an embodiment of the present general inventive concept.

Hereinafter, a method of managing channels in the MFP supporting Wi-Fi Direct will be described in detail with reference to the accompanying drawings. FIG. 16 is a block diagram illustrating a software program configuration of the MFP supporting Wi-Fi Direct according to the embodiment of the present general inventive concept. FIG. 16 illustrates a channel manager 1612*b* included in a WLAN connection manager 1612 to manage a channel used by the MFP to connect to the infrastructured network AP and a Wi-Fi Direct operation channel used in the Wi-Fi Direct connection.

FIG. 16 also illustrates the similar features to those of FIG. 9. For example, a WLAN dongle firmware 1601 is firmware for connecting the WLAN, and may be stored in WLAN dongle hardware or may be transmitted to the WLAN dongle hardware from a main board of the MFP when booting the MFP. A bus driver 1602 and a STA (station) host driver 1603 are low level bus drivers for communicating with the WLAN hardware. A WLAN controlling channel 1604 and a WLAN data channel 1605 are channels for communicating with the WLAN firmware. A Wi-Fi Direct module 1607 performs the Wi-Fi Direct connection and transmits an operating command to the WLAN firmware. An IEEE 802.11u generic advertisement service (GAS) module 1608 performs functions according to IEEE 802.11u GAS, a module 1609 performs functions relating to CxAPI, and a WPS module 1610 performs a WPS function. A soft AP module 1611 is a software module allowing the MFP to perform as the AP. A transmission control protocol (TCP)/IP 1613 is a standard protocol for network transmission. A Wi-Fi Direct connection manager 1612 is a module for controlling the Wi-Fi Direct connection. A Wi-Fi Direct user interface 1615 allows the user to perform settings related to the Wi-Fi Direct, and may be included in a user interface 1614 that is installed in an embedded web server (EWS). A DHCP server 1616 automatically allocates an IP to the Wi-Fi Direct device that is connected as a client. A network application program 1617 performs various application operations relating to the network.

The method of managing the channels used in the connections by the channel manager 1612b will be described below with reference to FIGS. 18 through 24.

Figure 17:
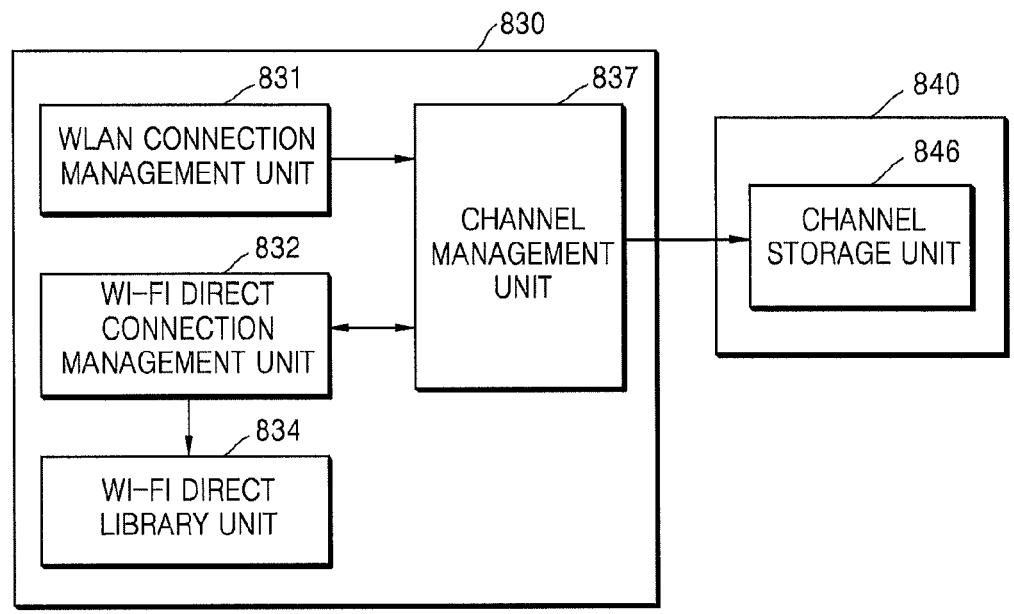
FIG. 17 is a detailed block diagram illustrating a multi-function printer supporting Wi-Fi Direct according to an embodiment of the present general inventive concept.

FIG. 17 is a block diagram illustrating the MFP supporting Wi-Fi Direct according to the embodiment of the present general inventive concept. Referring back to FIG. 8 illustrating a basic configuration of the MFP supporting Wi-Fi Direct, the CPU 830 may include a WLAN connection manager 831, a Wi-Fi Direct connection manager 832, a Wi-Fi Direct library unit 834, and a channel manager 837. Also, the memory unit 840 may include a channel storage unit 846 therein. The channel manager 837 identifies the channel used by the MFP to connect to the infrastructured network AP from the WLAN connection manager 831, and identifies the Wi-Fi Direct operation channel used in the Wi-Fi Direct connection from the Wi-Fi Direct connection manager 832. In addition, the channel manager 837 makes the channel used in the AP connection and the Wi-Fi Direct operation channel coincide with each other. Also, the channel manager 837 stores the channel used in the connection to the infrastructured network AP in the channel storage unit 846 so that the stored channel may be set as the Wi-Fi Direct operation channel when the connection to the infrastructured network AP is disconnected and Wi-Fi Direct is activated. Since the MFP is mainly used as a fixed device, it is likely to use the channel that has been used to connect to the infrastructured network AP once again. When the Wi-Fi Direct operation channel is set to be the same as the channel used to connect to the AP by the channel manager 837, the Wi-Fi Direct connection manager 832 activates Wi-Fi Direct through the set Wi-Fi Direct operation channel by using the Wi-Fi Direct library unit 834.

FIGS. 18 through 23 are flowcharts illustrating the method of managing the channels in the MFP supporting Wi-Fi Direct according to the embodiment of the present general inventive concept. Hereinafter, the channel managing method will be described in detail below with reference to FIGS. 18 through 23.

Figure 18:
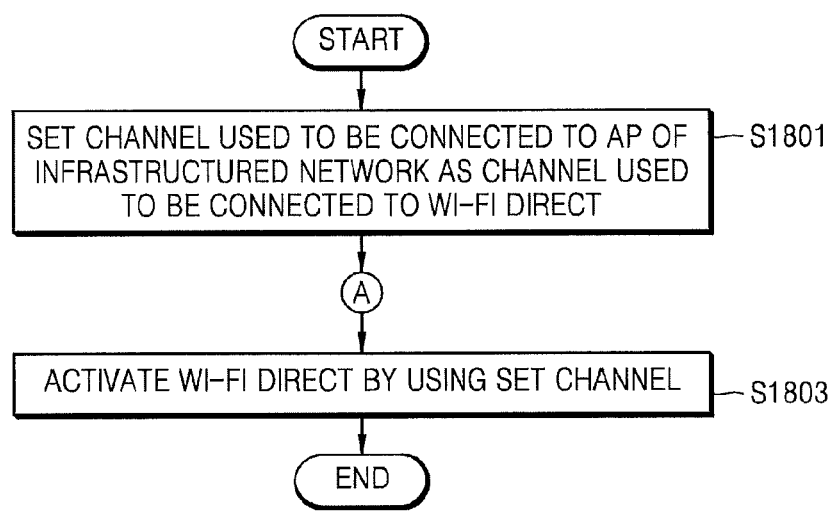
FIGS. 18 through 23 are flowcharts illustrating a method of managing channels in a multi-function printer supporting Wi-Fi Direct according to an embodiment of the present general inventive concept.
Figure 19:
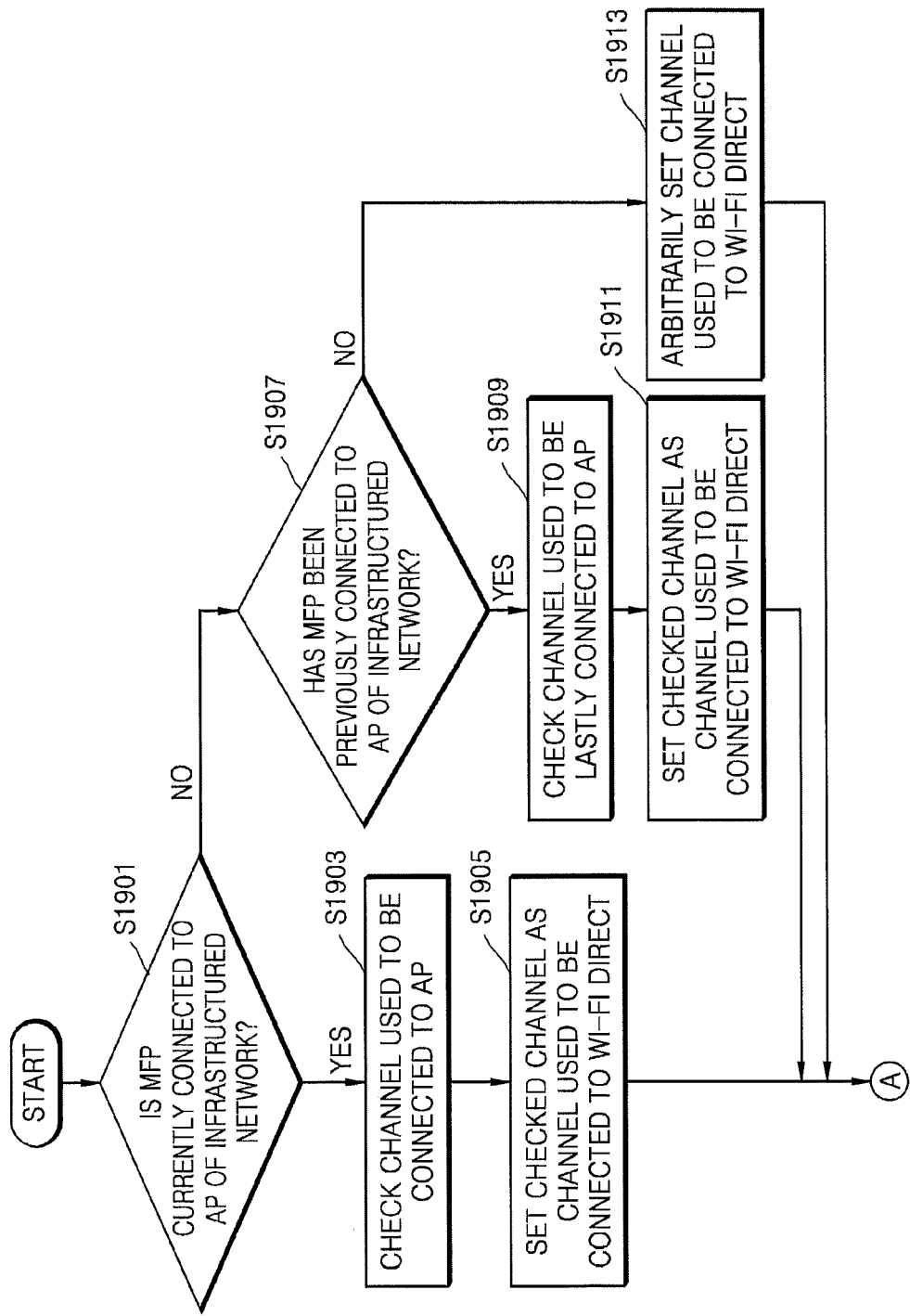

Referring to FIG. 18, a channel that has been used to connect the MFP to the infrastructured network AP is set as the Wi-Fi Direct operation channel at operation S1801, and Wi-Fi Direct is activated by using the set channel at operation S1803. Here, sub-processes of operation S1801 of setting the channel used in the connection to the AP as the Wi-Fi Direct operation channel are illustrated in FIG. 19. Referring to FIG. 19, before activating Wi-Fi Direct, it is determined whether the MFP is connected currently to the infrastructured network AP at operation S1901. As a result of determination, if the MFP is currently connected to the infrastructured network AP, the channel used in the connection to the AP is identified at operation S1903. In addition, the identified channel is set as the Wi-Fi Direct operation channel at operation S1905. However, as a result of the determination in operation S1901, if the MFP is not currently connected to the infrastructured network AP, it is determined whether the MFP has ever been connected to the infrastructured network AP at operation S1907. If the MFP has been connected to the infrastructured network AP, the channel used in the last connection to the AP is identified at operation S1909, and the identified channel is set as the Wi-Fi Direct operation channel at operation S1911. On the other hand, if the MFP has never been connected to the infrastructured network AP before in operation S1907, an arbitrary channel is set as the Wi-Fi Direct operation channel at operation S1913.

Figure 20:
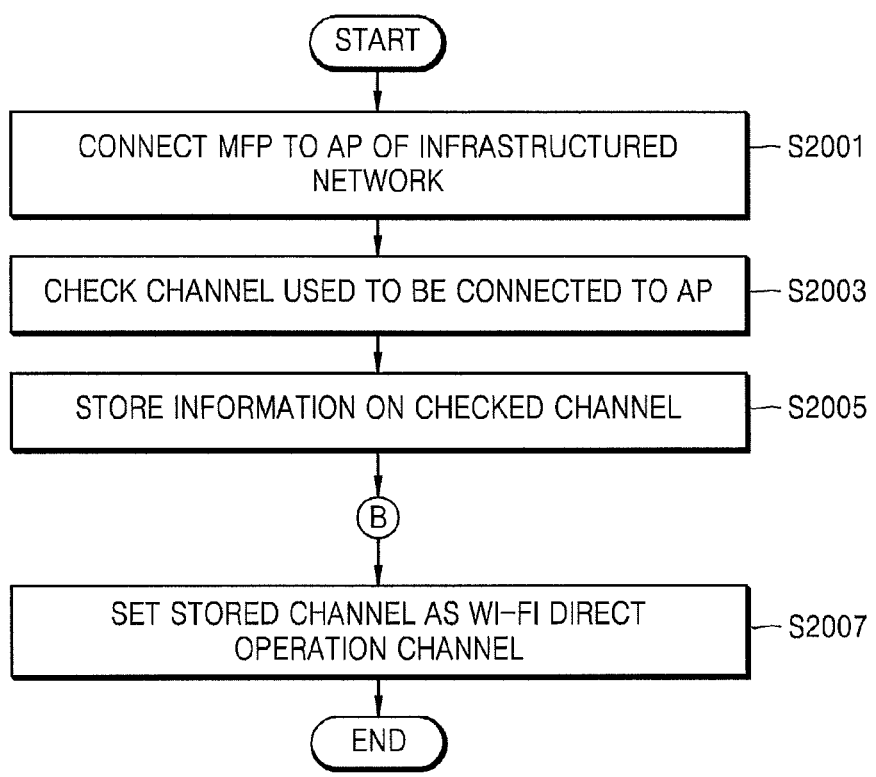
Figure 21:
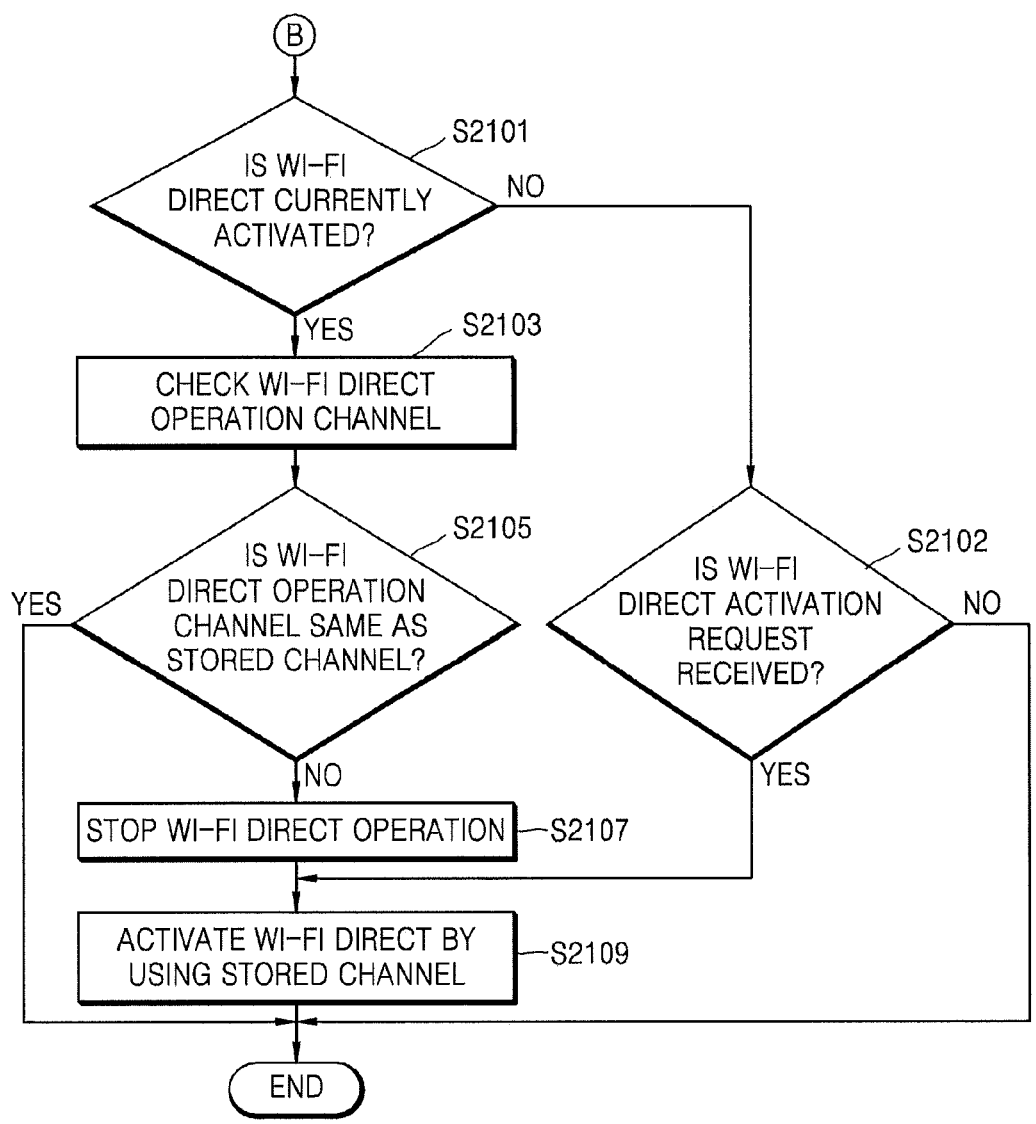
Figure 22:
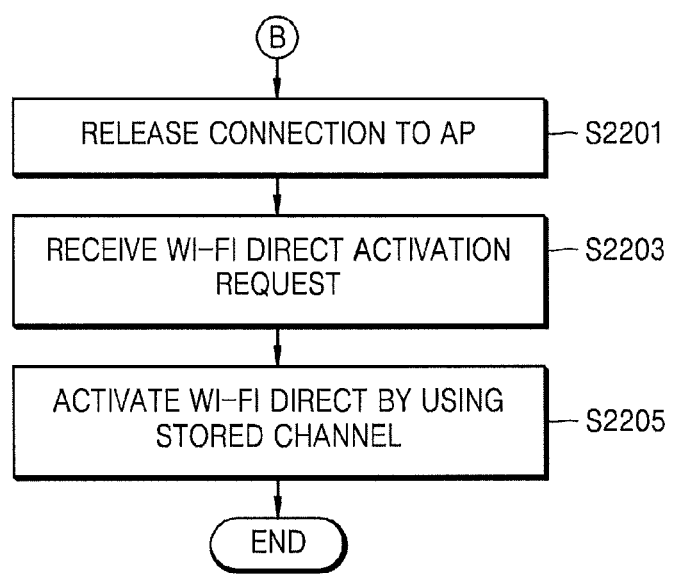

FIGS. 20 through 22 are flowcharts illustrating processes of setting the Wi-Fi Direct operation channel in a state where the MFP is connected to the AP of the infrastructured network. Referring to FIG. 20, the MFP is connected to the infrastructured network AP at operation S2001, and the channel used in the connection to the AP is identified at operation S2003. The channel identified in operation S2003 is stored at operation S2005, and the stored channel is set as the Wi-Fi Direct operation channel at operation S2007. Here, sub-processes of operation S2007 for setting the stored channel as the Wi-Fi Direct operation channel are illustrated in FIGS. 21 and 22.

Referring to FIG. 21, after storing the channel identified in operation S2005 of FIG. 20, it is determined whether Wi-Fi Direct is currently activated at operation S2101. As a result of determination, if Wi-Fi Direct is currently activated, the Wi-Fi Direct operation channel is identified at operation S2103. In addition, it is determined whether the Wi-Fi Direct operation channel coincides with the stored channel at operation S2105, and if it is determined that the two channels are not the same as each other, the Wi-Fi Direct operation is stopped at operation S2107, and the stored channel is set as the Wi-Fi Direct operation channel to activate Wi-Fi Direct at operation S2109. Otherwise, if it is determined that the Wi-Fi Direct is not currently activated in operation S2101, it is identified whether there is a request for activating Wi-Fi Direct at operation S2102, and if there is a request, the stored channel is set as the Wi-Fi Direct operation channel to activate Wi-Fi Direct at operation S2109.

As another example of the sub-processes of operation S2007 of FIG. 20, referring to FIG. 22, after storing the channel identified in operation S2005 illustrated in FIG. 20, the connection between the MFP and the infrastructured network AP is disconnected at operation S2201. In addition, when the MFP receives a Wi-Fi Direct activation request at operation S2203, the stored channel is set as the Wi-Fi Direct operation channel to activate Wi-Fi Direct at operation S2205.

Figure 23:
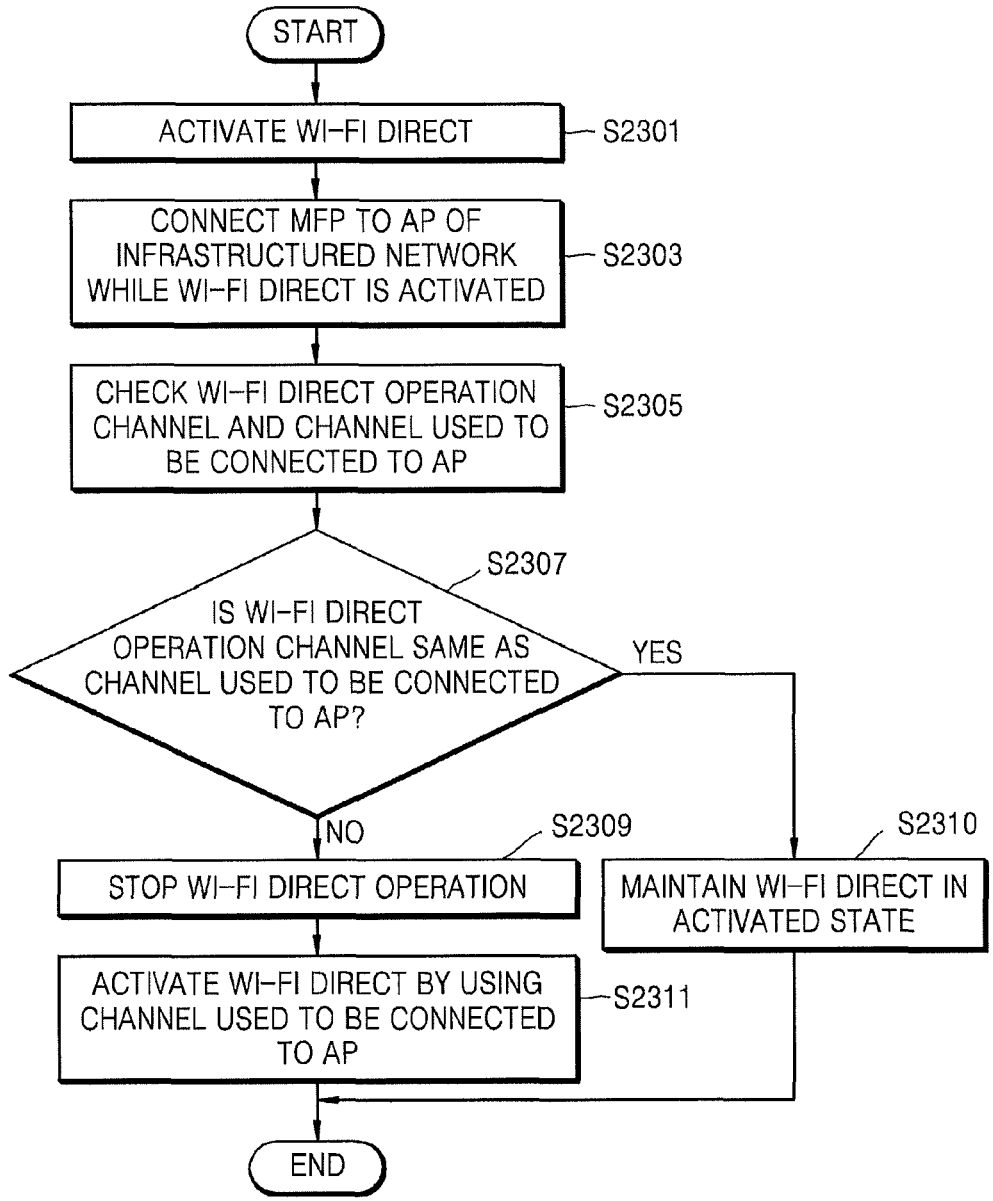

FIG. 23 is a flowchart illustrating processes of setting the Wi-Fi Direct operation channel in a state where Wi-Fi Direct of the MFP is activated. Referring to FIG. 23, Wi-Fi Direct of the MFP is activated at operation S2301, and the MFP is connected to the infrastructured network AP in a state where Wi-Fi Direct is activated at operation S2303. The Wi-Fi Direct operation channel and the channel used in the connection to the AP are identified at operation S2305. It is determined whether the Wi-Fi Direct operation channel is the same as the channel used in the connection to the AP at operation S2307, and if it is determined that the two channels are not the same as each other, the Wi-Fi Direct operation is stopped at operation S2309, and the channel used in the connection to the AP is set as the Wi-Fi Direction operation channel to activate Wi-Fi Direct at operation S2311.

The above processes will be described in detail with reference to FIG. 16 below. If the MFP is connected to the AP operating in channel 6 at 2.4 GHz when the Wi-Fi Direct operation channel is channel 1 at 2.4 GHz, the channel manager 1612b reads out the channel of the connected AP via the WLAN library 1618 from a wireless module and notifies the Wi-Fi Direct manager 1612a of the read channel so that the Wi-Fi Direct operation channel is changed to the channel 6. The Wi-Fi Direct manager 1612a performs a preliminary operation of changing the channel, such as termination of the soft AP, change of an information element, and termination of a device discovery operation, and then, changes the Wi-Fi Direct operation channel to the channel 6 to activate Wi-Fi Direct.

In general, since a wireless MFP performs transmission via one wireless antenna, the wireless MFP has to communicate by using one communication channel at once. Therefore, when a concurrent connection function, in which the MFP is simultaneously connected to the infrastructured network and the Wi-Fi Direct, is performed, there may be a problem in using the communication function. If two different channels are used in the connection to the infrastructured network and the Wi-Fi Direct connection, a wireless chipset of superior CPU performance may process all of the packets while continuously reciprocating two channels in a time-division manner; however, services of each of the channels may be delayed and stability of the channels may be degraded. However, according to the method of managing the channels of the present embodiment, a single channel is used in the concurrent connection, and thus, the above problems may be addressed. Also, the channel of the infrastructured network AP is not known to the MFP before the MFP is connected to the AP; however, according to the present embodiment, even when the MFP is connected to the infrastructured network AP in a state where Wi-Fi Direct is activated first, the channel information of the AP is read and the Wi-Fi Direct operation channel is set according to the AP channel information so as to use a single channel.

Hereinafter, a method of changing an operation mode in the MFP supporting Wi-Fi Direct will be described below with reference to the accompanying drawings. There may be two WLAN usage modes of the MFP, that is, an ad-hoc mode and an infrastructured network mode. The ad-hoc mode is a mode in which the MFP is wirelessly connected to the wireless device by using ad-hoc communication, and the infrastructured network mode is a mode in which the MFP is wirelessly connected to the infrastructured network AP.

Figure 24:
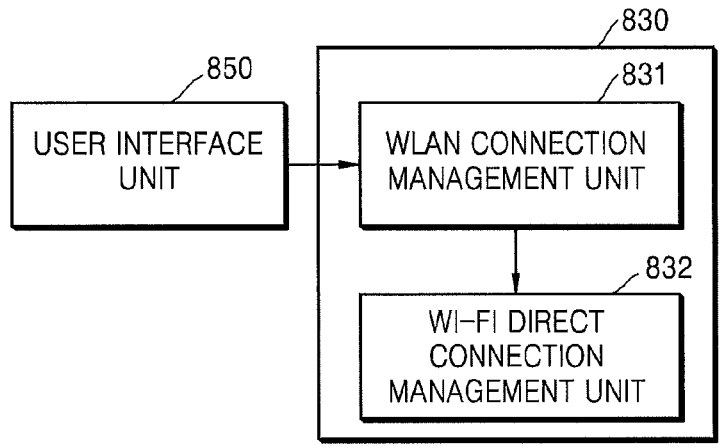
FIG. 24 is a detailed block diagram illustrating a multi-function printer supporting Wi-Fi Direct according to an embodiment of the present general inventive concept.

FIG. 24 is a block diagram illustrating the MFP supporting Wi-Fi Direct according to the embodiment of the present general inventive concept. FIG. 8 illustrates a basic configuration of the MFP supporting Wi-Fi Direct. Referring to FIGS. 8 and 24, the CPU 830 may include the WLAN connection manager 831 and the Wi-Fi Direct connection manager 832. Detailed operations of each of the components will be described below with reference to FIGS. 25 through 27.

Figure 25:
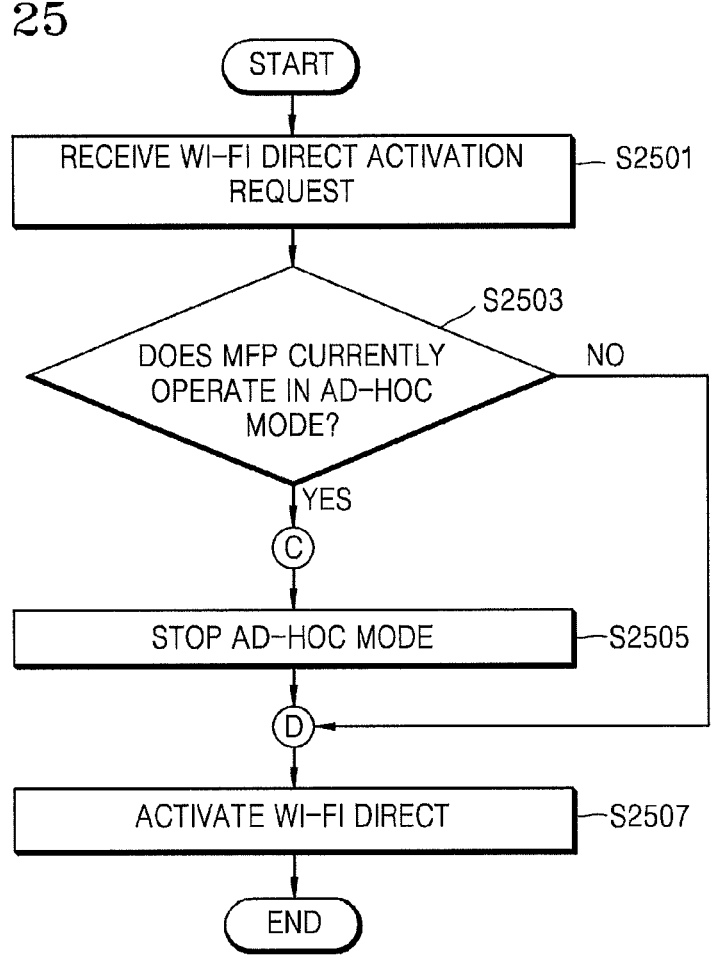
FIGS. 25 through 27 are flowcharts illustrating a method of changing an operation mode in the multi-function printer supporting Wi-Fi Direct according to an embodiment of the present general inventive concept.
Figure 26:
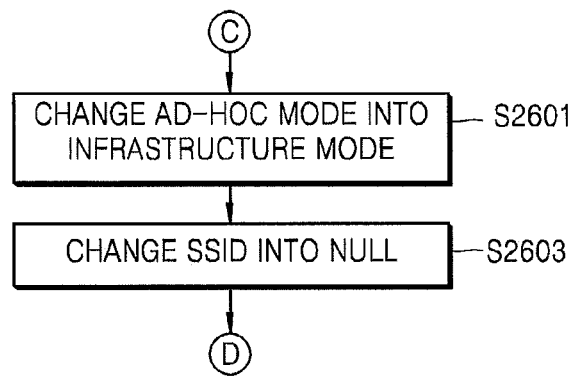
Figure 27:
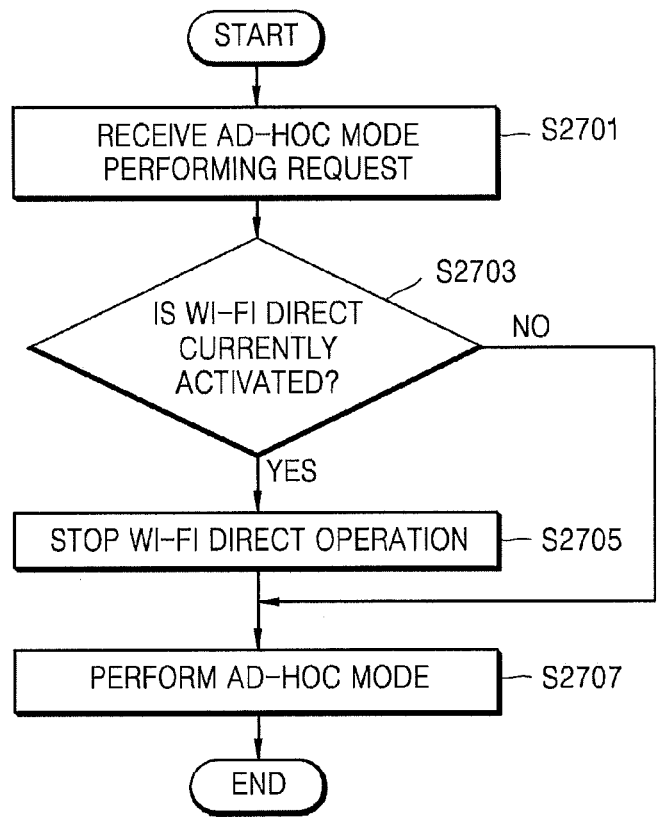

FIGS. 25 through 27 are flowchart illustrating a method of changing the operation mode of the MFP supporting Wi-Fi Direct, according to the embodiment of the present general inventive concept. Referring to FIG. 25, when a Wi-Fi Direct activation request is transmitted from a user via the user interface module 850 at operation S2501, the WLAN connection manager 831 determines whether the MFP currently operates in the ad-hoc mode at operation S2503. If it is determined that the MFP currently operates in the ad-hoc mode, the WLAN connection manager 831 terminates the ad-hoc mode and requests the Wi-Fi Direct connection manager 832 to activate Wi-Fi Direct at operation S2505. The Wi-Fi Direct connection manager 832 activates Wi-Fi Direct according to the request at operation S2507. Here, sub-processes of operation S2505 in which the WLAN connection manager 831 terminates the ad-hoc mode are illustrated in FIG. 26. Referring to FIG. 26, the WLAN connection manager 831 may change the operation mode of the MFP from the ad-hoc mode to the infrastructured network mode at operation S2601. Here, the WLAN connection manager 831 may only terminate the ad-hoc mode without changing the operation mode to the infrastructured network mode. The SSID of the MFP, which is set for executing the ad-hoc mode, may be changed to a null state in order to terminate the ad-hoc mode at operation S2603.

Referring to FIG. 27, when an ad-hoc mode execution request is received via the user interface module 850 at operation S2701, the WLAN connection manager 831 determines whether Wi-Fi Direct of the MFP is currently activated at operation S2703. As a result of the determination, if the Wi-Fi Direct of the MFP is currently activated, the WLAN connection manager 831 requests the Wi-Fi Direct connection manager 832 to terminate the Wi-Fi Direct operation. Accordingly, when the Wi-Fi Direct connection manager 832 terminates the Wi-Fi Direct operation at operation S2705, the WLAN connection manager 831 executes the ad-hoc mode at operation S2707.

Although the Wi-Fi Direct technology supports the concurrent connection function to the infrastructured network and the Wi-Fi Direct, there may be a limitation, that is, the MFP may not be connected to the Wi-Fi Direct while operating in the ad-hoc mode. The ad-hoc mode may ensure mutual compatibility between devices under IEEE 802.11b; however, Wi-Fi Direct does not support IEEE 802.11b. Therefore, when there is a request to execute the Wi-Fi Direct mode or the ad-hoc mode while operating in the ad-hoc mode or the Wi-Fi Direct mode, a method of selectively changing the operation mode is necessary, as provided in the embodiments of the present general inventive concept.

According to the present general inventive concept, when activating Wi-Fi Direct according to the initialization command, the MFP may operate as a GO even if the MFP is not connected to other Wi-Fi Direct devices in order to form the Wi-Fi Direct network in advance, so that the MFP may provide connections to legacy wireless terminals that do not support Wi-Fi Direct. Also, the MFP that is a fixed type device may perform as the GO that has a relatively large power consumption.

Also, when the Wi-Fi Direct activation request is received while operating in the ad-hoc mode, the ad-hoc mode is terminated and Wi-Fi Direct is activated, and accordingly, a problem that the Wi-Fi Direct connection is not possible while operating in the ad-hoc mode may be addressed.

Figure 28A:
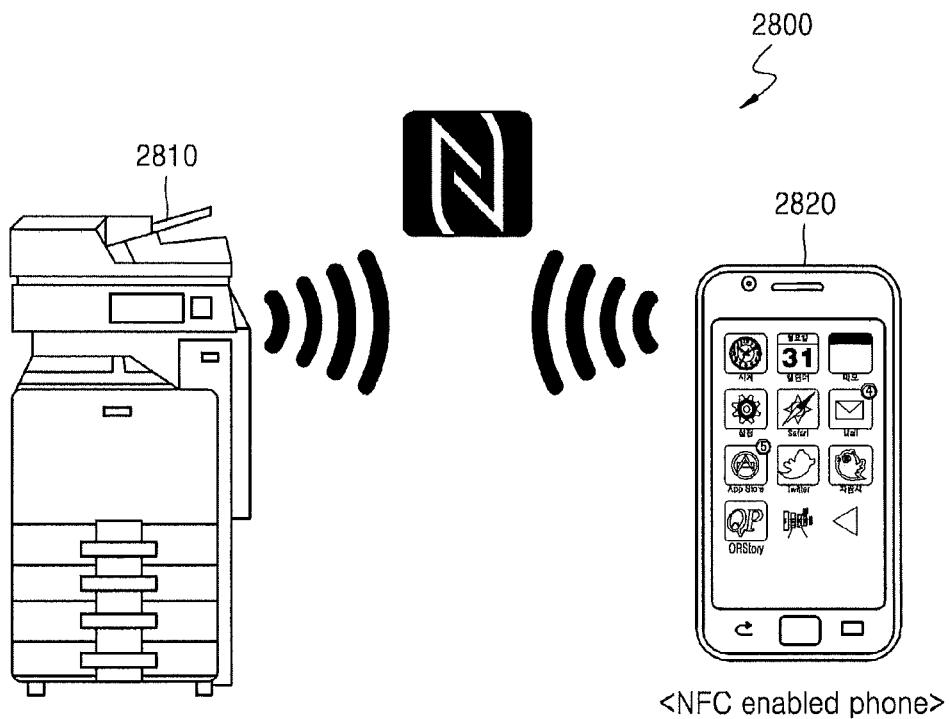
FIG. 28A illustrates a near field communication (NFC) environment according to an exemplary embodiment of the disclosure.

FIG. 28A illustrates a near field communication (NFC) environment 1 according to an exemplary embodiment of the disclosure. Referring to FIG. 28A, an image forming apparatus 2810 and a NFC device 2820 each supporting an NFC function are present in the NFC environment 2800. An NFC chip may be embedded in the image forming apparatus 2810 illustrated in FIG. 28A in advance, and thus communication between the image forming apparatus 2810 and the NFC device 2820 may be performed via NFC. Here, the NFC device 2820 may be a mobile device such as a smartphone, a tablet device, or a personal digital assistant (PDA). However, the disclosure is not so limited and the NFC device may include generally any type of electronic device. A mobile device may correspond to an electronic device which is mobile or portable by a user as would be understood by one of ordinary skill in the art.

Figure 28B:
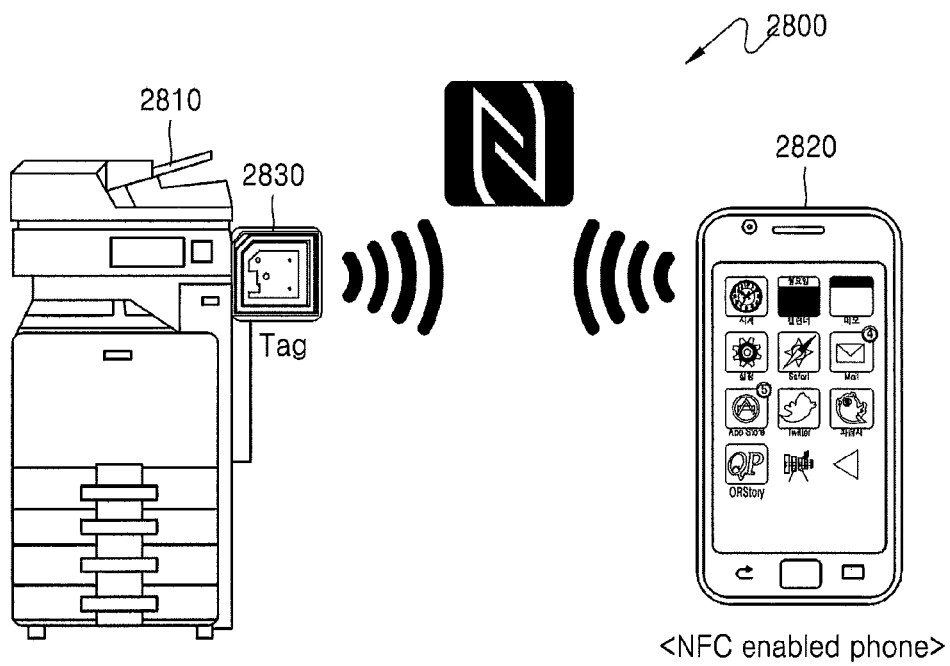
FIG. 28B illustrates an NFC environment which is similar to that of FIG. 28A, according to another exemplary embodiment of the disclosure.

FIG. 28B illustrates an NFC environment 2800 which is similar to the NFC environment 2800 of FIG. 28A, according to an exemplary embodiment of the disclosure. Referring to FIG. 28B, an image forming apparatus 2810 and a NFC device 2820 each supporting an NFC function are also present in the NFC environment 2800. In particular, an NFC tag 2830 is embedded in advance in the image forming apparatus 2810 of FIG. 28A, whereas no NFC tag 2830 is embedded in the image forming apparatus 2810 in FIG. 28B in advance. Accordingly, the image forming apparatus 2810 of FIG. 28B may communicate with the NFC device 2820 via NFC only when an NFC tag 2830 is installed later in the image forming apparatus 2810 of FIG. 28B.

However, it will be understood by one of ordinary skill in the art that if an NFC tag 2830 is installed later in the image forming apparatus 2810 of FIG. 28B, then an operation of the NFC environment 2800 of the current exemplary embodiment is identical to that of the NFC environment 2800 of FIG. 28A, in which the NFC tag 2830 is embedded in advance.

While just one pair of devices, that is, the image forming apparatus 2810 and the NFC device 2820, is present in the NFC environment 2800 illustrated in FIGS. 28A and 28B for convenience of description, more electronic devices of different types and/or similar types that support an NFC function may also be present in the NFC environment 2800. These devices may also operate in the same manner of NFC as in the current exemplary embodiment of the disclosure, which would be understood by one of ordinary skill in the art.

Figure 28C:
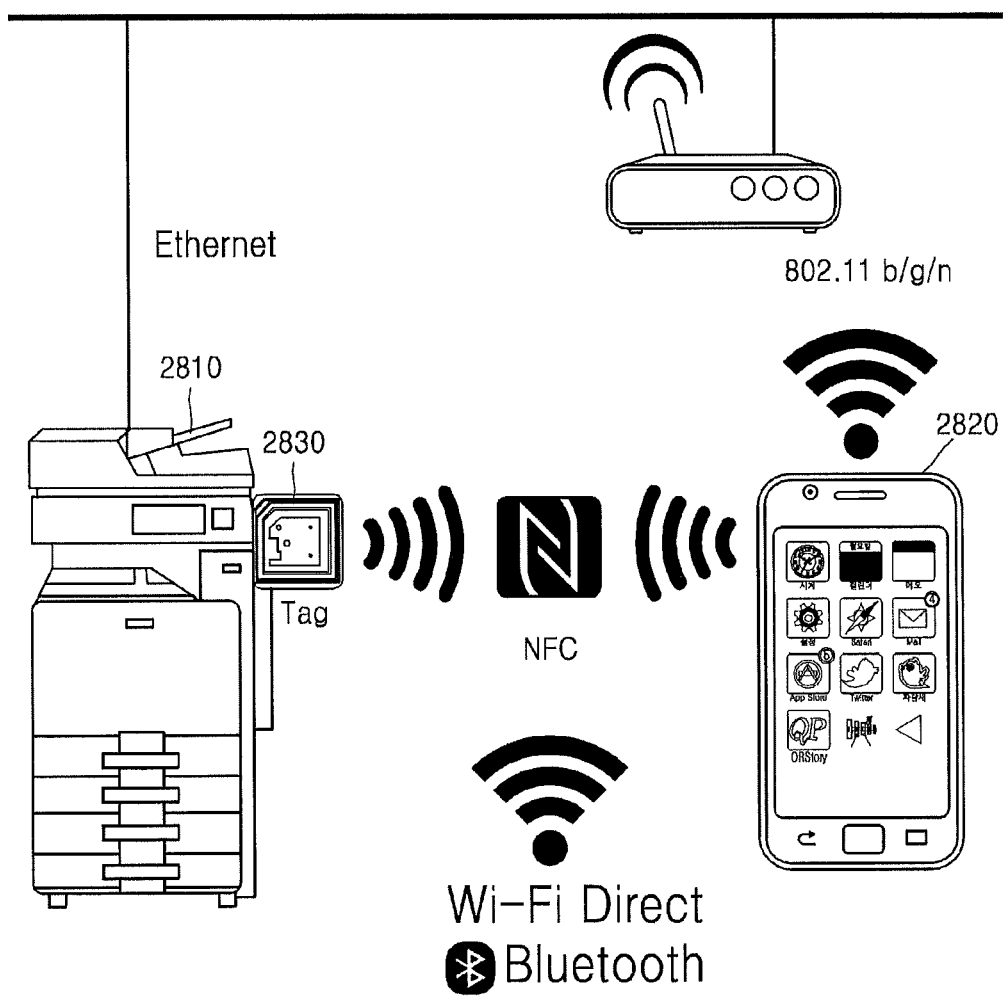
FIG. 28C illustrates a wireless communication environment in which an image forming apparatus and a user device are present, according to an exemplary embodiment of the disclosure.

FIG. 28C illustrates an alternative wireless communication environment according to another exemplary embodiment of the disclosure, in which an image forming apparatus 2810 and a NFC device 2820 are present. Referring to FIG. 28C, other peripheral wired/wireless networks are illustrated in addition to the NFC environment 2800 of FIG. 28A or 28B. The NFC environment 2800 may operate in combination with peripheral wired/wireless networks, such as Wi-Fi Direct, Bluetooth, Ethernet, 802.11a/b/g/n, etc. For example, the NFC environment 2800 may operate in conjunction with networks including a local area network (LAN), wireless local area network (WLAN), wide area network (WAN), personal area network (PAN), virtual private network (VPN), or the like. For example, wireless communication between elements of the example embodiments may be performed via a wireless LAN, Wi-Fi, Zigbee, ultra wideband (UWB), infrared data association (IrDA), Bluetooth low energy (BLE), a radio frequency (RF) signal, and the like. For example, wired communication between elements of the example embodiments may be performed via a pair cable, a coaxial cable, an optical fiber cable, an Ethernet cable, and the like.

Before describing the exemplary embodiments of the disclosure in detail, NFC technology will be described.

NFC generally refers to a contactless short-range wireless communication standard between electronic devices within a short distance of about 10 cm with low power consumption by using a frequency of about 13.56 MHz. A data transfer rate of NFC is about 424 Kbps, and NFC has excellent security features due to high proximity (i.e., a relatively close distance between electronic devices) and encryption technology. NFC forgoes a complicated pairing process for recognition of devices but allows devices to recognize one another within about 1/10 of a second or less. In particular, NFC is a smart card type contactless wireless communication technology where radio frequency identification (RFID) technology is utilized. In addition, NFC builds upon RFID technology by allowing two-way communication whereas conventional smart cards only allow one-way communication. Furthermore, NFC has a relatively large memory storage space and offers more variety of services.

In detail, NFC is a wireless communication method in which data is directly exchanged between terminals, for example, between the image forming apparatus 2810 and the NFC device 2820, without using a communication network, and is a type of RFID method. A wireless communication method using RFID may be classified according to frequencies used. For example, RFID at about 13.56 MHz is mainly used for smart cards, such as transit cards or entrance cards, and RFID at about 900 MHz is used mainly for logistics. NFC corresponds to RFID which, like smartcards, uses a frequency of about 13.56 MHz. However, unlike smartcards, which allow only one-way communication, NFC allows two-way communication. Accordingly, NFC is different from smart cards, which function merely as a tag that stores particular information and transmit the same to a reader. NFC allows a tag function according to necessity but also supports a function of recording information on the tag, and may be used in peer to peer (P2P) data exchange between terminals in which NFC is set.

Figure 29A:
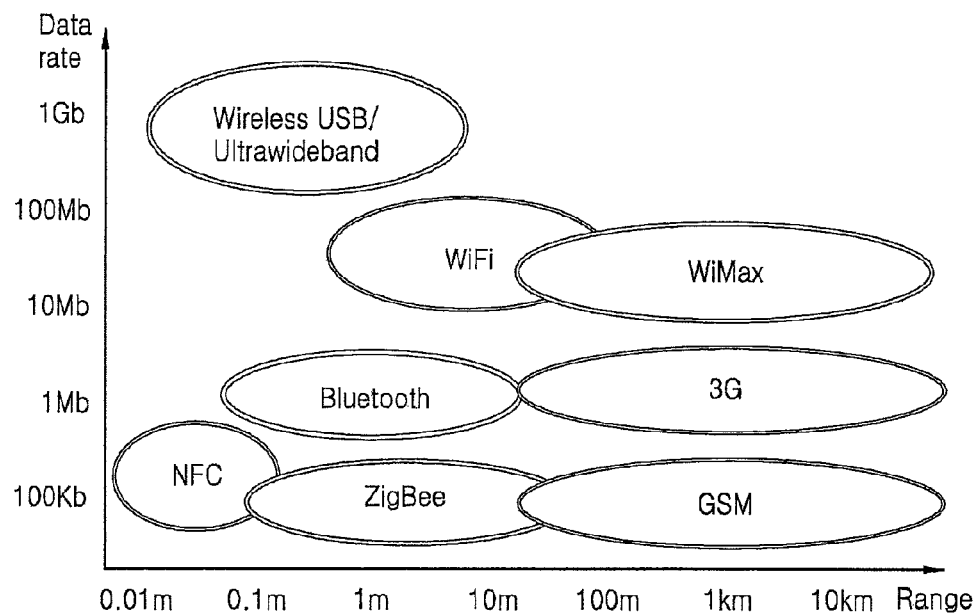
FIG. 29A is a graph comparing data rates and communication ranges of NFC and other wireless communication methods.

NFC which is developed based on RFID may be compared with other wireless communication methods, such as Wi-Fi, Bluetooth, ZigBee, etc., as illustrated in FIG. 29A.

FIG. 29A is a graph comparing data rates and communication ranges of NFC and other wireless communication methods. Referring to FIG. 29A, compared to other wireless communication methods, NFC may operate at a distance within about 10 cm. Unlike Bluetooth or Wi-Fi etc., which allow communication in about several to several tens of meters, NFC allows communication only within an extremely short distance (about 10 cm).

In addition, NFC may be compared to other wireless communication methods, such as Bluetooth, ZigBee, etc., as described in Table 1 below.

TABLE 1

| Technology | Frequency used | Security | Standard range | Major service area |
|---|---|---|---|---|
| NFC | about 13.56 MHz | Encryption is applied | International Standard | contactless payment, RFID, file transmission |
| Bluetooth | about 2.4 GHz | N/A | International Standard | file transmission |
| ZigBee | about 2.4 GHz | N/A | International Standard | device control, RFID |
| 900 MHz RFID | about 900 MHz | N/A | Korean standard | RFID |

In other words, compared to other wireless communication methods, NFC operates only within a distance of about 10 cm and encryption technology is applied thereto, and thus, a security level of NFC is high. Accordingly, when used in combination with other high-speed wireless communication methods, such as 3G or Wi-Fi, communication between devices via NFC may be performed with a higher efficiency. For example, when NFC and Bluetooth technology are combined, NFC may be used in connecting terminals (authentication) and Bluetooth may be used in data transmission between the terminals to thereby enable more efficient communication between the devices.

Figure 29B:
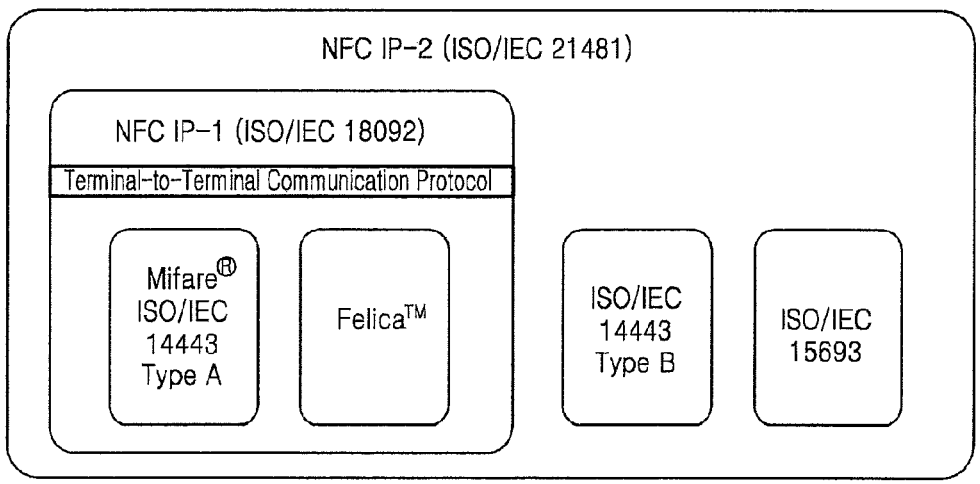
FIG. 29B is a view of standards related to NFC technology.

FIG. 29B is a view of standards related to NFC technology.

Referring to FIG. 29B, NFC standard technology follows International Organization for Standardization (ISO) and is also an extension of ISO 14443 Proximity-card Standard, and here, the inclusion relation of NFC IP-1 (NFC Interface Protocol-1)(ISO/IEC 18092) and NFC IP-2 (ISO/IEC 21481) is illustrated. Here, ISO/IEC 14443 Type A and Type B, FeliCa, and ISO/IEC 15693 are international standards of four areas of contactless cards operating at 13.56 MHz. Also, ISO/IEC 18092 defines communication modes for NFC interface and protocol.

Figure 30A:
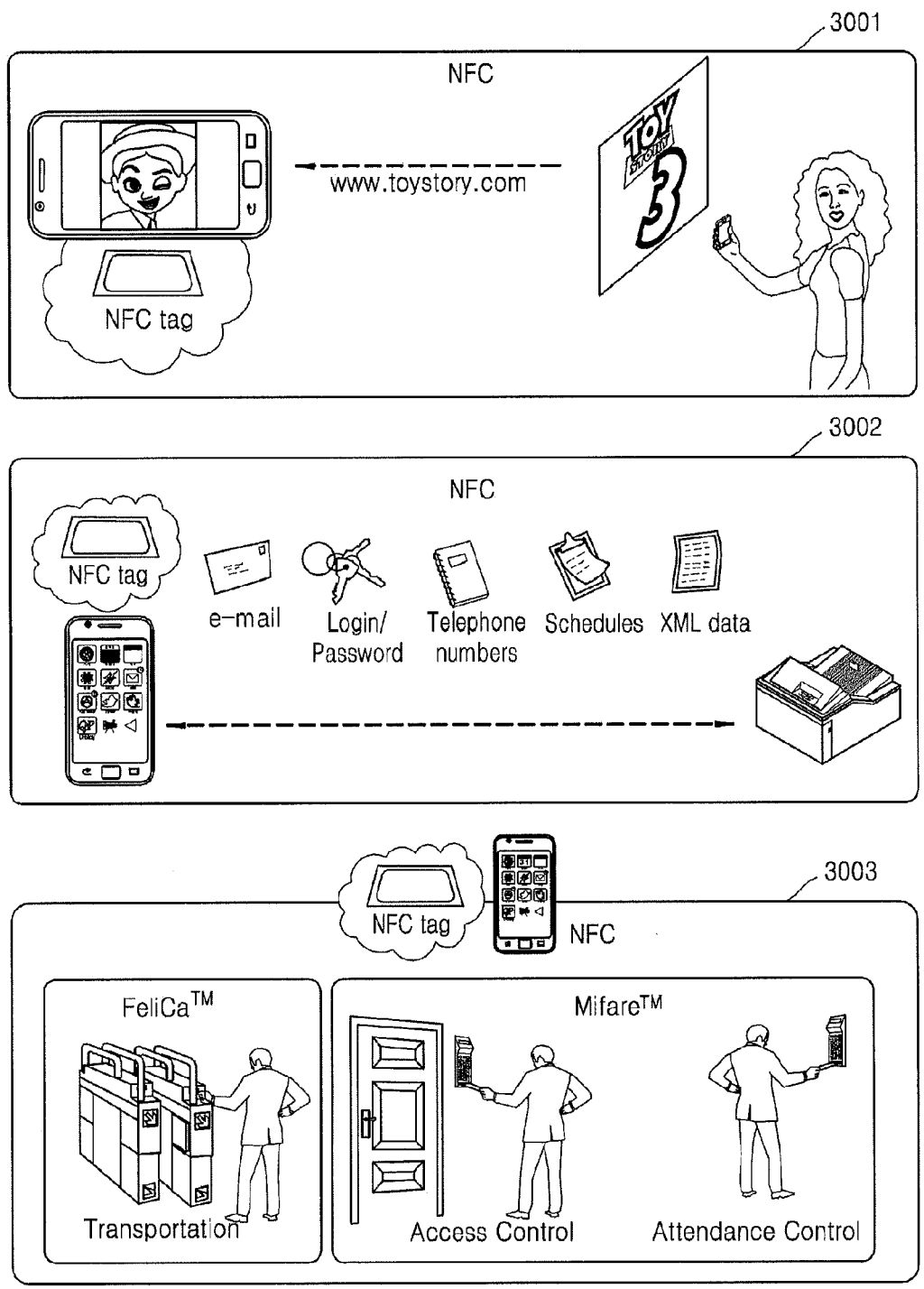
FIGS. 30A and 30B are diagrams to explain three communication modes of NFC.
Figure 30B:
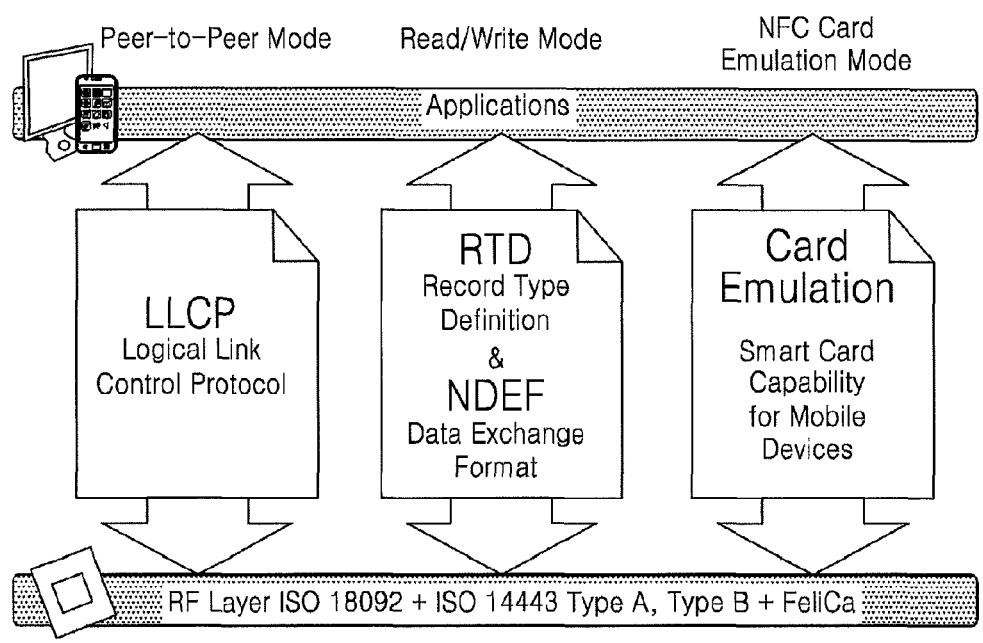

FIGS. 30A and 30B are diagrams to explain three communication modes of NFC.

Referring to FIG. 30A, the NFC Forum has standardized major NFC communication modes, which may include a Reader/Writer mode 3001, a P2P mode 3002, and a Card Emulation mode 3003. In sum, the three communication modes of NFC may be listed as in Table 2 below.

TABLE 2

|  | ISO/IEC 15693 | ISO/IEC 18092 | ISO/IEC 14443 |
|---|---|---|---|
| Operational mode | communication between reader and tag (VCD, Reader/Writer mode) | communication between devices (P2P mode) | communication between reader and tag (PCD, Card Emulation mode) |
| Power supply | Manual | active and manual | manual |
| Range of communication | about 1 m | about 10-20 cm | about 10 cm |
| Data rate | about 26 Kbps or less | about 106 Kbps, 212 Kbps, 424 Kbps | about 106 Kbps |

(PCD: Proximity Coupling Device, VCD: Vicinity Coupling Device)

First, the Reader/Writer mode 3001 supports that the NFC device 2820, in which an NFC tag 2830 is embedded, operates as a reader for reading another NFC tag 2830 or operates as a writer for inputting information to another NFC tag 2830.

In the P2P mode 3002, communication at a link level between two NFC terminals, for example, between the image forming apparatus 2810 and the NFC device 2820, is supported (ISO/IEC 18092). To establish a connection, a client (NFC P2P initiator, the NFC device 2820) searches for a host (NFC P2P target, the image forming apparatus 2810) and transmits data of an NDEF message format. In the P2P mode 3002, data, such as emails, login/password information, schedules, telephone numbers, and XML data, may be exchanged just by touching (or being in close proximity to) the image forming apparatus 2810 with the NFC device 2820.

Finally, in the Card Emulation mode 3003, the NFC device 2820, in which an NFC tag 2830 is embedded, operates as a smart card (ISO/IEC 14443). Accordingly, NFC is compatible not only with ISO 14443, which is the international standard for contactless cards, but also with FeliCa by SONY and MiFare by PHILIPS.

In order to coordinately provide the three communication modes of NFC, a protocol is standardized as illustrated in FIG. 30B. Referring to FIG. 30B, a software structure in an NFC system is illustrated.

Logical Link Control Protocol (LLCP) is a protocol that sets a communication connection between layers and controls the same. An NFC Data Exchange Format (NDEF) message is a basic message structure defined in an NFC communication protocol. The NDEF is a standard exchange format for Uniform Resource Identifier (URI), smart posters, and others, which defines a recording format regarding message exchange between NFC Forum-compatible devices and tags. An NDEF message may include at least one NDEF record. The NDEF record may include a payload that is described according to type, length, and option identifiers. An NDEF payload refers to application data included in an NDEF record. Record Type Definition (RTD) defines a record type and a type name which may correspond to an NDEF record.

Figure 31:
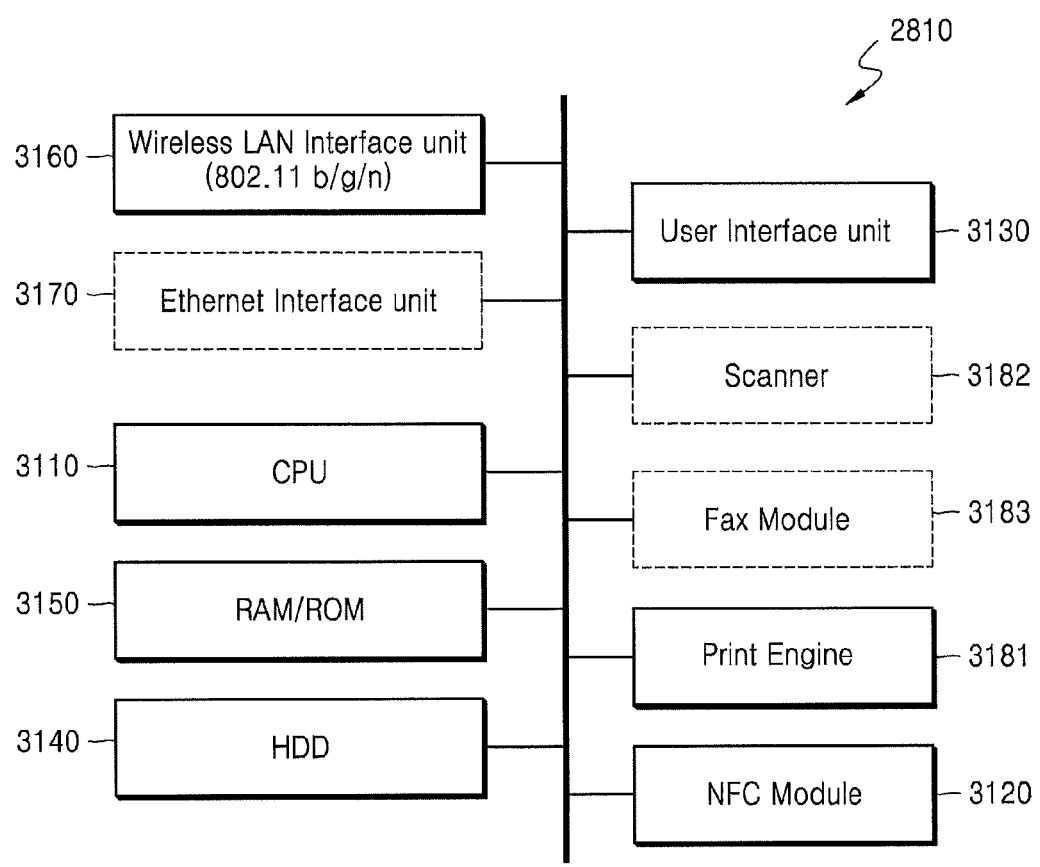
FIG. 31 is a block diagram illustrating a basic hardware structure of an image forming apparatus supporting an NFC function, according to an exemplary embodiment of the disclosure.

FIG. 31 is a block diagram illustrating a basic hardware structure of the image forming apparatus 2810 supporting an NFC function, according to an exemplary embodiment of the disclosure. Referring to FIG. 31, the image forming apparatus 2810 may include a central processing unit (CPU) 3110, an NFC module 3120, a user interface unit 3130, a hard disk drive (HDD) 3140, a random access memory/read only memory (RAM/ROM) 3150, a wireless local area network (WLAN) interface unit 3160, an Ethernet interface unit 3170, a print engine 3181, a scanner 3182, and a fax module 3183. If the image forming apparatus 2810 supports only WLAN, the Ethernet interface unit 3170 may not be included. Also, if the image forming apparatus 2810 is a printer, the scanner 3182 and the fax module 3183 may not be included.

The CPU 3110 may control the overall operation of the image forming apparatus 2810, and information needed for controlling and print data may be stored in the HDD 3140 and the RAM/ROM 3150 and read therefrom when necessary. Generally, the storage may include a storage medium, such as a nonvolatile memory device, such as a Read Only Memory (ROM), Programmable Read Only Memory (PROM), Erasable Programmable Read Only Memory (EPROM), and flash memory, a USB drive, a volatile memory device such as a Random Access Memory (RAM), a hard disk, floppy disks, a blue-ray disk, or optical media such as CD ROM discs and DVDs, or combinations thereof. However, examples of the storage are not limited to the above description, and the storage may be realized by other various devices and structures as would be understood by those skilled in the art.

The user interface unit 3130 may include hardware used as a medium for the user when the user checks information of the image forming apparatus 2810 and inputs a command to the image forming apparatus 2810. The user interface unit 3130 may be designed in various manners. For example, it may be formed in a simple form of two or four lines on a display, such as a liquid crystal display (LCD) or light emitting diode (LED), or as a graphical user interface (GUI), so as to enable various graphical representations. Generally, the user interface unit may include, for example, one or more of a keyboard (e.g., a physical keyboard, virtual keyboard, etc.), a mouse, a joystick, a button, a switch, an electronic pen or stylus, a gesture recognition sensor (e.g., to recognize gestures of a user including movements of a body part), an input sound device or voice recognition sensor (e.g., a microphone to receive a voice command), an output sound device (e.g., a speaker), a track ball, a pedal or footswitch, a virtual-reality device, etc. The user interface unit may further include a haptic device to provide haptic feedback to a user. The user interface may also include a touchscreen, for example. It is also possible that the image forming apparatus 2810 may be controlled via a user interface of a portable device (e.g., a cellular or smart) phone, a tablet PC, a remote controller, and so on. The display of the user interface unit may also include an organic light emitting diode (OLED) display, active matrix organic light emitting diode (AMOLED), flexible display, 3D display, a plasma display panel (PDP), a cathode ray tube (CRT) display, and the like, for example. The displays may also include touchscreen displays. However, the disclosure is not limited to these example displays and may include other types of displays.

The WLAN interface unit 3160 refers to hardware that performs IEEE 802.11 b/g/n functionality, and may communicate with a main board of the image forming apparatus 2810 via a universal serial bus (USB) or the like. The WLAN interface unit 3160 may also support Wi-Fi Direct at the same time.

The Ethernet interface unit 3170 refers to hardware that performs wired Ethernet communication according to IEEE 802.3.

The print engine 3181, the scanner 3182, and the fax module 3183 refer to hardware to perform a printing function, a scan function, and a fax function, respectively.

In particular, the image forming apparatus 2810 may include the NFC module 3120 to thereby communicate with other NFC devices, such as the NFC device 2820, via NFC. The NFC module 3120 may perform and/or be responsible for the NFC function and may read data from or write data to an NFC tag 2830. Also, communication with the main board of the image forming apparatus 2810 may be performed by using a Universal Asynchronous Receiver/Transmitter (UART), an Inter Integrated Circuit (I2C), a Serial Peripheral Interface Bus (SPI), and/or the like (not illustrated). As described above with reference to FIGS. 28A and 28B, the NFC module 3120 may be embedded in the image forming apparatus 2810 in advance at the time of factory shipment, or may be available when the user installs the NFC tag 2830 later.

Although not illustrated in FIG. 31, the image forming apparatus 2810 may also include other wireless communication modules, such as a Bluetooth module or a ZigBee module. For example, the image forming apparatus 2810 may perform wired and/or wireless communication over networks including a local area network (LAN), wireless local area network (WLAN), wide area network (WAN), personal area network (PAN), virtual private network (VPN), or the like. For example, wireless communication between elements of the example embodiments may also be performed via a wireless LAN, Wi-Fi, Wi-Fi direct (WFD), ultra wideband (UWB), infrared data association (IrDA), Bluetooth low energy (BLE), a radio frequency (RF) signal, and the like. For example, wired communication between elements of the example embodiments may be performed via a pair cable, a coaxial cable, an optical fiber cable, an Ethernet cable, and the like.

Figure 32:
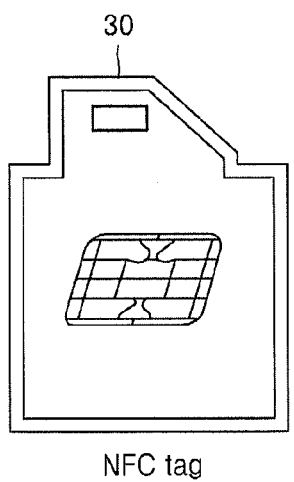
FIG. 32 illustrates an NFC tag and information stored in the NFC tag installed in the image forming apparatus of FIG. 28B.

FIG. 32 illustrates the NFC tag 2830 installed in the image forming apparatus 2810 of FIG. 28B and information 3210 stored in the NFC tag 2830. Referring to FIG. 32, in the case of the image forming apparatus 2810 of FIG. 28B, the NFC function may be utilized when the NFC tag 2830 is installed in the image forming apparatus 2810 (e.g., by being inserted into a slot (not illustrated) pre-existing or provided in advance in the image forming apparatus 2810). The information 3210 of the NFC tag 2830 may include, for example, performance information of the image forming apparatus 2810, and may be recorded by other NFC devices in the Reader/Writer mode 3001 or may be stored in advance by a user (e.g., a manager). For example, as shown in FIG. 32, the information of the image forming apparatus 2810 may include the device name, identification information of the image forming apparatus (e.g., a serial number), capabilities of the image forming apparatus (e.g., whether a printer is able to print in color, grayscale, or black and white only, whether the printer is a duplex printer, etc., a resolution of a scanner, a bit rate of a facsimile, etc.), network address information, location information, administrator information, etc.

Meanwhile, the NFC operating modes described above with reference to FIGS. 30A and 30B, such as the Reader/Writer mode 3001, the P2P mode 3002, and the Card Emulation mode 3003 may be converted according to a timing based on a polling loop or a polling cycle which are known to those of ordinary skill in the art.

In detail, in the NFC module 3120 of the image forming apparatus 2810, NFC operating modes as described above are converted to one another according to a polling loop. Also, in an NFC module of the NFC device 2820, NFC operating modes are converted according to a polling loop. So that the image forming apparatus 2810 and the NFC device 2820 may be tagged by each other via NFC, one of the image forming apparatus 2810 and the NFC device 2820 is to be set in an NFC operating mode for reception, and the other is to be set in an NFC operating mode for transmission.

For example, when the NFC module 3120 of the image forming apparatus 2810 is set in the Card Emulation mode 3003 at a timing of a polling loop, the NFC module of the NFC device 2820 may be tagged by the NFC module 3120 of the image forming apparatus 2810 via NFC when the NFC module of the NFC device 3120 is set in the Reader/Writer mode 3001 at a timing of the polling loop. However, when the NFC module 3120 of the image forming apparatus 2810 is set in the Card Emulation mode 3003 at the timing of the polling loop and the NFC module of the NFC device 2820 is also set in the Card Emulation mode 3003 at a timing of the polling loop, the NFC module 3120 of the image forming apparatus 2810 and the NFC module of the NFC device 2820 are set in NFC operating modes where they are not able to transmit or receive information to or from each other and thus may not be tagged by each other via NFC.

As a result, when NFC operating modes are converted to one another at a timing based on a polling loop or a polling cycle, the image forming apparatus 2810 or the NFC device 2820 are to be on standby until a timing when NFC operating modes are paired, and thus, unnecessary time may be consumed for NFC tagging. In particular, when various jobs are performed in each device via NFC tagging, NFC operating modes are to be frequently converted according to progress of the jobs instead of a single NFC operating mode being fixed, and more time may be unnecessarily consumed.

Hereinafter, a detailed function and operation for setting NFC operating modes without using a polling loop or a polling cycle in an image forming apparatus 3300 according to an embodiment of the disclosure will be described in detail with reference to the drawings.

Figure 33:
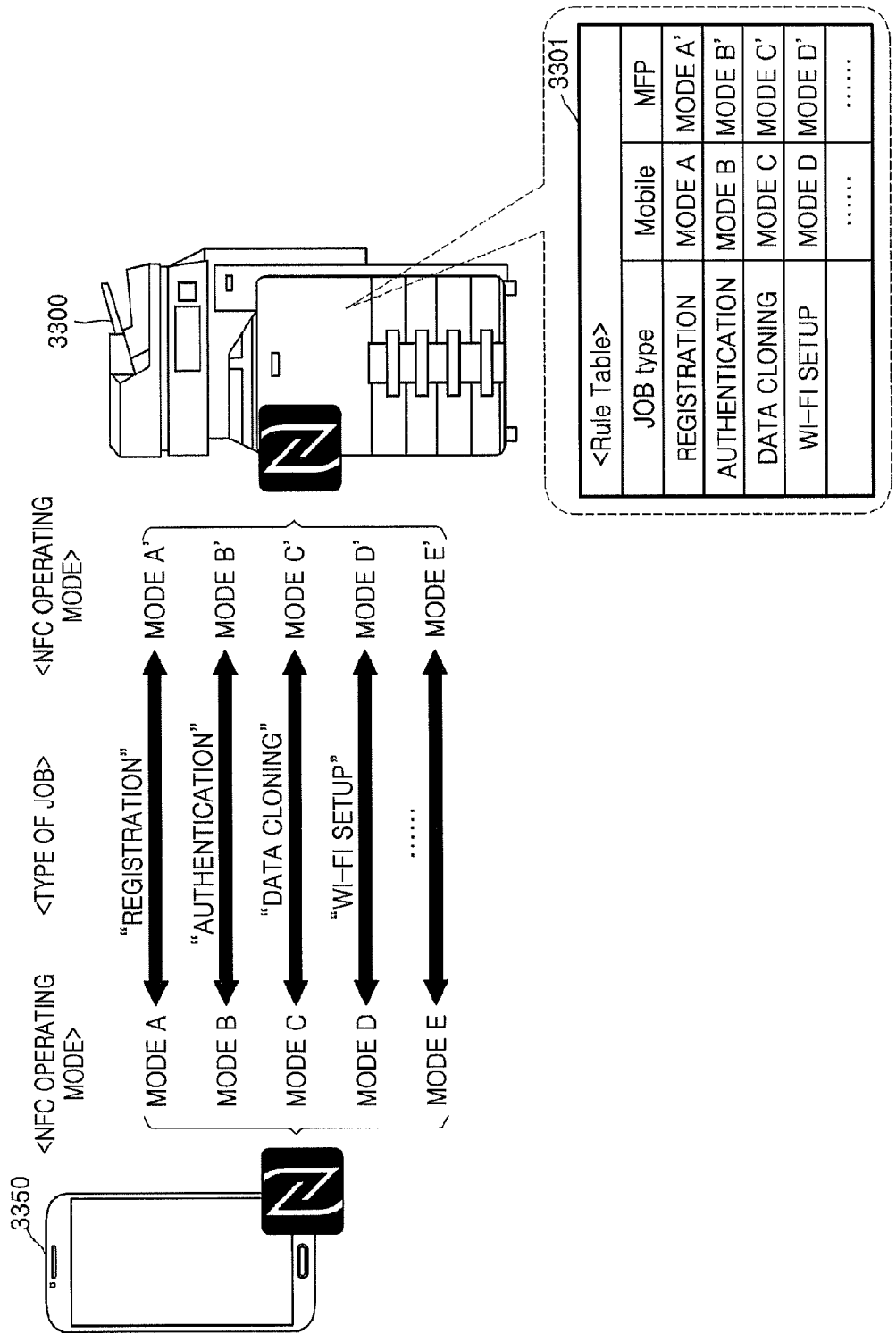
FIG. 33 illustrates an operation of setting NFC operating modes to perform various jobs via NFC tagging between an image forming apparatus and a mobile device, according to an embodiment of the disclosure.

FIG. 33 illustrates an operation of setting NFC operating modes to perform various jobs via NFC tagging between an image forming apparatus 3300 and a mobile device 3350, according to an embodiment of the disclosure.

Referring to FIG. 33, the image forming apparatus 3300 and the mobile device 3350 may set NFC operating modes without using a polling loop or a polling cycle as described above.

The image forming apparatus 3300 and the mobile device 3350 may respectively correspond to the image forming apparatus 2810 and the NFC device 2820 described above with reference to the drawings.

The mobile device 3350 supporting an NFC function may perform various jobs such as a registration job of the mobile device 3350, an authentication job of the mobile device 3350, a data cloning job, a Wi-Fi setup job, a trouble shooting job, or an image forming job, via NFC tagging with the image forming apparatus 3300 that supports an NFC function.

In the mobile device 3350 and the image forming apparatus 3300, NFC operating modes that are to be set may be defined for each job. For example, for a registration job of the mobile device 3350, the mobile device 3350 is to be set in a mode a, and the image forming apparatus 3300 is to be set in a mode a'. Alternatively, or additionally, for an authentication job of the mobile device 3350, the mobile device 3350 is to be set in a mode b, and the image forming apparatus 3300 is to be set in a mode b'. Alternatively, or additionally, for a data cloning job, the mobile device 3350 is to be set in a mode c, and the image forming apparatus 3300 is to be set in a mode c'. Alternatively, or additionally, for a Wi-Fi setup job, the mobile device 3350 is to be set in a mode d, and the image forming apparatus 3300 is to be set in a mode d'.

Modes a through e or modes a' through e' illustrated in FIG. 33 may each be one of the Reader/Writer mode 3001, the P2P mode 3002, and Card Emulation mode 3003 described above with reference to FIGS. 30A and 30B. Also, modes a through e or modes a' through e' may be differently expressed for convenience of description and may indicate different or identical NFC operating modes.

The image forming apparatus 3300 may manage information about NFC operating modes that are to be set in the image forming apparatus 3300 and the mobile device 3350 according to types of jobs by using a rule table 3301. The rule table 3301 may include a table that defines a mapping relationship between types of jobs and a plurality of NFC operating modes (e.g., read/write mode, card emulation mode, and P2P mode). The rule table 3301 may include a table that defines a mapping relationship between types of jobs and a plurality of NFC operating modes for two specific electronic devices (e.g., between an image forming apparatus and a mobile device). The types of jobs provided in the rule table 3301 may include one or more of registration, authentication, data cloning, and WI-FI setup. However the disclosure is not so limited, and other types of job types may also be included.

When the mobile device 3350 is to be registered to the image forming apparatus 3300 via NFC tagging, the image forming apparatus 3300 may refer to mapping information defined in the rule table 3301 to set mode a' as an NFC operating mode of the image forming apparatus 3300 for a registration job. The image forming apparatus 3300 may set an NFC operating mode by referring to mapping information defined in the rule table 3301 also when another different type of job is performed instead of a registration job.

Meanwhile, when an NFC operating mode of the image forming apparatus 3300 is set to a predetermined mode, the mobile device 3350 has to set an NFC operating mode corresponding to an NFC operating mode set in the image forming apparatus 3300. The mobile device 3350 may set an NFC operating mode corresponding to the set NFC operating mode by using a polling loop or a polling cycle, or may set an NFC operating mode by using mapping information such as the rule table 3301 that is previously stored in the image forming apparatus 3300. For example, the mobile device may include a rule table in a storage of the mobile device. That is, a method of setting an NFC operating mode of the mobile device 3350 is not limited.

Accordingly, even when a polling loop or a polling cycle is not used, the image forming apparatus 3300 may immediately convert and set an NFC operating mode according to a condition of a job that is to be currently performed in the image forming apparatus 3300. Thus, the image forming apparatus 3300 and the mobile device 3350 do not have to be on standby until a timing when NFC operating modes are paired.

Figure 34:
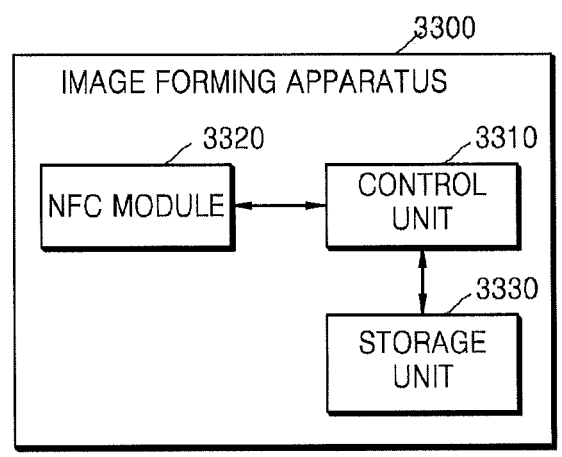
FIG. 34 is a block diagram illustrating a hardware structure of an image forming apparatus that sets NFC operating modes by using a rule table, according to an embodiment of the disclosure.

FIG. 34 is a block diagram illustrating a hardware structure of the image forming apparatus 3300 that sets NFC operating modes by using a rule table, according to an embodiment of the disclosure.

In FIG. 34, only hardware components related to the current exemplary embodiment of the disclosure will be described in order not to obscure the characteristics of the current exemplary embodiment. However, it will be understood by one of ordinary skill in the art that general-use hardware components other than the illustrated hardware components in FIG. 34 may also be included.

Referring to FIG. 34, the image forming apparatus 3300 is illustrated as including just hardware components related to the current exemplary embodiment from among the hardware components of the image forming apparatus 2810 illustrated in FIG. 31. However, it will be understood by one of ordinary skill in the art that elements that are omitted in FIG. 34 but described with reference to the image forming apparatus 2810 of FIG. 31 may also be applied to the image forming apparatus 3300.

The image forming apparatus 3300 may include a control unit 3310, an NFC module 3320, and a storage unit 3330. In FIG. 34, the control unit 3310 corresponds to the CPU 3110 of FIG. 31, the NFC module 3320 corresponds to the NFC module 3120 of FIG. 31, and the storage unit 3330 may correspond to the HDD 3140 of FIG. 31. However, generally, the storage unit 3330 may include a storage medium, such as a nonvolatile memory device, such as a Read Only Memory (ROM), Programmable Read Only Memory (PROM), Erasable Programmable Read Only Memory (EPROM), and flash memory, a USB drive, a volatile memory device such as a Random Access Memory (RAM), a hard disk, floppy disks, a blue-ray disk, or optical media such as CD ROM discs and DVDs, or combinations thereof. However, examples of the storage are not limited to the above description, and the storage may be realized by other various devices and structures as would be understood by those skilled in the art.

The storage unit 3330 may store a rule table that defines a mapping relationship between types of jobs and a plurality of NFC operating modes (a read/write mode, a card emulation mode, and a P2P mode). For example, the rule table may be stored in advance (e.g., at a time of manufacture of the image forming apparatus) or may be stored at a later time (e.g., by loading a rule table into the storage unit via a wired and/or wireless connection or a combination thereof).

FIG. 35 illustrates a rule table 3501 that defines a mapping relationship between types of jobs and a plurality of NFC operating modes, according to an embodiment of the disclosure.

Referring to FIG. 35, job type items of the rule table 3501 may include a list of jobs that may be performed as the image forming apparatus 3300 and the mobile device 3350 are tagged via NFC. That is, examples of job types may include a registration job of the mobile device 3350, an authentication job of the mobile device 3350, a data cloning job, a Wi-Fi setup job, a trouble shooting job, and an image forming job (e.g., printing, faxing, etc.). The registration job may include a first registration method in which the mobile device 3350 is registered by using a printing application installed in the mobile device 3350 and a second registration method in which the mobile device 3350 is registered via a user interface screen of the image forming apparatus 3300. Also, the authentication job may include a first NFC authentication method by using a printing application installed in the mobile device 3350 and a second NFC authentication method by using an NFC tag mounted in the mobile device 3350. However, not all job types are illustrated in the job type items illustrated in the rule table 3501, and the rule table 3501 may also include other various job types.

In items of the rule table 3501 with respect to of a mobile device and an image forming apparatus, NFC operating modes that are to be set in the image forming apparatus 3300 and the mobile device 3350 may be defined according to respective job types. For example, when a job to be performed by using the mobile device 3350 is a registration job of a first registration method, the rule table 3501 defines a write mode for the mobile device 3350 and a card emulation mode for the image forming apparatus 3300.

That is, the image forming apparatus 3300 sets an NFC operating mode corresponding to a job to be currently performed, by referring to a mapping relationship in regard to NFC operating modes that are defined by the rule table 3501 stored in the storage unit 3330.

The job types and the NFC operating modes defined in the rule table 3501 illustrated in FIG. 35 are exemplary for convenience of description of the present embodiment and the current embodiment is not limited to the rule table 3501. That is, the rule table 3501 may also include other jobs, and the NFC operating modes may be defined differently from the rule table 3501.

Referring to FIG. 34 again, the control unit 3310 may determine a type of a job that is to be performed in the image forming apparatus 3300 by NFC tagging of the mobile device 3350. That is, the control unit 3310 may determine which job from among job type items of the rule table 3501 of FIG. 35 a job to be performed by the image forming apparatus 3300 with the mobile device 3350 corresponds to.

The control unit 3310 may determine a first NFC operating mode corresponding to a type of a job that is determined, from among a plurality of NFC operating modes (e.g., a read/write mode, a card emulation mode, and a P2P mode) that are supported by an NFC module. Here, the control unit 3310 may determine a first NFC operating mode of the image forming apparatus 3300 that is mapped to a type of a job that is determined based on the rule table 810.

The NFC module 3320 may set a first NFC operating mode that is determined by using the control unit 3310 as an operating state of the NFC module 3320. That is, the NFC module 3320 does not set an NFC operating mode thereof according to a polling loop or a polling cycle but activates a first NFC operating mode corresponding to a job that is to be currently performed in the image forming apparatus 3300, according to control by the control unit 3310. Accordingly, NFC operating modes that are to be set in the NFC module 3320 may be converted according to control by the control unit 3310.

The NFC module 3320 may recognize access of the mobile device 3350 according to an NFC protocol, when a first NFC operating mode is activated. In order to establish a connection via NFC tagging, the mobile device 3350 corresponding to a client has to access the image forming apparatus 3300 corresponding to a host within a proximity range of about 10 cm.

When the mobile device 3350 is tagged via NFC by using the first NFC operating mode set in the NFC module 3320, the control unit 3310 may perform a job by using an NFC connection with respect to the mobile device 3350.

Hereinafter, an operation of setting NFC operating modes in the image forming apparatus 3300 according to types of jobs will be described in detail.

FIG. 36 illustrates an operation of setting an NFC operating mode in an image forming apparatus 3300 when performing a registration job of a first registration method, according to an embodiment of the disclosure.

As described above, the first registration method refers to a method in which the mobile device 3350 is registered by using a printing application installed in the mobile device 3350.

In operation 3601, the control unit 3310 of the image forming apparatus 3300 launches a function related to a registration job of the first registration method. Here, the control unit 3310 may launch a function related to the registration job by executing a printing application on an operating system (OS) that is previously installed in the image forming apparatus 3300.

In operation 3602, the mobile device 3350 launches the printing application. The printing application installed in the mobile device 3350 corresponds to an application via which various functions such as a printing function, a faxing function, or a Wi-Fi setup function may be controlled. The mobile device 3350 launches a function related to the registration job from among various functions that are supported by a printing application.

In operation 3603, the mobile device 3350 stores information for registration of the mobile device 3350 to an NFC tag mounted in the mobile device 3350 by using a printing application. The stored registration information may include a unique identification (UID) or a login identification (ID) and/or a password (PW) of a printing application installed in the mobile device 3350.

In operation 3604, the control unit 3310 of the image forming apparatus 3300 determines an NFC operating mode corresponding to the registration job of the first registration method based on the rule table 3501 of FIG. 35. According to the rule table 3501 of FIG. 35, the NFC operating mode of the image forming apparatus 3300 corresponding to the registration job of the first registration method is a card emulation mode. Accordingly, the control unit 3310 determines a card emulation mode as the NFC operating mode of the image forming apparatus 3300.

In operation 3605, the NFC module 3320 of the image forming apparatus 3300 activates a card emulation mode.

In operation 3606, the mobile device 3350 activates a write mode as an NFC operating mode corresponding to the registration job of the first registration method. The mobile device 3350 may set as an NFC operating mode a write mode that may be paired with a card emulation mode of the image forming apparatus 3300 according to a polling loop or a polling cycle. Alternatively, the mobile device 3350 may previously store information such as the rule table 3501 of FIG. 35 and an NFC operating mode may be controlled based on the rule table 3501 that is stored similarly as in the image forming apparatus 3300. However, setting up of an NFC operating mode in the mobile device 3350 is not limited to any one method.

In operation 3607, when the card emulation mode is activated in the image forming apparatus 3300, and the write mode is activated in the mobile device 3350, the image forming apparatus 3300 tags the mobile device 3350 via NFC.

In operation 3608, the mobile device 3350 transmits registration information stored in the NFC tag of the mobile device 3350 to the NFC module 3320.

In operation 3609, the control unit 3310 of the image forming apparatus 3300 registers the mobile device 3350 based on the transmitted registration information.

Meanwhile, while operations 3601 through 3606 of FIG. 36 are described as being performed in time series for convenience of description, the order of operations 3601 through 3606 may be modified, and any such order may be included in the scope of the disclosure. That is, as long as the card emulation mode of the image forming apparatus 3300 and the write mode of the mobile device 3350 may be activated, the order of operations 3601 through 3606 may be modified. For example, the mobile device may activate the write mode before, after, or simultaneously with the activation of the card emulation mode by the image forming apparatus. Likewise, the mobile device may activate the write mode before, after, or simultaneously with any of operations 3601, 3604, and 3605 performed by the image forming apparatus. That is, operations 3602, 3603, and 3606 performed by the mobile device may be performed independently of any of operations 3601, 3604, and 3605 which are performed by the image forming apparatus.

FIG. 37 illustrates an operation of setting an NFC operating mode in an image forming apparatus 3300 when performing a registration job of a second registration method, according to an embodiment of the disclosure.

As described above, the second registration method refers to a method in which the mobile device 3350 is registered via a user interface screen of the image forming apparatus 3300.

In operation 3701, the control unit 3310 of the image forming apparatus 3300 launches a function related to the registration job of the second registration method. The control unit 3310 may launch a function related to the registration job by launching a printing application on an OS that is previously installed in the image forming apparatus 3300.

In operation 3702, a user of the image forming apparatus 3300 enters a menu for registering the mobile device 3350 according to the second registration method via a user interface screen of the image forming apparatus 3300.

In operation 3703, the control unit 3310 of the image forming apparatus 3300 determines an NFC operating mode corresponding to the registration job of the second registration method based on the rule table 3501 of FIG. 35. According to the rule table 3501 of FIG. 35, the NFC operating mode of the image forming apparatus 3300 corresponding to the registration job of the second registration method is a read mode. Accordingly, the control unit 3310 determines a read mode as the NFC operating mode of the image forming apparatus 3300.

In operation 3704, the NFC module 3320 of the image forming apparatus 3300 activates the read mode.

In operation 3705, the mobile device 3350 activates a card emulation mode as an NFC operating mode corresponding to the registration job of the second registration method.

In operation 3706, when the read mode is activated in the image forming apparatus 3300 and the card emulation mode is activated in the mobile device 3350, the image forming apparatus 3300 tags the mobile device 3350 via NFC.

In operation 3707, the mobile device 3350 transmits registration information (e.g., a UID) of an NFC tag thereof to the NFC module 3320 of the image forming apparatus 3300.

In operation 3708, the control unit 3310 of the image forming apparatus 3300 registers the mobile device 3350 based on the transmitted registration information (e.g., a UID).

Meanwhile, while operations 3701 through 3705 of FIG. 37 are described as being performed in time series for convenience of description, the order of operations 3701 through 3705 may be modified, and any such order may be included in the scope of the disclosure. That is, as long as the read mode of the image forming apparatus 3300 and the card emulation mode of the mobile device 3350 may be activated, the order of operations 3701 through 3705 may be modified. For example, the mobile device may activate the card emulation mode before, after, or simultaneously with the activation of the read mode by the image forming apparatus. Likewise, the mobile device may activate the card emulation mode before, after, or simultaneously with any of operations 3701 through 3704 performed by the image forming apparatus. That is, operation 3705 performed by the mobile device may be performed independently of any of operations 3701 through 3704 which are performed by the image forming apparatus.

FIG. 38 illustrates an operation of setting an NFC operating mode in an image forming apparatus 3300 when performing an authentication job of a first NFC authentication method, according to an embodiment of the disclosure.

As described above, the first NFC authentication method refers to a method in which the mobile device 3350 is registered by using a printing application installed in the mobile device 3350.

In operation 3801, the control unit 3310 of the image forming apparatus 3300 launches a function related to the authentication job of the first NFC authentication method. The control unit 3310 may launch a function related to the authentication job by launching a printing application on an OS that is previously installed in the image forming apparatus 3300.

In operation 3802, the mobile device 3350 launches the printing application.

In operation 3803, the control unit 3310 of the image forming apparatus 3300 determines an NFC operating mode corresponding to the authentication job of the first NFC authentication method based on the rule table 3501 of FIG. 35. According to the rule table 3501 of FIG. 35, the NFC operating mode of 60 corresponding to an authentication job of the first NFC authentication method is a card emulation mode. Accordingly, the control unit 3310 determines the card emulation mode as the NFC operating mode of the image forming apparatus 3300.

In operation 3804, the NFC module 3320 of the image forming apparatus 3300 activates the card emulation mode.

In operation 3805, the mobile device 3350 activates a write mode as an NFC operating mode corresponding to the authentication job of the first NFC authentication method.

In operation 3806, when the card emulation mode is activated in the image forming apparatus 3300, and the write mode is activated in the mobile device 3350, the image forming apparatus 3300 tags the mobile device 3350 via NFC.

In operation 3807, the mobile device 3350 transmits registration information (e.g., a UID of the printing application installed in the mobile device 3350 and/or an ID and/or a PW set in the printing application) to the NFC module 3320.

In operation 3808, the control unit 3310 of the image forming apparatus 3300 authenticates the mobile device 3350 based on the transmitted registration information (e.g., a UID and/or the ID and/or the PW) that is transmitted.

Meanwhile, while operations 3801 through 3805 of FIG. 38 are described as being performed in time series for convenience of description, the order of operations 3801 through 3805 may be modified, and any such order may be included in the scope of the disclosure. That is, as long as the card emulation mode of the image forming apparatus 3300 and the write mode of the mobile device 3350 may be activated, the order of operations 3801 through 3805 may be modified. For example, the mobile device may activate the write mode before, after, or simultaneously with the activation of the card emulation mode by the image forming apparatus. Likewise, the mobile device may activate the write mode before, after, or simultaneously with any of operations 3801, 3803, and 3804 performed by the image forming apparatus. That is, operations 3802 and 3805 performed by the mobile device may be performed independently of any of operations 3801, 3803, and 3804 which are performed by the image forming apparatus.

FIG. 39 illustrates an operation of setting an NFC operating mode in an image forming apparatus 3300 when performing an authentication job of a second NFC authentication method, according to an embodiment of the disclosure.

As described above, the second NFC authentication method refers to a method in which the mobile device 3350 is authenticated by using an NFC tag mounted in the mobile device 3350.

In operation 3901, the control unit 3310 of the image forming apparatus 3300 launches a function related to the authentication job of the second NFC authentication method. The control unit 3310 may launch a function related to the authentication job by launching a printing application on an OS that is previously installed in the image forming apparatus 3300.

In operation 3902, the control unit 3310 of the image forming apparatus 3300 determines an NFC operating mode corresponding to the authentication job of the second NFC authentication method based on the rule table 3501 of FIG. 35. According to the rule table 3501 of FIG. 35, the NFC operating mode of the image forming apparatus 3300 corresponding to the authentication job of the second NFC authentication method is a read mode. Accordingly, the control unit 3310 determines the read mode as the NFC operating mode of the image forming apparatus 3300.

In operation 3903, the NFC module 3320 of the image forming apparatus 3300 activates the read mode.

In operation 3904, the mobile device 3350 activates the card emulation mode as an NFC operating mode corresponding to the authentication job of the second NFC authentication method.

In operation 3905, when the read mode is activated in the image forming apparatus 3300, and the card emulation mode is activated in the mobile device 3350, the image forming apparatus 3300 tags the mobile device 3350 via NFC.

In operation 3906, the mobile device 3350 transmits authentication information (e.g., a UID) of the NFC tag thereof to the NFC module 3320 of the image forming apparatus 3300.

In operation 3907, the control unit 3310 of the image forming apparatus 3300 authenticates the mobile device 3350 based on the transmitted authentication information (e.g., a UID).

Meanwhile, while operations 3901 through 3904 of FIG. 39 are described as being performed in time series for convenience of description, the order of operations 3901 through 3904 may be modified, and any such order may be included in the scope of the disclosure. That is, as long as the read mode of the image forming apparatus 3300 and the card emulation mode of the mobile device 3350 may be activated, the order of operations 3901 through 3904 may be modified. For example, the mobile device may activate the card emulation mode before, after, or simultaneously with the activation of the read mode by the image forming apparatus. Likewise, the mobile device may activate the card emulation mode before, after, or simultaneously with any of operations 3901, 3902, and 3903 performed by the image forming apparatus. That is, operation 3904 performed by the mobile device may be performed independently of any of operations 3901, 3902, and 3903 which are performed by the image forming apparatus.

FIG. 40 illustrates an operation of setting an NFC operating mode in an image forming apparatus 3300 and another image forming apparatus 3370 when performing a data cloning job, according to an embodiment of the disclosure.

The image forming apparatus 3370 is a separate independent device from the image forming apparatus 3300. However, it is assumed that the image forming apparatus 3370 has the same or similar hardware structure as that of the image forming apparatus 3300 described with reference to FIG. 34 for purposes of supporting NFC operations according to the embodiments disclosed herein.

In operation 4001, the control unit 3310 of the image forming apparatus 3300 launches a function related to the data cloning job. The control unit 3310 may launch a function related to the data cloning job by launching a printing application on an OS that is previously installed in the image forming apparatus 3300.

In operation 4002, the mobile device 3350 launches the printing application.

In operation 4003, the control unit 3310 of the image forming apparatus 3300 determines an NFC operating mode corresponding to the data cloning job based on the rule table 3501 of FIG. 35. According to the rule table 3501 of FIG. 35, the NFC operating mode of the image forming apparatus 3300 corresponding to the data cloning job is a card emulation mode. Accordingly, the control unit 3310 determines a card emulation mode as the NFC operating mode of the image forming apparatus 3300.

In operation 4004, the NFC module 3320 of the image forming apparatus 3300 activates the card emulation mode.

In operation 4005, the mobile device 3350 activates a write mode as an NFC operating mode corresponding to the data cloning job.

In operation 4006, when the card emulation mode is activated in the image forming apparatus 3300, and the write mode is activated in the mobile device 3350, the image forming apparatus 3300 tags the mobile device 3350 via NFC.

In operation 4007, the image forming apparatus 3300 and the mobile device 3350 establish a Wi-Fi connection by exchanging information about a Wi-Fi setup via NFC tagging.

In operation 4008, the image forming apparatus 3300 transmits information used in data cloning, to the mobile device 3350.

In operation 4009, the image forming apparatus 3370 launches a function related to the data cloning job.

In operation 4010, the image forming apparatus 3370 determines an NFC operating mode thereof corresponding to the data cloning job of the first NFC authentication method based on the rule table 3501 of FIG. 35. According to the rule table 3501 of FIG. 35, the NFC operating mode of the image forming apparatus 3370 corresponding to the data cloning job is a card emulation mode. Accordingly, the control unit 3310 (of image forming apparatus 3370) determines a card emulation mode as the NFC operating mode of the image forming apparatus 3370.

In operation 4011, the image forming apparatus 3370 activates the card emulation mode.

In operation 4012, when the card emulation mode is activated in the image forming apparatus 3370, and the write mode is activated in the mobile device 3350, the image forming apparatus 3370 tags the mobile device 3350 via NFC.

In operation 4013, the image forming apparatus 3370 and the mobile device 3350 establish a Wi-Fi connection by exchanging information about a Wi-Fi setup via NFC tagging.

In operation 4014, the mobile device 3350 transmits information used in data cloning to the image forming apparatus 3370.

Meanwhile, while operations 4001 through 4005 of FIG. 40 are described as being performed in time series for convenience of description, the order of operations 4001 through 4005 may be modified, and any such order may be included in the scope of the disclosure. That is, as long as the card emulation mode of the image forming apparatus 3300 and the write mode of the mobile device 3350 may be activated, the order of operations 4001 through 4005 may be modified. For example, the mobile device may activate the write mode before, after, or simultaneously with the activation of the card emulation mode by the image forming apparatus. Likewise, the mobile device may activate the write mode before, after, or simultaneously with any of operations 4001, 4003, and 4004 performed by the image forming apparatus. That is, operations 4002 and 4005 performed by the mobile device may be performed independently of any of operations 4001, 4003, and 4004 which are performed by the image forming apparatus. In addition, operations 4009 through 4011 may be launched (performed) at points of time that are not related to (independent of) operations 4001 through 4008, and this may be included in the scope of the disclosure.

Figure 41:
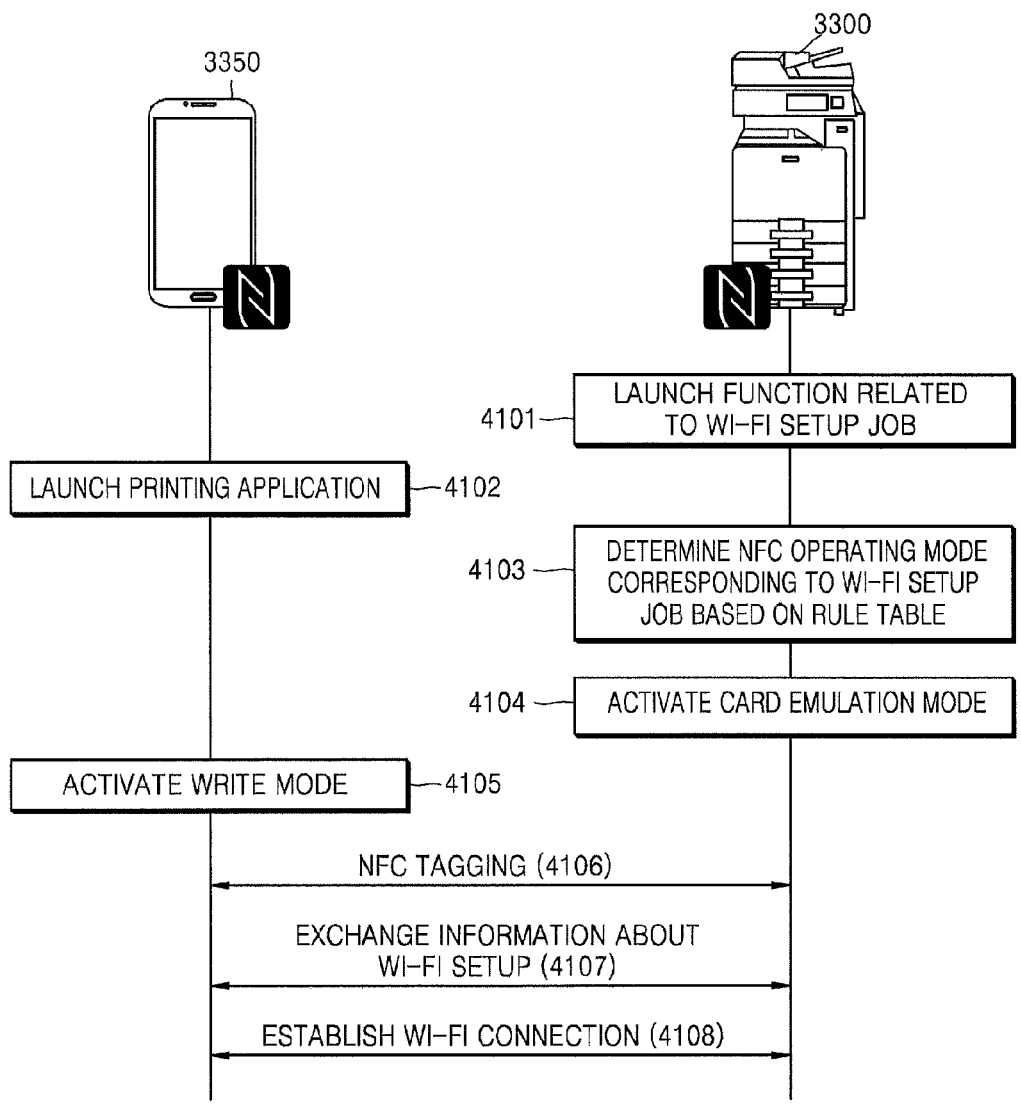
FIG. 41 illustrates an operation of setting an NFC operating mode in an image forming apparatus when performing a Wi-Fi setup job, according to an embodiment of the disclosure.

FIG. 41 illustrates an operation of setting an NFC operating mode in an image forming apparatus 3300 when performing a Wi-Fi setup job, according to an embodiment of the disclosure.

In operation 4101, the control unit 3310 of the image forming apparatus 3300 launches a function related to a Wi-Fi setup job. The control unit 3310 may launch a function related to the Wi-Fi setup job by launching a printing application on an OS that is previously installed in the image forming apparatus 3300.

In operation 4102, the mobile device 3350 launches the printing application.

In operation 4103, the control unit 3310 of the image forming apparatus 3300 determines an NFC operating mode corresponding to the Wi-Fi setup job based on the rule table 3501 of FIG. 35. According to the rule table 3501 of FIG. 35, the NFC operating mode of 60 corresponding to the Wi-Fi setup job is a card emulation mode. Accordingly, the control unit 3310 determines a card emulation mode as the NFC operating mode of the image forming apparatus 3300.

In operation 4104, the NFC module 3320 of the image forming apparatus 3300 activates the card emulation mode.

In operation 4105, the mobile device 3350 activates a write mode as an NFC operating mode corresponding to the Wi-Fi setup job.

In operation 4106, when the card emulation mode is activated in the image forming apparatus 3300, and the write mode is activated in the mobile device 3350, the image forming apparatus 3300 tags the mobile device 3350 via NFC.

In operation 4107, the image forming apparatus 3300 and the mobile device 3350 exchange information about a Wi-Fi setup via NFC tagging.

In operation 4108, the image forming apparatus 3300 and the mobile device 3350 establish a Wi-Fi connection.

Meanwhile, while operations 4101 through 4105 of FIG. 41 are described as being performed in time series for convenience of description, the order of operations 4101 through 4105 may be modified, and any such order may be included in the scope of the disclosure. That is, as long as the card emulation mode of the image forming apparatus 3300 and the write mode of the mobile device 3350 may be activated, the order of operations 4101 through 4105 may be modified. For example, the mobile device may activate the write mode before, after, or simultaneously with the activation of the card emulation mode by the image forming apparatus. Likewise, the mobile device may activate the write mode before, after, or simultaneously with any of operations 4101, 4103, and 4104 performed by the image forming apparatus. That is, operations 4102 and 4105 performed by the mobile device may be performed independently of any of operations 4101, 4103, and 4104 which are performed by the image forming apparatus.

Figure 42:
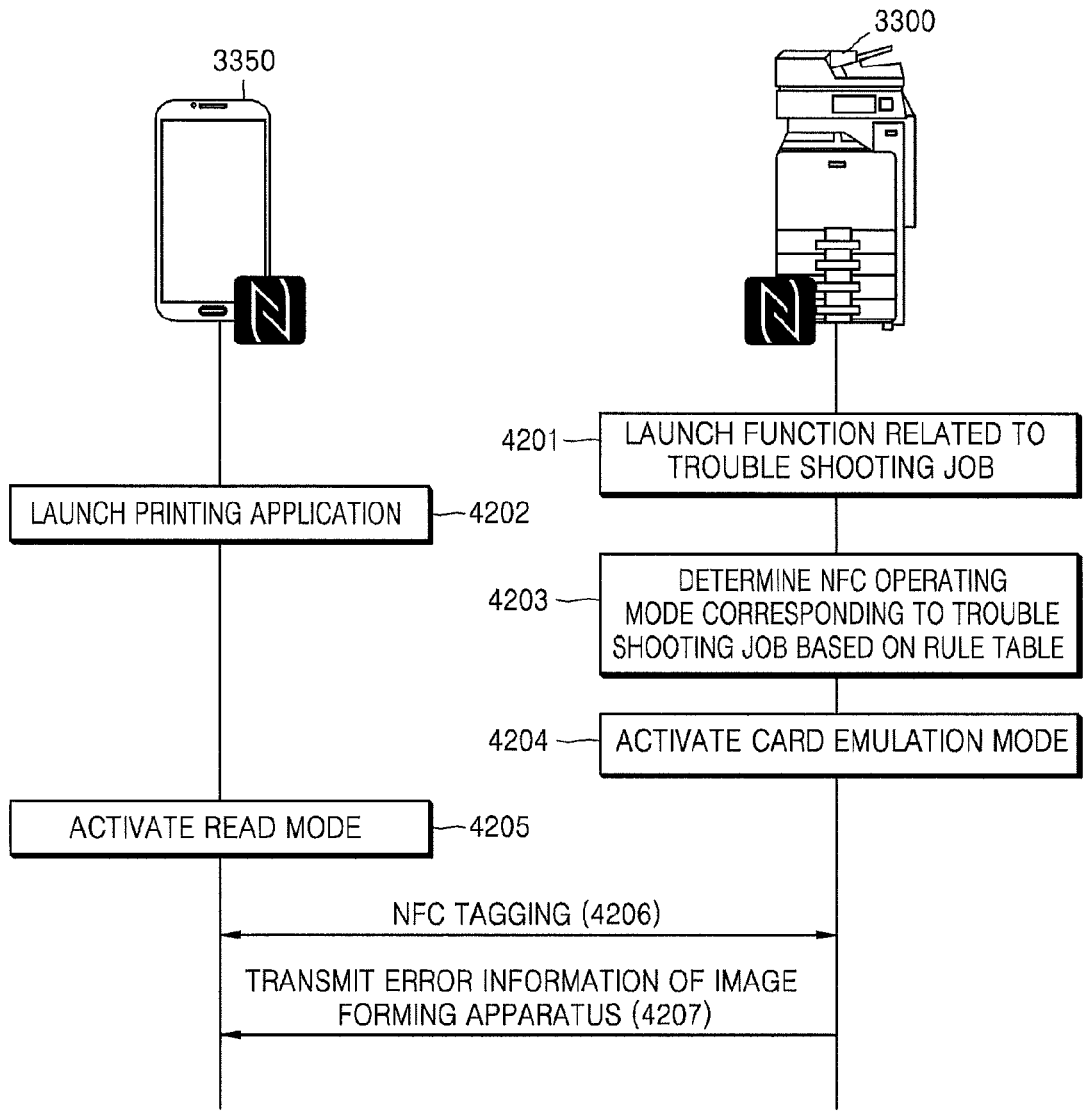
FIG. 42 illustrates an operation of setting an NFC operating mode in an image forming apparatus when performing a trouble shooting job, according to an embodiment of the disclosure.

FIG. 42 illustrates an operation of setting an NFC operating mode in an image forming apparatus 3300 when performing a trouble shooting job, according to an embodiment of the disclosure.

In operation 4201, the control unit 3310 of the image forming apparatus 3300 launches a function related to a trouble shooting job. The control unit 3310 may launch a function related to the trouble shooting job by launching a printing application on an OS that is previously installed in the image forming apparatus 3300.

In operation 4202, the mobile device 3350 launches the printing application.

In operation 4203, the control unit 3310 of the image forming apparatus 3300 determines an NFC operating mode corresponding to the trouble shooting job based on the rule table 3501 of FIG. 35. According to the rule table 3501 of FIG. 35, the NFC operating mode of 60 corresponding to the trouble shooting job is a card emulation mode. Accordingly, the control unit 3310 determines a card emulation mode as the NFC operating mode of the image forming apparatus 3300.

In operation 4204, the NFC module 3320 of the image forming apparatus 3300 activates the card emulation mode.

In operation 4205, the mobile device 3350 activates a read mode as an NFC operating mode corresponding to the trouble shooting job.

In operation 4206, when the card emulation mode is activated in the image forming apparatus 3300, and the read mode is activated in the mobile device 3350, the image forming apparatus 3300 tags the mobile device 3350 via NFC.

In operation 4207, the image forming apparatus 3300 transmits error information generated in the image forming apparatus 3300, to the mobile device 3350.

Meanwhile, while operations 4201 through 4205 of FIG. 42 are described as being performed in time series for convenience of description, the order of operations 4201 through 4205 may be modified, and any such order may be included in the scope of the disclosure. That is, as long as the card emulation mode of the image forming apparatus 3300 and the read mode of the mobile device 3350 may be activated, the order of operations 4201 through 4205 may be modified. For example, the mobile device may activate the read mode before, after, or simultaneously with the activation of the card emulation mode by the image forming apparatus. Likewise, the mobile device may activate the read mode before, after, or simultaneously with any of operations 4201, 4203, and 4204 performed by the image forming apparatus. That is, operations 4202 and 4205 performed by the mobile device may be performed independently of any of operations 4201, 4203, and 4204 which are performed by the image forming apparatus.

Figure 43:
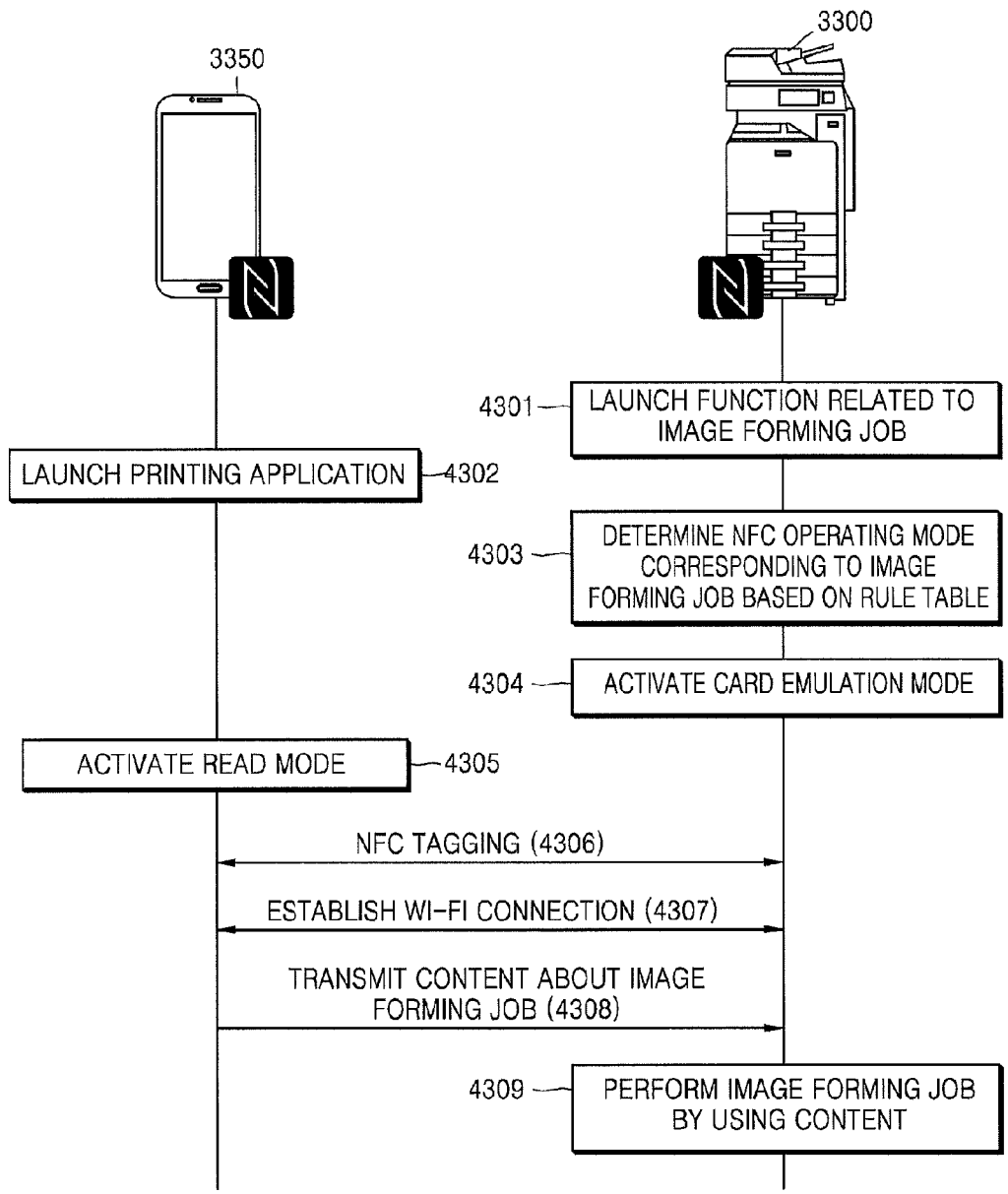
FIG. 43 illustrates an operation of setting an NFC operating mode in an image forming apparatus when performing an image forming job, according to an embodiment of the disclosure.

FIG. 43 illustrates an operation of setting an NFC operating mode in an image forming apparatus 3300 when performing an image forming job, according to an embodiment of the disclosure.

In operation 4301, the control unit 3310 of the image forming apparatus 3300 launches a function related to an image forming job. The control unit 3310 may launch a function related to the image forming job by launching a printing application on an OS that is previously installed in the image forming apparatus 3300.

In operation 4302, the mobile device 3350 launches the printing application.

In operation 4303, the control unit 3310 of the image forming apparatus 3300 determines an NFC operating mode corresponding to the image forming job based on the rule table 3501 of FIG. 35. According to the rule table 3501 of FIG. 35, the NFC operating mode of 60 corresponding to the image forming job is a card emulation mode. Accordingly, the control unit 3310 determines a card emulation mode as the NFC operating mode of the image forming apparatus 3300.

In operation 4304, the NFC module 3320 of the image forming apparatus 3300 activates the card emulation mode.

In operation 4305, the mobile device 3350 activates a read mode as an NFC operating mode corresponding to the image forming job.

In operation 4306, when the card emulation mode is activated in the image forming apparatus 3300, and the read mode is activated in the mobile device 3350, the image forming apparatus 3300 tags the mobile device 3350 via NFC.

In operation 4307, the image forming apparatus 3300 and the mobile device 3350 establish a Wi-Fi connection by exchanging information about a Wi-Fi setup via NFC tagging.

In operation 4308, the mobile device 3350 transmits to the image forming apparatus 3300 a content about the image forming job, which is selected via the printing application.

In operation 4309, the control unit 3310 of the image forming apparatus 3300 launches the image forming job such as printing, faxing, or copying by using the transmitted content.

Meanwhile, while operations 4301 through 4305 of FIG. 43 are described as being performed in time series for convenience of description, the order of operations 4301 through 4305 may be modified, and any such order may be included in the scope of the disclosure. That is, as long as the card emulation mode of the image forming apparatus 3300 and the read mode of the mobile device 3350 may be activated, the order of operations 4301 through 4305 may be modified. For example, the mobile device may activate the read mode before, after, or simultaneously with the activation of the card emulation mode by the image forming apparatus. Likewise, the mobile device may activate the read mode before, after, or simultaneously with any of operations 4301, 4303, and 4304 performed by the image forming apparatus. That is, operations 4302 and 4305 performed by the mobile device may be performed independently of any of operations 4301, 4303, and 4304 which are performed by the image forming apparatus.

As described above with reference to FIGS. 36 through 43, an NFC operating mode of the NFC module 3320 of the image forming apparatus 3300 may be set or converted according to the types of jobs that are currently to be performed in the image forming apparatus 3300 which are determined by using the control unit 3310, and not according to a polling loop or a polling cycle. Accordingly, the image forming apparatus 3300 and the mobile device 3350 do not have to be on standby until a polling loop or a polling cycle is paired therewith, and thus, unnecessary time needed for NFC tagging may be saved.

Figure 44:
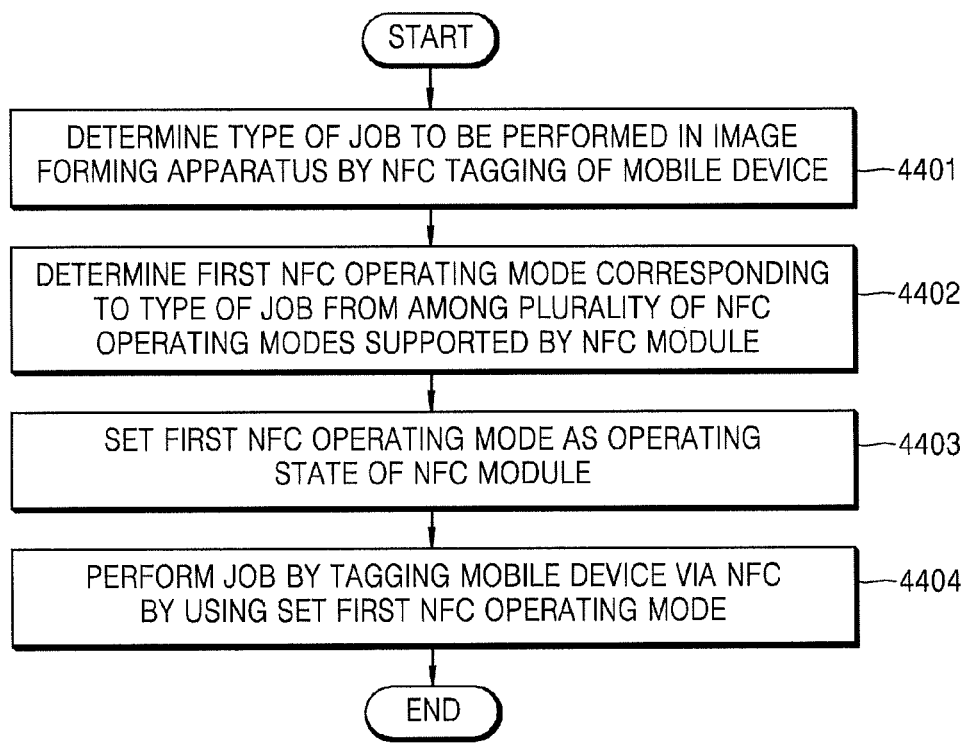
FIG. 44 is a flowchart of a method of setting an NFC operating mode of an image forming apparatus, according to an embodiment of the disclosure.

FIG. 44 is a flowchart of a method of setting an NFC operating mode of an image forming apparatus 3300, according to an embodiment of the disclosure. Referring to FIG. 44, a method of setting an NFC operating mode of the image forming apparatus 3300 corresponds to operations that are performed in time series in the image forming apparatus 3300 of FIGS. 33 and 34, and thus, any description that is omitted below but provided above with reference to FIGS. 33 and 34 may also apply to the method of setting an NFC operating mode of the image forming apparatus 3300 of FIG. 44.

In operation 4401, the control unit 3310 of the image forming apparatus 3300 determines a type of a job to be performed in the image forming apparatus 3300 by NFC tagging of the mobile device 3350.

In operation 4402, the control unit 3310 of the image forming apparatus 3300 determines a first NFC operating mode corresponding to the type of the job that is determined, from among a plurality of NFC operating modes that the NFC module 3320 supports.

In operation 4403, the NFC module 3320 of the image forming apparatus 3300 sets the first NFC operating mode as an operating state of the NFC module 3320.

In operation 4404, the control unit 3310 of the image forming apparatus 3300 performs the job by tagging the mobile device 3350 via NFC by using the set first NFC operating mode. Operations of the image forming apparatus may be similarly performed by the mobile device. That is, the mobile device may determine a type of job to performed in the image forming apparatus, determine an NFC operating mode of the mobile device corresponding to the type of job to be performed, and set the determined NFC operating mode for the mobile device so that the mobile device may be tagged by the image forming apparatus according to the set operating modes in both the mobile device and the image forming apparatus. As an alternative, the mobile device may set its NFC operating mode based upon a polling loop or polling cycle, or via another method.

FIG. 45 is a flowchart of a method of converting an NFC operating mode of an image forming apparatus 3300 when a subsequent job is performed after a previous job is performed, according to an embodiment of the disclosure.

In operation 4501, the control unit 3310 of the image forming apparatus 3300 determines a type of a job to be performed in the image forming apparatus 3300 by NFC tagging of the mobile device 3350.

In operation 4502, the control unit 3310 of the image forming apparatus 3300 determines a first NFC operating mode corresponding to the type of the job that is determined, from among a plurality of NFC operating modes that the NFC module 3320 supports.

In operation 4403, the NFC module 3320 of the image forming apparatus 3300 sets the first NFC operating mode as an operating state of the NFC module 3320.

In operation 4504, the control unit 3310 of the image forming apparatus 3300 performs the job by tagging the mobile device 3350 via NFC by using the set first NFC operating mode.

In operation 4505, the control unit 3310 of the image forming apparatus 3300 determines a type of a subsequent job to be performed in the image forming apparatus 3300 by NFC tagging of the mobile device 3350.

In operation 4506, the control unit 3310 of the image forming apparatus 3300 determines a second NFC operating mode corresponding to the determined type of the subsequent job.

In operation 4507, the NFC module 3320 of the image forming apparatus 3300 converts the operating state of the NFC module 3320 from the previously set first NFC operating mode to the determined second NFC operating mode.

In operation 4508, the control unit 3310 of the image forming apparatus 3300 performs the subsequent job by tagging the mobile device 3350 via NFC by using the second NFC operating mode. As noted above, operations of the image forming apparatus may be similarly performed by the mobile device. That is, the mobile device may determine a type of job to performed (for a current job and/or for a subsequent job) in the image forming apparatus, determine an NFC operating mode of the mobile device corresponding to the type of job to be performed, and set the determined NFC operating mode for the mobile device so that the mobile device may be tagged by the image forming apparatus according to the set operating modes in both the mobile device and the image forming apparatus (for a current job and/or for a subsequent job). As an alternative, the mobile device may set its NFC operating mode based upon a polling loop or polling cycle, or via another method.

As described above, according to the embodiments of the disclosure, NFC operating modes of an NFC module of an image forming apparatus or an NFC module of a mobile device may not be sequentially converted according to a polling loop or a polling cycle but may be directly converted according to a type of a job that is to be performed in the image forming apparatus or the mobile device. Thus, the image forming apparatus and/or the mobile device does not have to be on standby until a timing of the polling loop or the polling cycle is paired therewith. Accordingly, unnecessary time needed for NFC tagging may be saved, which enhances convenience for the user of the image forming apparatus and/or the mobile device when using NFC technology.

The apparatuses and methods according to the above-described example embodiments may use one or more processors. For example, a processing device may be implemented using one or more general-purpose or special purpose computers, and may include, for example, one or more of a processor, a controller and an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a microprocessor or any other device capable of responding to and executing instructions in a defined manner.

One or more aspects of the disclosure may also be embodied as computer-readable codes on a computer-readable medium (e.g., a non-transitory computer-readable medium). The computer-readable medium may include a computer-readable recording medium and a computer-readable transmission medium. The computer-readable recording medium is any data storage device that may store data as a program which may be thereafter read by a computer system. Examples of the computer-readable recording medium include a semiconductor memory, read-only memory (ROM), random-access memory (RAM), a USB memory, a memory card, a Blu-Ray disc, CD-ROMs, magnetic tapes, floppy disks, and optical data storage devices.

One or more aspects of the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks, Blu-Ray discs, and DVDs; magneto-optical media such as optical discs; and other hardware devices that are specially configured to store and perform program instructions, such as semiconductor memory, read-only memory (ROM), random access memory (RAM), flash memory, USB memory, a memory card, and the like. Examples of program instructions include both machine code, such as produced by a compiler, and files containing higher level code that may be executed by the computer using an interpreter. The program instructions may be executed by one or more processors. The described hardware devices may be configured to act as one or more software modules in order to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the non-transitory computer-readable storage media may also be embodied in at least one application specific integrated circuit (ASIC) or Field Programmable Gate Array (FPGA).

Each block of the flowchart illustrations may represent a unit, module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently (simultaneously) or the blocks may sometimes be executed in the reverse order, depending upon the functionality involved.

While the disclosure has been particularly illustrated and described with reference to exemplary embodiments thereof, it will be appreciated by those of ordinary skill in the art that changes may be made therein without departing from the principles and spirit of the disclosure, the scope of which is defined in the appended claims and their equivalents. The exemplary embodiments should be considered in a descriptive sense only and not for purposes of limitation. Therefore, the scope of the disclosure is defined not by the detailed description of the disclosure but by the appended claims, and all differences within the scope will be construed as being included in the disclosure.

What is claimed is:

1. A method of setting a near field communication (NFC) operating mode of an image forming apparatus, the method comprising:
   determining, via a controller, a type of a job to be performed in the image forming apparatus via NFC tagging of a mobile device;
   determining, via the controller, an NFC operating mode of an NFC module corresponding to the determined type of job from among a plurality of NFC operating modes;
   setting, via the controller, the determined NFC operating mode as an operating mode of the NFC module; and
   performing, via the controller, the job by tagging the mobile device via NFC by using the set NFC operating mode.

2. The method of claim 1, wherein the determining of the NFC operating mode comprises determining the NFC operating mode based on a rule table that defines a mapping relationship between the type of the job and the plurality of NFC operating modes.

3. The method of claim 2, wherein the type of the job includes at least one selected from a registration job, an authentication job, a data cloning job, a Wi-Fi setup job, a trouble shooting job, a printing job, a scanning job, and a faxing job.

4. The method of claim 3, wherein the authentication job is performed by using a first NFC authentication method using a printing application installed in the mobile device or a second NFC authentication method using an NFC tag mounted in the mobile device.

5. The method of claim 4, wherein the rule table defines a mapping relationship between the first NFC authentication method and a card emulation mode, and when the type of the job is the authentication job of the first NFC authentication method, the card emulation mode is set as the NFC operating mode.

6. The method of claim 4, wherein the rule table defines a mapping relationship between the second NFC authentication method and a read mode, and
   when the type of the job is the authentication job of the second NFC authentication method, the read mode is set as the NFC operating mode.

7. The method of claim 3, wherein the rule table defines a mapping relationship between a registration job performed using a first registration method, in which the mobile device is registered by using a printing application installed in the mobile device, and a card emulation mode, and
when the type of the job is the registration job of the first registration method, the card emulation mode is set as the NFC operating mode.

8. The method of claim 3, wherein the rule table defines a mapping relationship between a registration job performed using a second registration method, in which an NFC tag of the mobile device is registered via a user interface screen of the image forming apparatus, and a read mode, and
when the type of the job is the registration job of the second registration method, the read mode is set as the NFC operating mode.

9. The method of claim 3, wherein the rule table defines a mapping relationship between a card emulation mode and at least one of the data cloning job, the Wi-Fi setup job, the trouble shooting job, the printing job, the scanning job, and the faxing job, and when the type of the job is at least one of the data cloning job, the Wi-Fi setup job, the trouble shooting job, the printing job, the scanning job, and the faxing job, the card emulation mode is set as the NFC operating mode.

10. The method of claim 2, further comprising:
determining, when the job is completed, a type of a subsequent job to be performed by NFC tagging of the mobile device;
determining a subsequent NFC operating mode corresponding to the determined subsequent job based on the rule table; and
converting the operating mode of the NFC module from the set NFC operating mode to the determined subsequent NFC operating mode.

11. A non-transitory computer readable recording medium having embodied thereon one or more programs for executing the method of claim 1.

12. An image forming apparatus supporting a near field communication (NFC) function, the image forming apparatus comprising:
a controller configured to:
determine a type of a job to be performed in the image forming apparatus via NFC tagging of a mobile device, and
determine an NFC operating mode corresponding to the determined type of the job from among a plurality of NFC operating modes; and
an NFC module configured to activate the determined NFC operating mode,
wherein the controller is further configured to control launching of the job by using the mobile device that is tagged via NFC according to the activated NFC operating mode.

13. The image forming apparatus of claim 12, wherein the controller is further configured to determine the NFC operating mode based on a rule table that defines a mapping relationship between the type of the job and the plurality of NFC operating modes.

14. The image forming apparatus of claim 13, wherein the type of the job includes at least one selected from a registration job, an authentication job, a data cloning job, a Wi-Fi setup job, a trouble shooting job, a printing job, a scanning job, and a faxing job.

15. The image forming apparatus of claim 14,
wherein the rule table defines a mapping relationship between a first NFC authentication method using a printing application installed in the mobile device, and a card emulation mode, and
wherein, when the type of the job is the authentication job of the first NFC authentication method, the card emulation mode is activated as the NFC operating mode.

16. The image forming apparatus of claim 14,
wherein the rule table defines a mapping relationship between a second NFC authentication method using an NFC tag mounted in the mobile device, and a read mode, and
wherein, when the type of the job is the authentication job of the second NFC authentication method, the read mode is activated as the NFC operating mode.

17. The image forming apparatus of claim 14,
wherein the rule table defines a mapping relationship between a registration job performed using a first registration method, in which the mobile device is registered by using a printing application installed in the mobile device, and a card emulation mode, and
wherein, when the type of the job is the registration job of the first registration method, the card emulation mode is activated as the NFC operating mode.

18. The image forming apparatus of claim 14,
wherein the rule table defines a mapping relationship between a registration job performed using a second registration method, in which an NFC tag of the mobile device is registered via a user interface screen of the image forming apparatus, and a read mode, and
wherein, when the type of the job is the registration job of the second registration method, the read mode is activated as the NFC operating mode.

19. The image forming apparatus of claim 14,
wherein the rule table defines a mapping relationship between a card emulation mode and at least one of the data cloning job, the Wi-Fi setup job, the trouble shooting job, the printing job, the scanning job, and the faxing job, and
wherein, when the type of the job is at least one of the data cloning job, the Wi-Fi setup job, the trouble shooting job, the printing job, the scanning job, and the faxing job, the card emulation mode is activated as the NFC operating mode.

20. The image forming apparatus of claim 13,
wherein the controller is further configured to:
determine, when the job is completed, a type of a subsequent job to be performed by NFC tagging of the mobile device, and
determine a subsequent NFC operating mode corresponding to the determined subsequent job based on the rule table, and
wherein the set NFC operating mode of the NFC module is converted to the determined subsequent NFC operating mode.

* * * * *